United States Patent
Cirik et al.

(10) Patent No.: US 12,349,187 B2
(45) Date of Patent: Jul. 1, 2025

(54) RESOURCE SELECTION FOR SIGNAL TRANSMISSION

(71) Applicant: Comcast Cable Communications, LLC, Philadelphia, PA (US)

(72) Inventors: Ali Cagatay Cirik, Chantilly, VA (US); Esmael Hejazi Dinan, McLean, VA (US); Yunjung Yi, Vienna, VA (US); Hua Zhou, Vienna, VA (US); Alireza Babaei, Fairfax, VA (US); Kyungmin Park, Vienna, VA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 24 days.

(21) Appl. No.: 17/969,328

(22) Filed: Oct. 19, 2022

(65) Prior Publication Data

US 2023/0037661 A1    Feb. 9, 2023

Related U.S. Application Data

(63) Continuation of application No. 16/993,769, filed on Aug. 14, 2020, now Pat. No. 11,510,239.

(60) Provisional application No. 62/886,465, filed on Aug. 14, 2019.

(51) Int. Cl.
*H04W 74/00* (2009.01)
*H04B 7/06* (2006.01)
*H04L 5/00* (2006.01)
*H04W 74/0833* (2024.01)

(52) U.S. Cl.
CPC ........ *H04W 74/002* (2013.01); *H04B 7/0608* (2013.01); *H04L 5/0023* (2013.01); *H04L 5/0053* (2013.01); *H04W 74/0833* (2013.01)

(58) Field of Classification Search
CPC ............ H04W 74/008; H04W 74/0833; H04B 7/0608; H04L 5/0023; H04L 5/0053
See application file for complete search history.

(56) References Cited

U.S. PATENT DOCUMENTS

| | | | |
|---|---|---|---|
| 2015/0280801 A1* | 10/2015 | Xin | H04L 5/0048 370/329 |
| 2018/0176949 A1 | 6/2018 | Islam et al. | |
| 2020/0053800 A1 | 2/2020 | Deng et al. | |
| 2020/0145983 A1* | 5/2020 | Levitsky | H04L 5/005 |
| 2020/0350977 A1* | 11/2020 | Ryu | H04W 74/006 |
| 2021/0007085 A1 | 1/2021 | Lin et al. | |
| 2021/0168858 A1 | 6/2021 | Liu et al. | |
| 2021/0258062 A1* | 8/2021 | Koskela | H04B 7/0695 |

OTHER PUBLICATIONS

3GPP TS 38.213 V15.6.0 (Jun. 2019), Technical Specification, 3rd Generation Partnership Project; Technical Specification Group Radio Access Network; NR; Physical layer procedures for control (Release 15).

(Continued)

*Primary Examiner* — Charles C Jiang
*Assistant Examiner* — Shawn D Miller
(74) *Attorney, Agent, or Firm* — Banner & Witcoff, Ltd.

(57) ABSTRACT

A base station and/or a wireless device may perform a communication procedure. A downlink transmission for initiating the communication may indicate an antenna panel for transmission of an uplink signal from the wireless device. A slot for transmission of the uplink signal may be determined based on an antenna panel activation delay.

26 Claims, 33 Drawing Sheets

(56) References Cited

OTHER PUBLICATIONS

3GPP TS 38.214 V15.6.0 (Jun. 2019), Technical Specification, 3rd Generation Partnership Project; Technical Specification Group Radio Access Network; NR; Physical layer procedures for data (Release 15).
3GPP TS 38.300 V15.6.0 (Jun. 2019), Technical Specification, 3rd Generation Partnership Project; Technical Specification Group Radio Access Network; NR; NR and NG-RAN Overall Description; Stage 2 (Release 15).
3GPP TS 38.321 V15.6.0 (Jun. 2019), Technical Specification, 3rd Generation Partnership Project; Technical Specification Group Radio Access Network; NR; Medium Access Control (MAC) protocol specification (Release 15).
3GPP TS 38.331 V15.6.0 (Jun. 2019), Technical Specification, 3rd Generation Partnership Project; Technical Specification Group Radio Access Network; NR; Radio Resource Control (RRC) protocol specification (Release 15).
3GPP TSG RAN WG1 Meeting #97, Reno, USA, May 13-17, 2019, Title: RAN1 Chairman's Notes.
R1-1906030 3GPP TSG RAN WG1 Meeting #97, Reno, USA, May 13-17, 2019, Source: Huawei, HiSilicon, Title: Enhancements on multi-beam operation.
R1-1906160 3GPP TSG RAN WG1 Meeting #97, Reno, USA, May 13-17, 2019, Source: vivo, Title: Further discussion on Multi-Beam Operation.
R1-1906169 3GPP TSG RAN WG1 Meeting #97, Reno, USA, May 13-17, 2019, Source: vivo, Title: Performance evaluation of L1-SINR based beam selection.
R1-1906225 3GPP TSG RAN WG1 Meeting #97, Reno, USA, May 13-17, 2019, Source: NTT Docomo, Inc., Title: Discussion on multi-beam enhancement.
R1-1906237 3GPP TSG RAN WG1 Meeting #97, Reno, USA, May 13-17, 2019, Source: ZTE, Title: Enhancements on multi-beam enhancement.
R1-1906244 3GPP TSG RAN WG1 Meeting #97, Reno, USA, May 13-17, 2019, Source: ZTE, Title: Considerations on beam management for multi-TRP.
R1-1906245 3GPP TSG RAN WG1 Meeting #97, Reno, USA, May 13-17, 2019, Source: ZTE, Title: Details of latency and overhead reduction for beam management.
R1-1906246 3GPP TSG RAN WG1 Meeting #97, Reno, USA, May 13-17, 2019, Source: ZTE, Title: Details and SLS evaluation on UL simultaneous transmission in indoor hotspot.
R1-1906247 3GPP TSG RAN WG1 Meeting #97, Reno, USA, May 13-17, 2019, Source: ZTE, Title: Details and LLS evaluation on UL simultaneous transmission for multi-TRP.
R1-1906248 3GPP TSG RAN WG1 Meeting #97, Reno, USA, May 13-17, 2019, Source: ZTE, Title: Details and LLS evaluation on L1-SINR measurement and reporting.
R1-1906249 3GPP TSG RAN WG1 Meeting #97, Reno, USA, May 13-17, 2019, Source: ZTE, Title: Details and SLS evaluation on L1-SINR measurement and reporting.
R1-1906250 3GPP TSG RAN WG1 Meeting #97, Reno, USA, May 13-17, 2019, Source: ZTE, Title: Discussion on UL power control for multi-panel operation.
R1-1906251 3GPP TSG RAN WG1 Meeting #97, Reno, USA, May 13-17, 2019, Source: ZTE, Title: Enhancements on UL beam management.
R1-1906252 3GPP TSG RAN WG1 Meeting #97, Reno, USA, May 13-17, 2019, Source: ZTE, Title: Leftover issues on aperiodic CSI-RS.
R1-1906253 3GPP TSG RAN WG1 Meeting #97, Reno, USA, May 13-17, 2019, Source: ZTE, Title: PUSCH spatial relation and power control after BFR.
R1-1906254 3GPP TSG RAN WG1 Meeting #97, Reno, USA, May 13-17, 2019, Source: ZTE, Title: Configuration of SRS and PUSCH in the same symbol.
R1-1906255 3GPP TSG RAN WG1 Meeting #97, Reno, USA, May 13-17, 2019, Source: ZTE, Title: Enhancements on simultaneous Tx/Rx of channels/signals.
R1-1906275 3GPP TSG RAN WG1 Meeting #97, Reno, USA, May 13-17, 2019, Source: Lenovo, Motorola Mobility, Title: Discussion of multi-beam operation.
R1-1906276 3GPP TSG RAN WG1 Meeting #97, Reno, USA, May 13-17, 2019, Source: Lenovo, Motorola Mobility, Title: Discussion on UL multi-panel transmission.
R1-1906288 3GPP TSG RAN WG1 Meeting #97, Reno, USA, May 13-17, 2019, Source: OPPO, Title: Discussion on Multi-beam Operation Enhancements.
R1-1906346 3GPP TSG RAN WG1 Meeting #97, Reno, USA, May 13-17, 2019, Source: CATT, Title: Consideration on multi-beam enhancements.
R1-1906370 3GPP TSG RAN WG1 Meeting #97, Reno, USA, May 13-17, 2019, Source: Spreadtrum Communications, Title: Discussion on multi-beam operation.
R1-1906399 3GPP TSG RAN WG1 Meeting #97, Reno, USA, May 13-17, 2019, Source: NEC, Title: Discussion on multi-beam operation.
R1-1906446 3GPP TSG RAN WG1 Meeting #97, Reno, USA, May 13-17, 2019, Source: Fujitsu, Title: Enhancements on multi-beam operation.
R1-1906522 3GPP TSG RAN WG1 Meeting #97, Reno, USA, May 13-17, 2019, Source: CMCC, Title: Enhancements on multi-beam operation.
R1-1906537 3GPP TSG RAN WG1 Meeting #97, Reno, USA, May 13-17, 2019, Source: MediaTek Inc., Title: Enhancements on multi-beam operation.
R1-1906539 3GPP TSG RAN WG1 Meeting #97, Reno, USA, May 13-17, 2019, Source: MediaTek Inc., Title: Further considerations on RS design.
R1-1906731 3GPP TSG RAN WG1 Meeting #97, Reno, USA, May 13-17, 2019, Source: LG Electronics, Title: Discussion on multi-beam based operations and enhancements.
R1-1906741 3GPP TSG RAN WG1 Meeting #97, Reno, USA, May 13-17, 2019, Source: LG Electronics, Title: Performance analysis on STxMP for future enhancement.
R1-1906742 3GPP TSG RAN WG1 Meeting #97, Reno, USA, May 13-17, 2019, Source: LG Electronics, Title: Evaluation results on beam selection based on L1-SINR with dedicated IMR.
R1-1906816 3GPP TSG RAN WG1 Meeting #97, Reno, USA, May 13-17, 2019, Source: Intel Corporation, Title: On Beam Management Enhancement.
R1-1906851 3GPP TSG RAN WG1 Meeting #97, Reno, USA, May 13-17, 2019, Source: Sony, Title: Enhancements on multi-beam operation.
R1-1906861 3GPP TSG RAN WG1 Meeting #97, Reno, USA, May 13-17, 2019, Source: InterDigital, Inc., Title: On L1-SINR Measurement.
R1-1906887 3GPP TSG RAN WG1 Meeting #97, Reno, USA, May 13-17, 2019, Source: China Telecom, Title: Enhancements on multi-beam operation.
R1-1906969 3GPP TSG RAN WG1 Meeting #97, Reno, USA, May 13-17, 2019, Source: Samsung, Title: Enhancements on multi-beam operation.
R1-1906977 3GPP TSG RAN WG1 Meeting #97, Reno, USA, May 13-17, 2019, Source: Samsung, Title: Evaluation on SINR metrics for beam selection.
R1-1906978 3GPP TSG RAN WG1 Meeting #97, Reno, USA, May 13-17, 2019, Source: Samsung, Title: Discussion on IMR for L1-SINR measurement.
R1-1907032 3GPP TSG RAN WG1 Meeting #97, Reno, USA, May 13-17, 2019, Source: Panasonic, Title: On enhancements for multi-beam operations for NR MIMO in Rel. 16.
R1-1907052 3GPP TSG RAN WG1 Meeting #97, Reno, USA, May 13-17, 2019, Source: Fraunhofer IIS, Fraunhofer HHI, Title: Enhancements on UE multi-beam operation.
R1-1907156 3GPP TSG RAN WG1 Meeting #97, Reno, USA, May 13-17, 2019, Source: AT&T, Title: Enhancements on Multi Beam Operation.

(56) References Cited

OTHER PUBLICATIONS

R1-1907205 3GPP TSG RAN WG1 Meeting #97, Reno, USA, May 13-17, 2019, Source: CAICT, Title: Further discussion on Scell BFR and L1-SINR.
R1-1907247 3GPP TSG RAN WG1 Meeting #97, Reno, USA, May 13-17, 2019, Source: Motorola Mobility, Lenovo, Title: Power control for multi-panel UE.
R1-1907290 3GPP TSG RAN WG1 Meeting #97, Reno, USA, May 13-17, 2019, Source: Qualcomm Incorporated, Title: Enhancements on Multi-beam Operation.
R1-1907317 3GPP TSG RAN WG1 Meeting #97, Reno, USA, May 13-17, 2019, Source: Nokia, Nokia Shanghai Bell, Title: Enhancements on Multi-beam Operation.
R1-1907343 3GPP TSG RAN WG1 Meeting #97, Reno, USA, May 13-17, 2019, Source: Apple, Title: Considerations on multi-panel and MPE in FR2.
R1-1907344 3GPP TSG RAN WG1 Meeting #97, Reno, USA, May 13-17, 2019, Source: Apple Inc., Title: Further considerations on beam management enhancement.
R1-1907360 3GPP TSG RAN WG1 Meeting #97, Reno, USA, May 13-17, 2019, Source: Asia Pacific Telecom, Title: Enhancements on Multi-beam Operations.
R1-1907416 3GPP TSG RAN WG1 Meeting #97, Reno, USA, May 13-17, 2019, Source: KDDI, Title: Enhancements on Multi-beam Operations.
R1-1907436 3GPP TSG RAN WG1 Meeting #97, Reno, USA, May 13-17, 2019, Source: Ericsson, Title: Enhancements on Multi-beam Operations.
R1-1907437 3GPP TSG RAN WG1 Meeting #97, Reno, USA, May 13-17, 2019, Source: Ericsson, Title: On event-driven reporting for beam management.
R1-1907438 3GPP TSG RAN WG1 Meeting #97, Reno, USA, May 13-17, 2019, Source: Ericsson, Title: Latency analysis of SCell BFR solutions.
R1-1907439 3GPP TSG RAN WG1 Meeting #97, Reno, USA, May 13-17, 2019, Source: Ericsson, Title: Performance of beam selection based on L1-SINR.
R1-1907444 3GPP TSG RAN WG1 Meeting #97, Reno, USA, May 13-17, 2019, Source: Xiaomi, Title: Enhancements on beam management.
R1-1907466 3GPP TSG RAN WG1 Meeting #97, Reno, USA, May 13-17, 2019, Source: Convida Wireless, Title: On Beam Failure Recovery for Scell.
R1-1907473 3GPP TSG RAN WG1 Meeting #97, Reno, USA, May 13-17, 2019, Source: Ericsson, Title: Comparison of MAC CE signalling options for spatial relation update of aperiodic SRS.
R1-1907474 3GPP TSG RAN WG1 Meeting #97, Reno, USA, May 13-17, 2019, Source: Ericsson, Title: L1-SINR estimation using ZP and NZP IMR.
R1-1907475 3GPP TSG RAN WG1 Meeting #97, Reno, USA, May 13-17, 2019, Source: Ericsson, Title: Signalling reduction for beam-based UL power control.
R1-1907476 3GPP TSG RAN WG1 Meeting #97, Reno, USA, May 13-17, 2019, Source: Ericsson, Title: Performance of P-MPR-aware multi-panel scheduling.
R1-1907530 3GPP TSG RAN WG1 Meeting #97, Reno, USA, May 13-17, 2019, Source: Huawei, HiSilicon, Title: UL/DL BM for latency reduction.
R1-1907531 3GPP TSG RAN WG1 Meeting #97, Reno, USA, May 13-17, 2019, Source: Huawei, HiSilicon, Title: Discussion on panel activation/deactivation status.
R1-1907532 3GPP TSG RAN WG1 Meeting #97, Reno, USA, May 13-17, 2019, Source: Huawei, HiSilicon, Title: Measurement configuration and UE behavior for L1-SINR reporting.
R1-1907533 3GPP TSG RAN WG1 Meeting #97, Reno, USA, May 13-17, 2019, Source: Huawei, HiSilicon, Title: Beam failure recovery for SCell with new beam information.
R1-1907534 3GPP TSG RAN WG1 Meeting #97, Reno, USA, May 13-17, 2019, Source: Huawei, HiSilicon, Title: Evaluation methodology for multi-beam enhancements.
R1-1907535 3GPP TSG RAN WG1 Meeting #97, Reno, USA, May 13-17, 2019, Source: Huawei, HiSilicon, Title: Evaluation results of panel-specific beam selection.
R1-1907552 3GPP TSG RAN WG1 Meeting #97, Reno, USA, May 13-17, 2019, Source: Huawei, HiSilicon, Title: UL/DL BM for overhead reduction.
R1-1907553 3GPP TSG RAN WG1 Meeting #97, Reno, USA, May 13-17, 2019, Source: Huawei, HiSilicon, Title: Discussion on panel ID and usage.
R1-1907554 3GPP TSG RAN WG1 Meeting #97, Reno, USA, May 13-17, 2019, Source: Huawei, HiSilicon, Title: Discussion on reporting content and format for L1-SINR reporting.
R1-1907555 3GPP TSG RAN WG1 Meeting #97, Reno, USA, May 13-17, 2019, Source: Huawei, HiSilicon, Title: Beam failure recovery for SCell without new beam information.
R1-1907650 3GPP TSG RAN WG1 Meeting #97, Reno, USA, May 13-17, 2019, Source: LG Electronics, Title: Feature lead summary of Enhancements on Multi-beam Operations.
R4-1808542 3GPP TSG-RAN WG4 RAN4#87, Busan, Korea, May 21-25, 2018, Source: RAN4, Title: LS on Lead Time for Beam Switching.
Huawei et al: "Discussion on panel ID and usage", 3GPP Draft; R1-1907553, 3rd Generation Partnership Project (3GPP), Mobile Competence Centre ; 650, Route Des Lucioles ; F-06921 Sophia-Antipolis Cedex ; France vol. RAN WG1, No. Reno, USA; May 13, 2019-May 17, 2019 May 13, 2019 (May 13, 2019), XP051728986, Retrieved from the Internet: URL:http://www.3gpp.org/ftp/Meetings%5F3G PP%5FSYNC/RAN 1 / Docs/R1%2D1907553%2Ezip [retrieved on May 13, 2019].
Qualcomm Incorporated: "Beam management for NR", 3GPP Draft; R1-1807341 Beam Management for NR, 3rd Generation Partnership Project (3GPP), Mobile Competence Centre ; 650, Route Des Lucioles ; F-06921 Sophia-Antipolis Cedex ; France vol. RAN WG1, No. Busan, Korea; May 21, 2018-May 25, 2018 May 20, 2018 (May 20, 2018), XP051442533, Retrieved from the Internet: URL:http://www.3gpp.org/ftp/Meetings%5F3G PP%5FSYNC/RAN 1 / Docs/ [retrieved on May 20, 2018].
Qualcomm Incorporated: "Beam Switching Delay", 3GPP Draft; R4-1802378, 3rd Generation Partnership Project (3GPP), Mobile Competence Centre ; 650, Route Des Lucioles ; F-06921 Sophia-Antipolis Cedex ; France vol. RAN WG4, No. Athens, Greece; Feb. 26, 2018-Mar. 2, 2018 Feb. 19, 2018 (Feb. 19, 2018), XP051403209, Retrieved from the Internet: URL:http://www.3gpp.org/ftp/tsg%5Fran/WG4%5FRadio/ TSG R4%5F86/Docs/ [retrieved on Feb. 19, 2018].
Qualcomm Incorporated: "Potential Techniques for UE Power Saving", 3GPP Draft; R1-1903016, 3rd Generation Partnership Project (3GPP), Mobile Competence Centre ; 650, Route Des Lucioles ; F-06921 Sophia-Antipolis Cedex ; France , Mar. 1, 2019 (Mar. 1, 2019), pp. 1-33, XP051600713, Retrieved from the Internet: URL:http://www.3gpp.org/ftp/tsg%5Fran/WG1 %5FRL 1 / TSGR1 %5F96/Docs/R1%2D1903016%2Ezip.
Nov. 27, 2020—European Search Report—EP 20191078.3.

\* cited by examiner

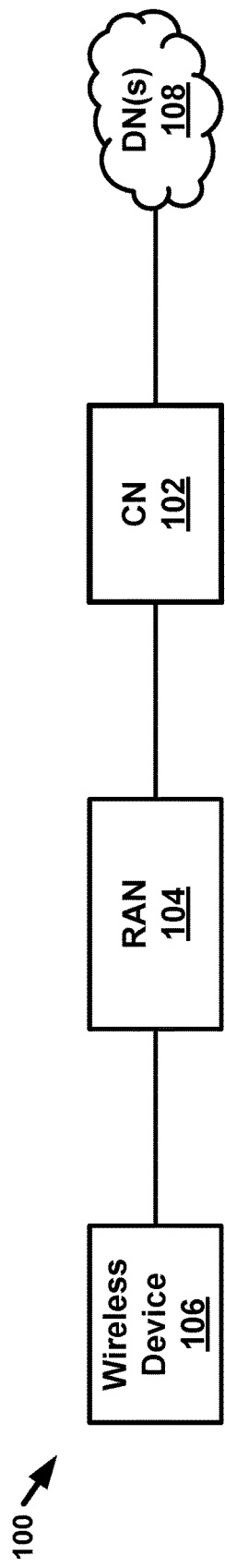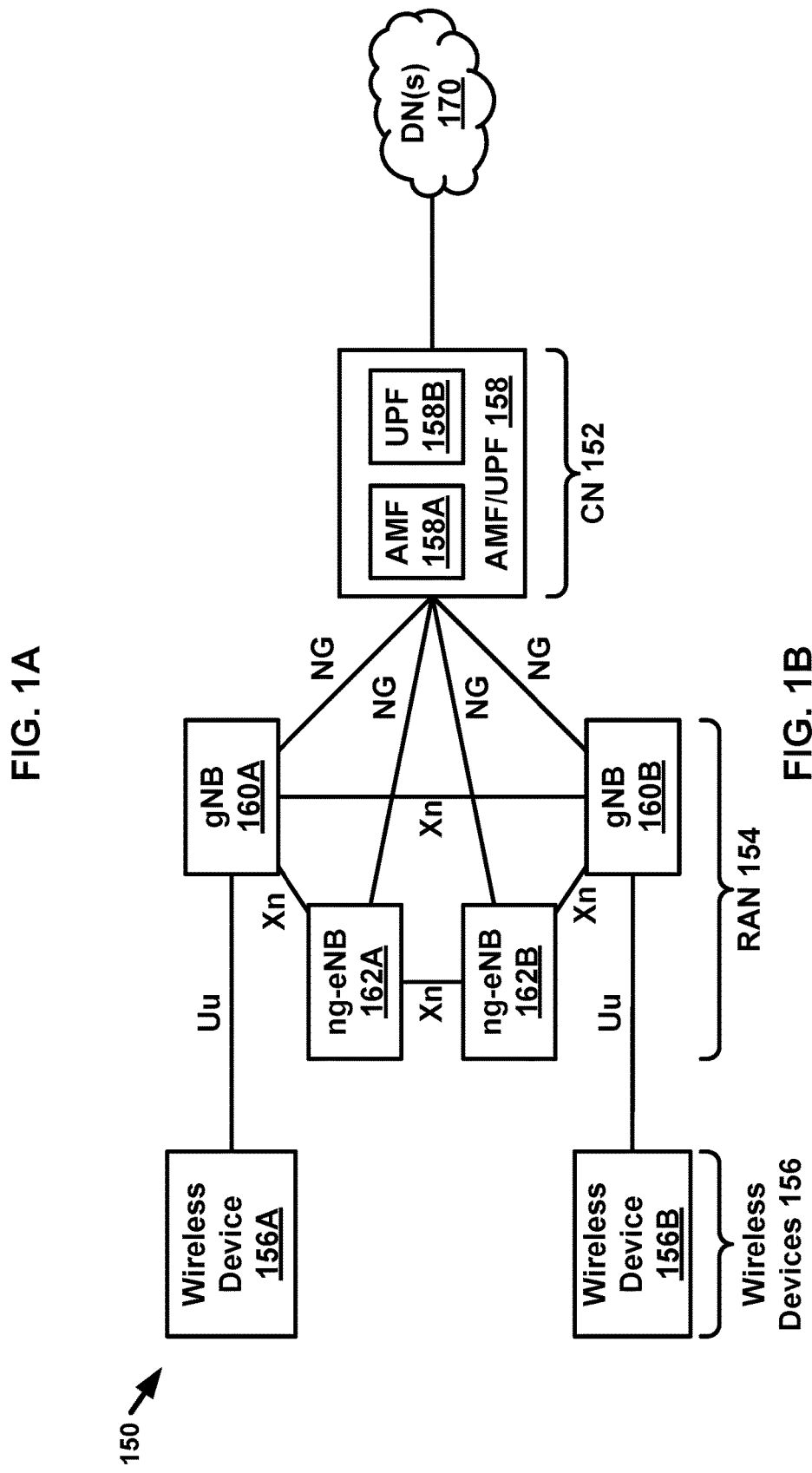

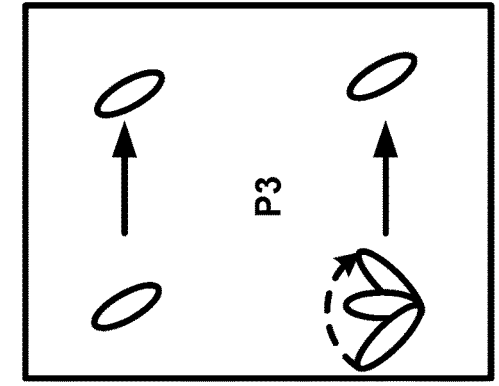
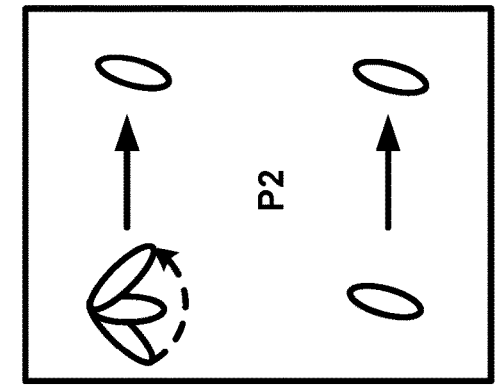
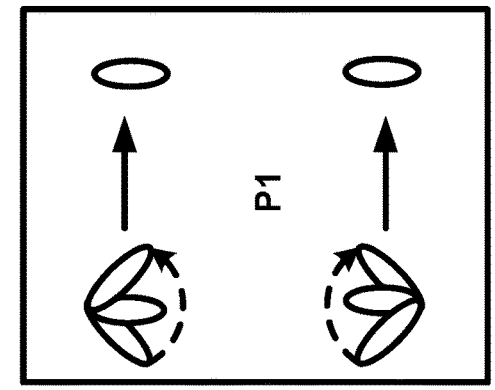
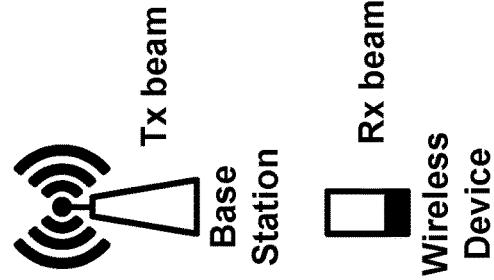
FIG. 12A
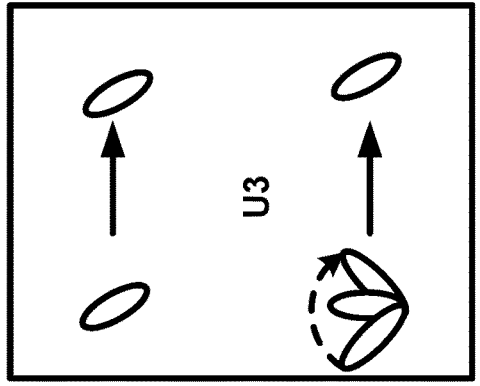
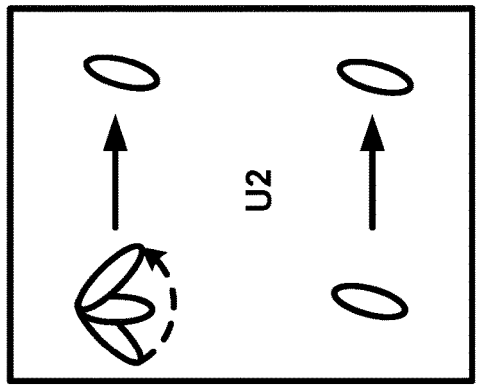
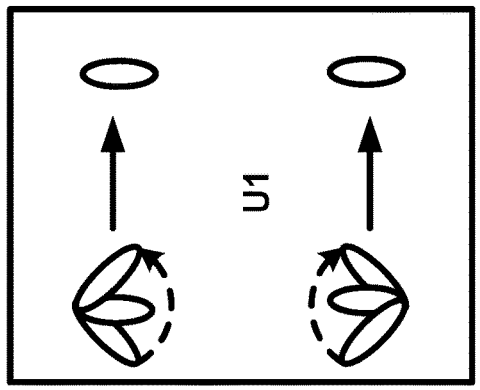
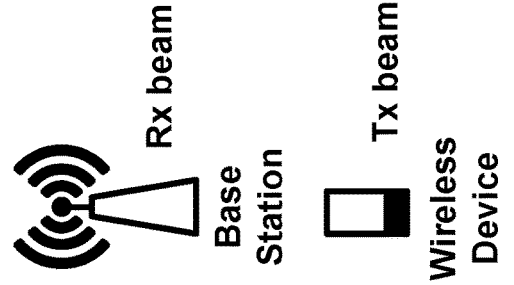
FIG. 12B

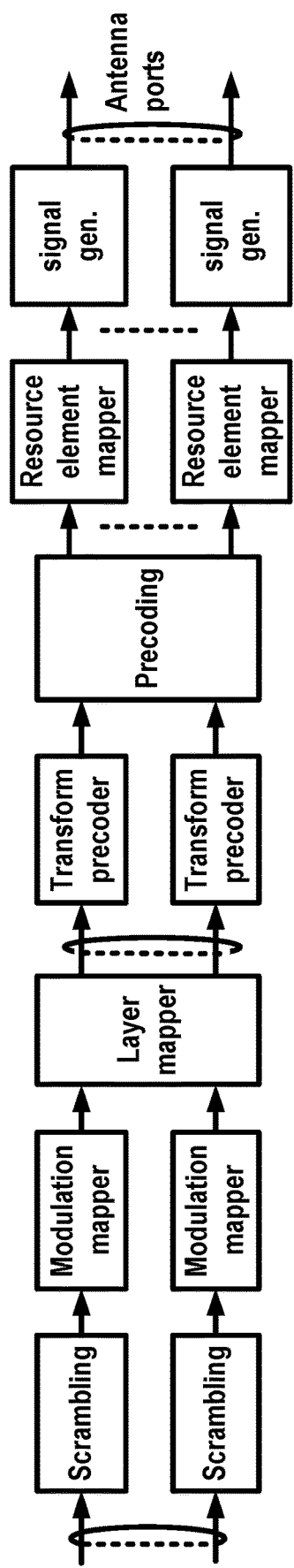
FIG. 16A
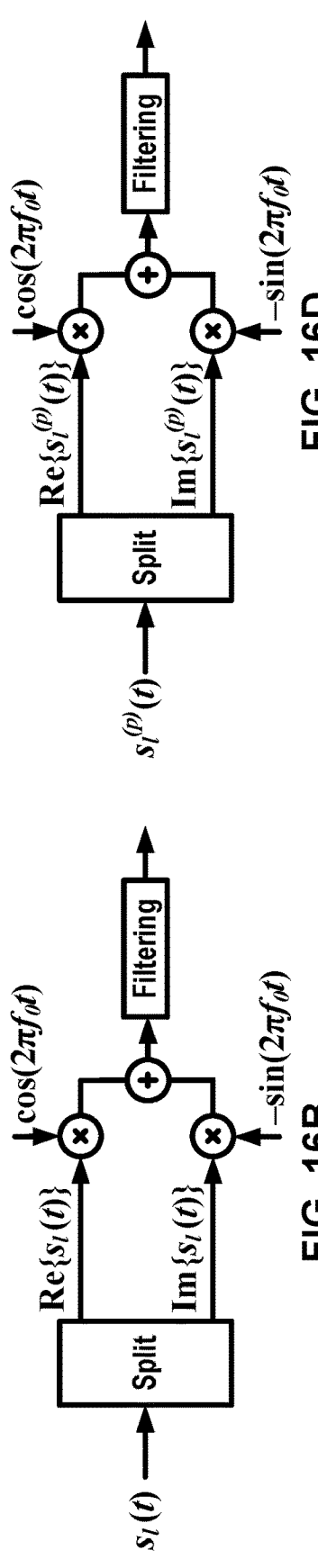
FIG. 16B
FIG. 16D
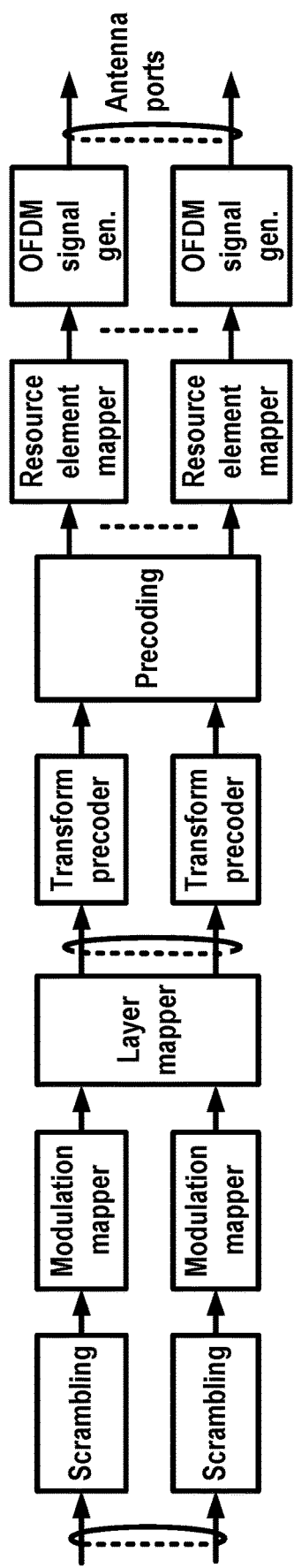
FIG. 16C

*TCI-State information element 1700*

```
-- ASN1START
-- TAG-TCI-STATE-START

TCI-State ::=           SEQUENCE {
    tci-StateId             TCI-StateId,
    qcl-Type1               QCL-Info,
    qcl-Type2               QCL-Info        OPTIONAL,   -- Need R
    ...
}

QCL-Info ::=            SEQUENCE {
    cell                    ServCellIndex   OPTIONAL,   -- Need R
    bwp-Id                  BWP-Id          OPTIONAL,   -- Cond CSI-RS-Indicated
    referenceSignal         CHOICE {
        csi-rs                  NZP-CSI-RS-ResourceId,
        ssb                     SSB-Index
    },
    qcl-Type                ENUMERATED {typeA, typeB, typeC, typeD},
    ...
}
```

FIG. 17

RESOURCE SELECTION FOR SIGNAL TRANSMISSION

CROSS-REFERENCE TO RELATED APPLICATIONS

This application claims priority to and is a continuation of U.S. application Ser. No. 16/993,769, filed on Aug. 14, 2020, which claims the benefit of U.S. Provisional Application No. 62/886,465, filed on Aug. 14, 2019. Each of the above-referenced applications is hereby incorporated by reference in its entirety.

BACKGROUND

A random access procedure is used to establish communications or set up a connection between a wireless device and a base station. The base station and the wireless device exchange communications for the random access procedure.

SUMMARY

The following summary presents a simplified summary of certain features. The summary is not an extensive overview and is not intended to identify key or critical elements.

Wireless communications between a wireless device and a base station are described. A wireless device and a base station may establish communications and/or set up a connection. For example, the wireless device and/or the base station may perform a random access procedure. The random access procedure may be initiated by a control message requesting an uplink transmission from a wireless device. The control message may indicate information associated with the uplink transmission, such as an indication of a downlink beam to be measured for determining a transmission power for the uplink transmission, an indication of an uplink beam, and/or an indication of an antenna panel to be used for the uplink transmission. The uplink transmission may account for various delays such as an antenna panel activation delay. Various examples described herein may enable efficient control signaling and/or accurate transmission power determination for a random access procedure.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 1A and FIG. 1B show example communication networks.

FIG. 12A shows examples of downlink beam management procedures.

FIG. 12B shows examples of uplink beam management procedures.

FIG. 16A, FIG. 16B, FIG. 16C, and FIG. 16D show examples of uplink and downlink signal transmission.

FIG. 17 shows an example of a transmission configuration indication.

DETAILED DESCRIPTION

Figure 2A:
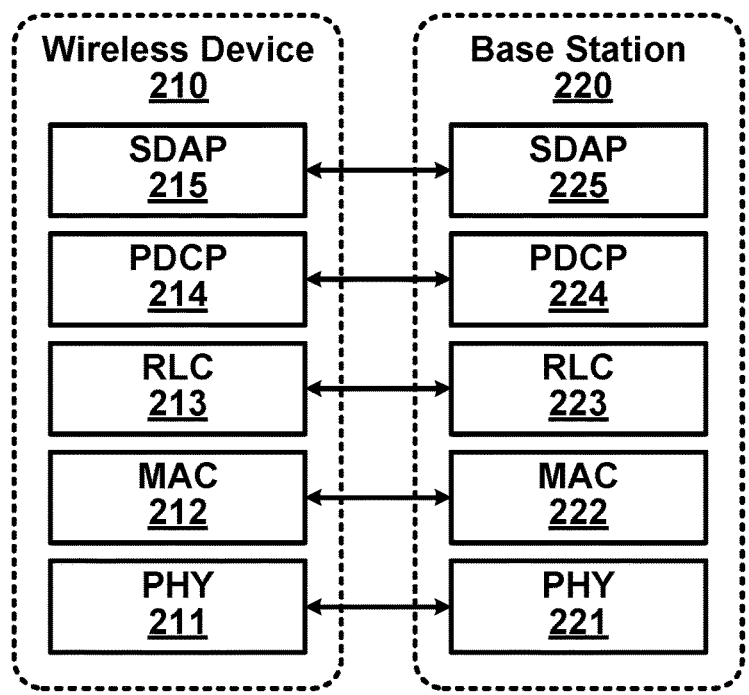
FIG. 2A shows an example user plane.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to random access procedures.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2B:
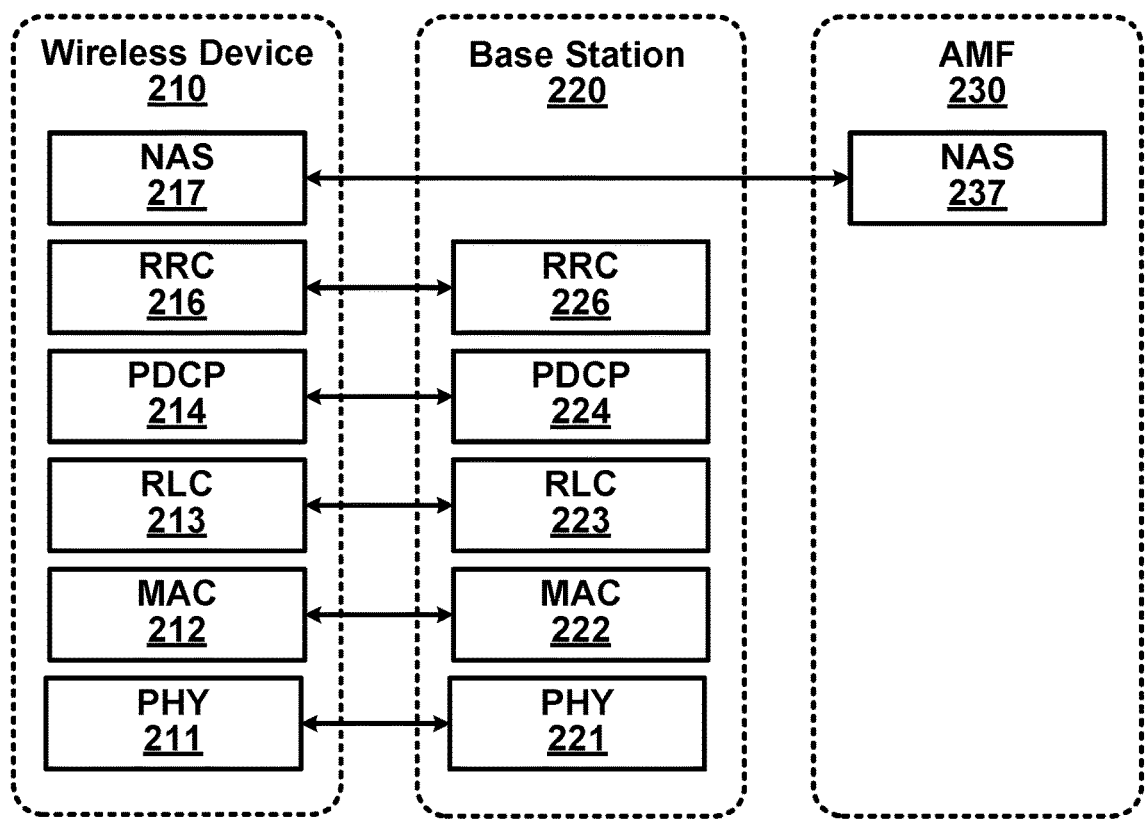
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
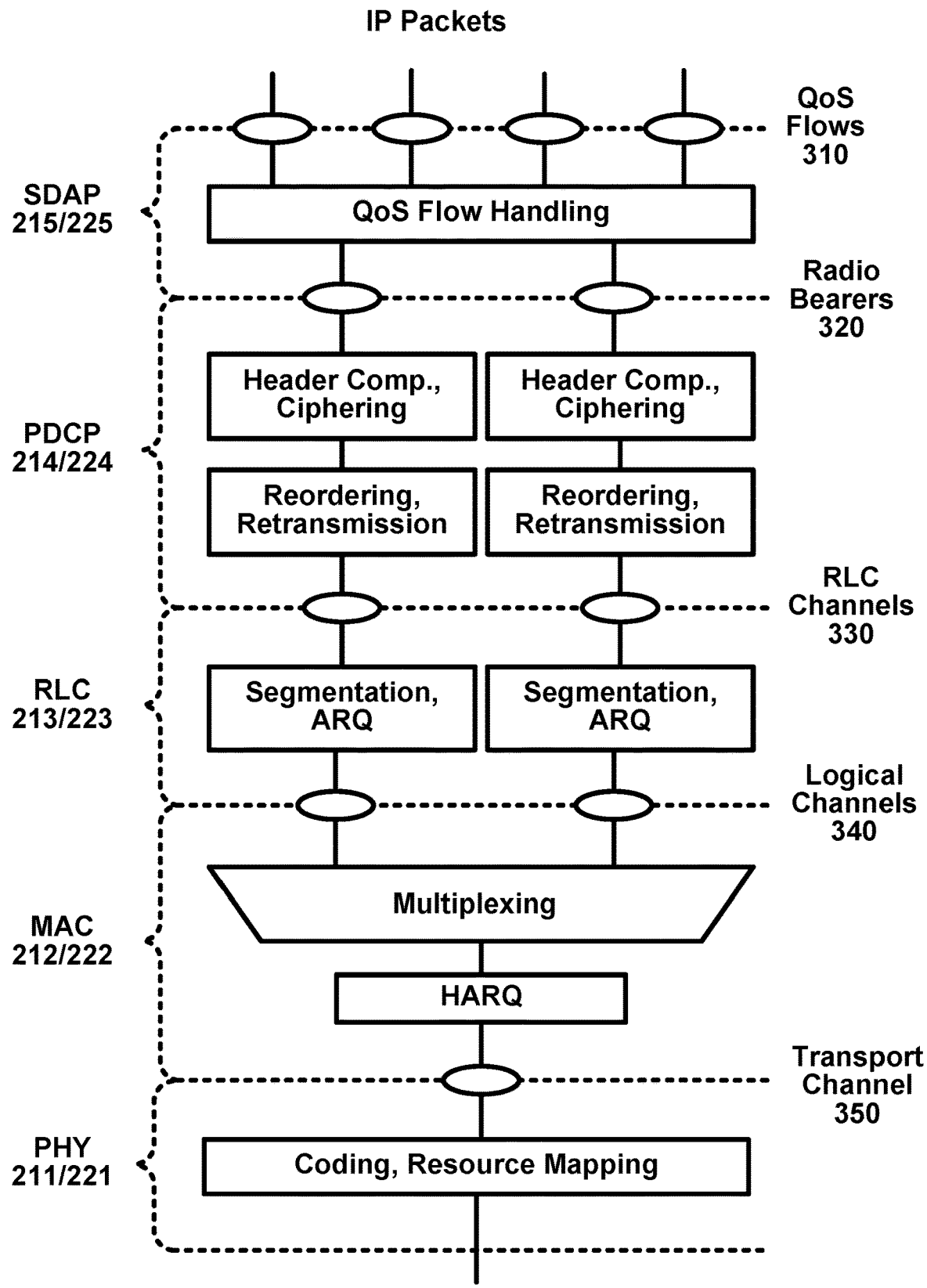
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted over the air interface, ciphering/deciphering to prevent unauthorized decoding of data transmitted over the air interface, and/or integrity protection (e.g., to ensure control messages originate from intended sources).

The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222)

may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figure 4A:
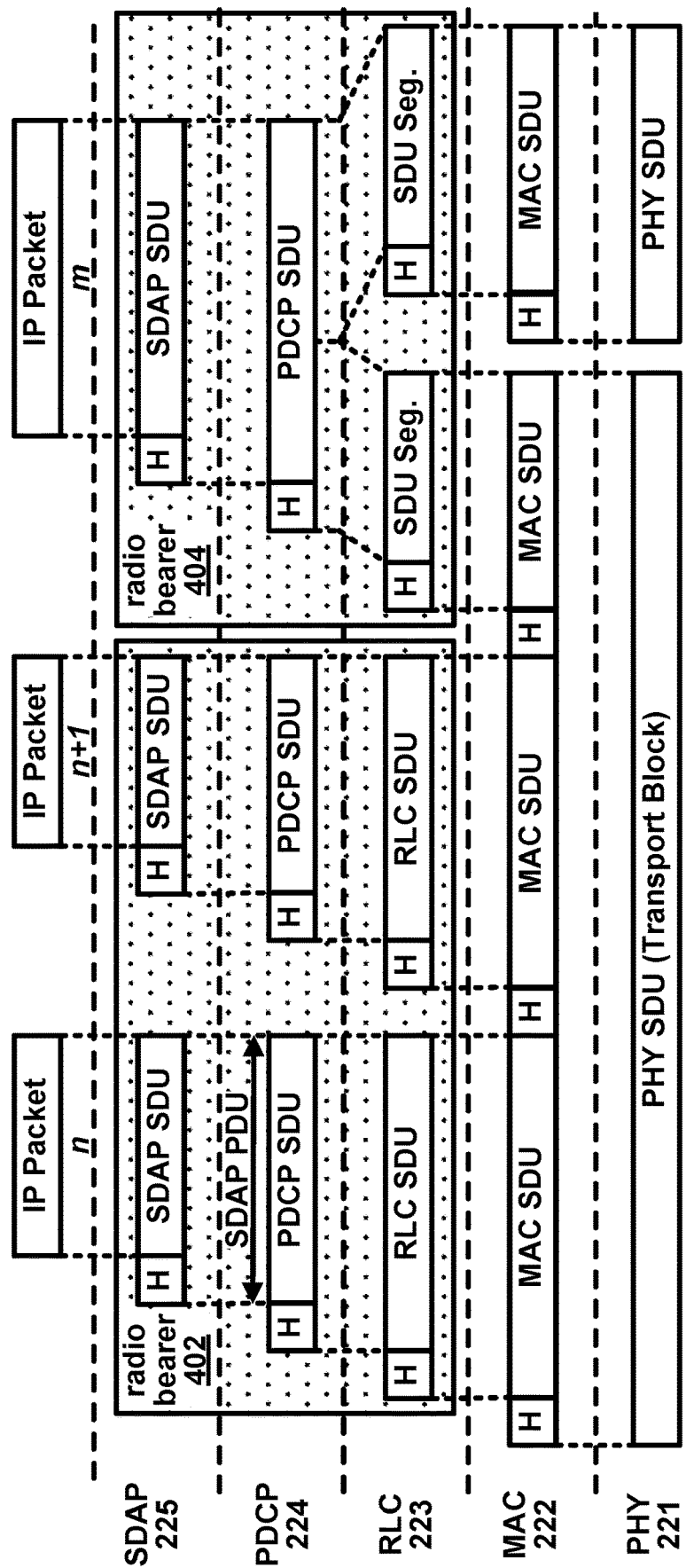
FIG. 4A shows an example downlink data flow for a user plane configuration.

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

Figure 4B:
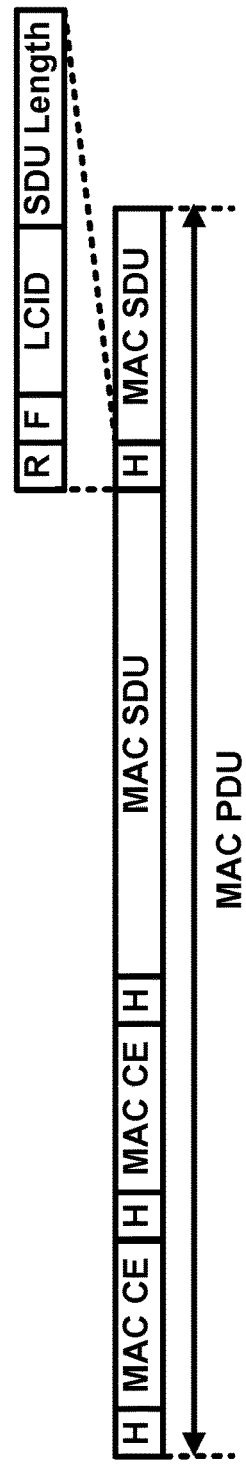
FIG. 4B shows an example format of a Medium Access Control (MAC) subheader in a MAC Protocol Data Unit (PDU).

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 212 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

Figure 5B:
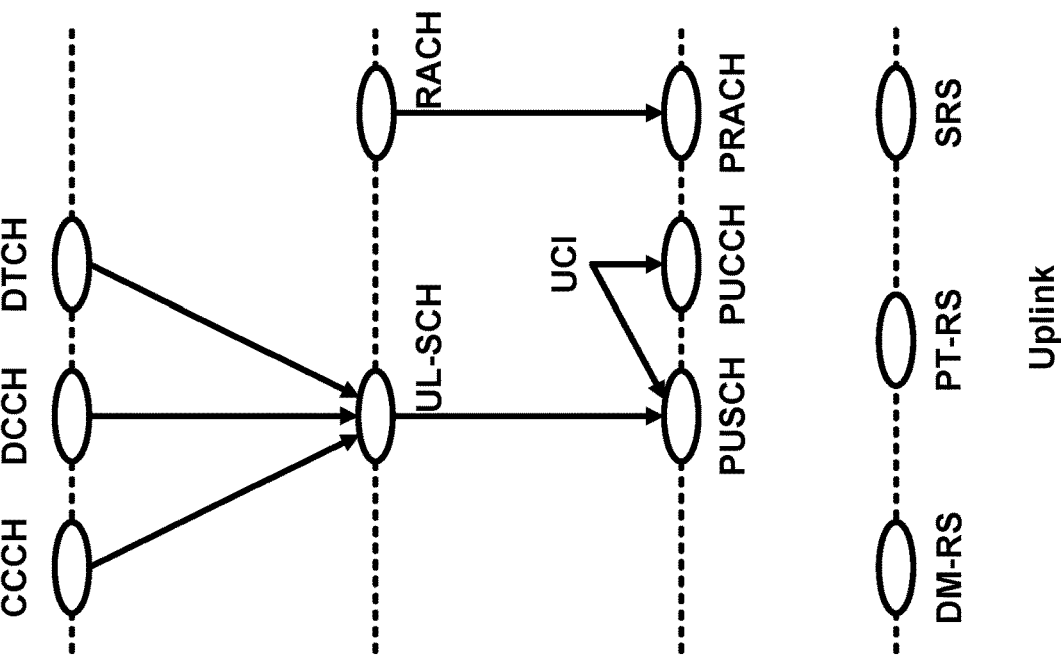
FIG. 5B shows an example mapping for uplink channels.
Figure 5A:
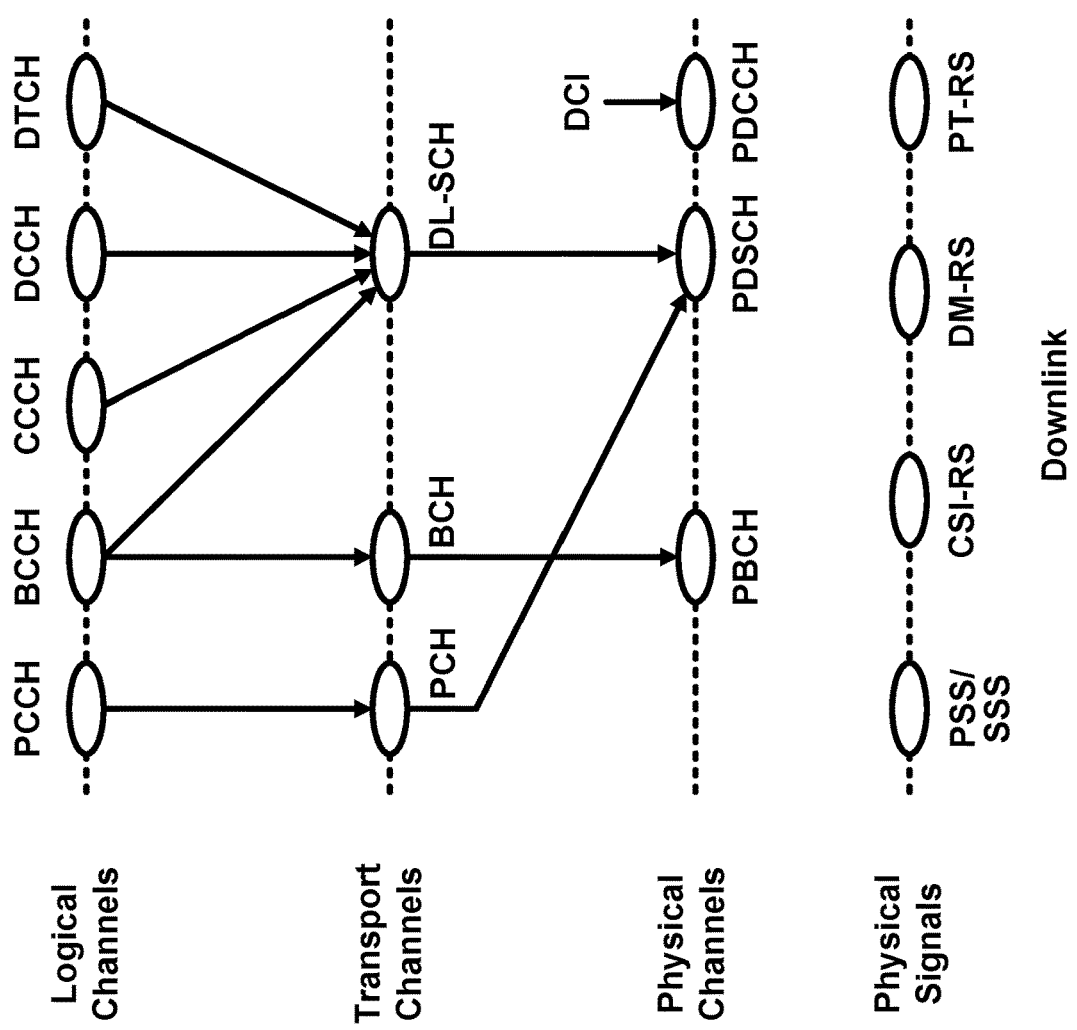
FIG. 5A shows an example mapping for downlink channels.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
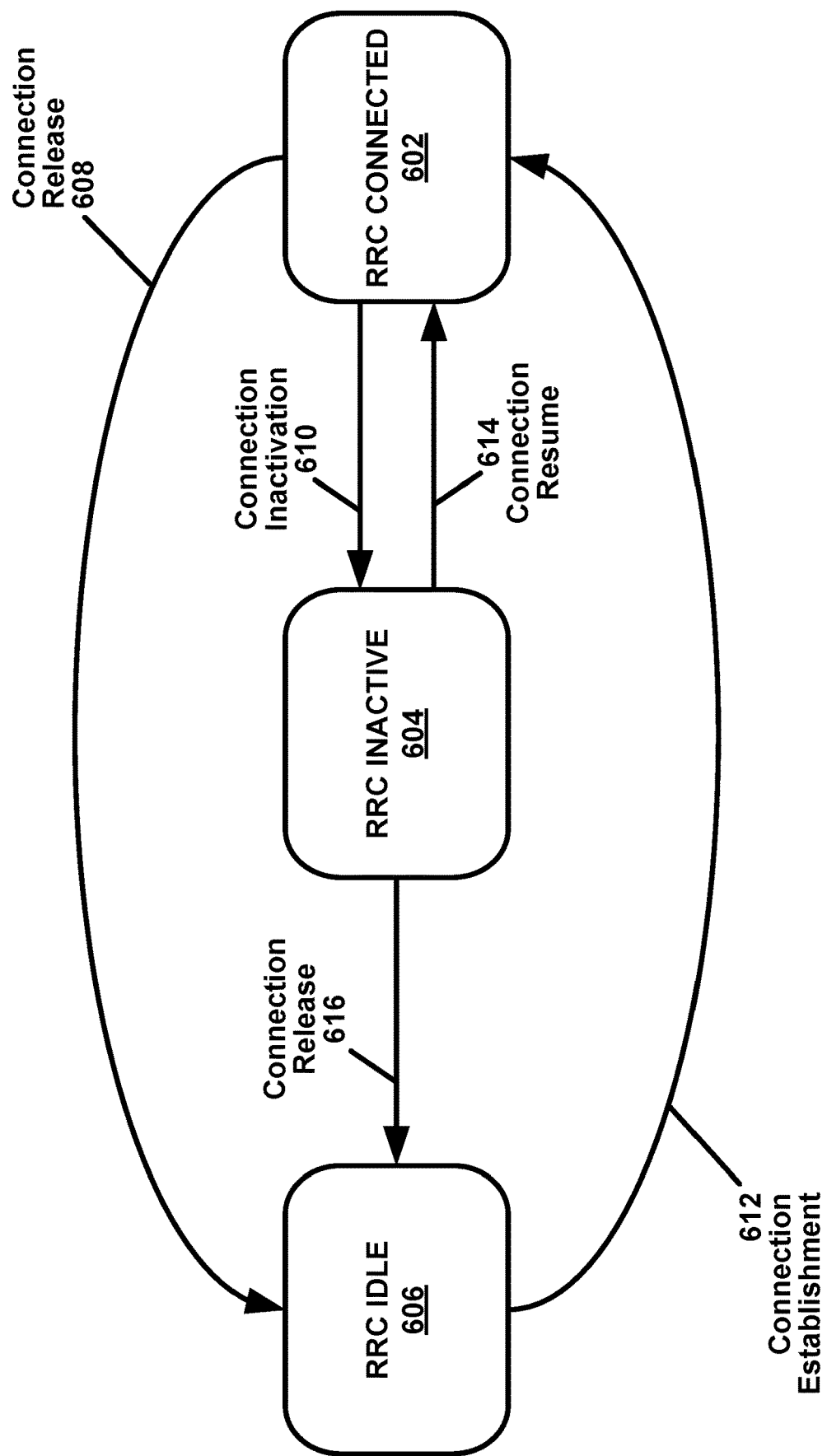
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., once in every discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
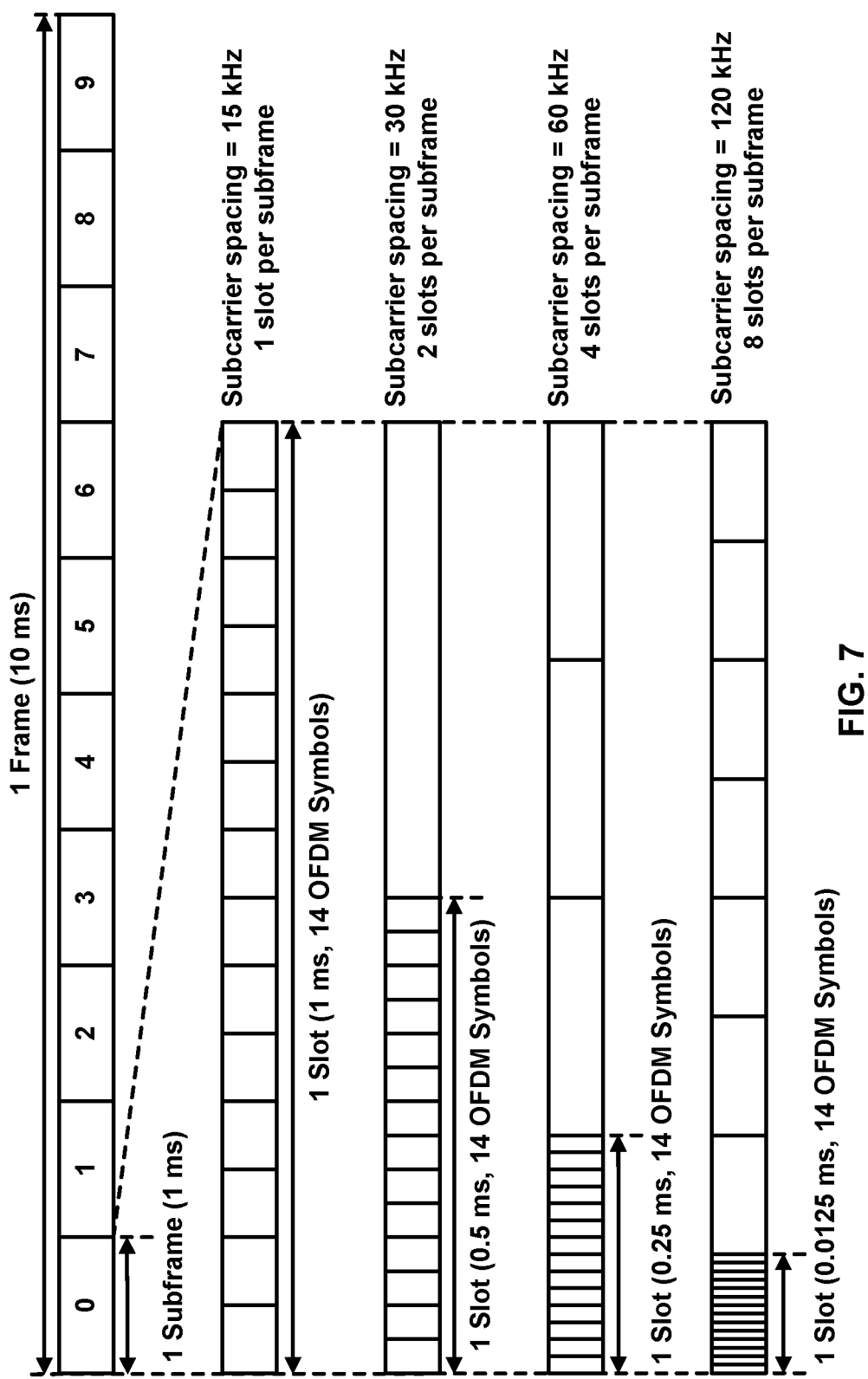
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 µs, for example, for a numerology in an NR configuration or any other radio configurations. Numerologies may be defined with the following subcarrier spacing/cyclic prefix duration combinations: 15 kHz/4.7 µs; 30 kHz/2.3 µs; 60 kHz/1.2 µs; 120 kHz/0.59 µs; 240 kHz/0.29 µs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
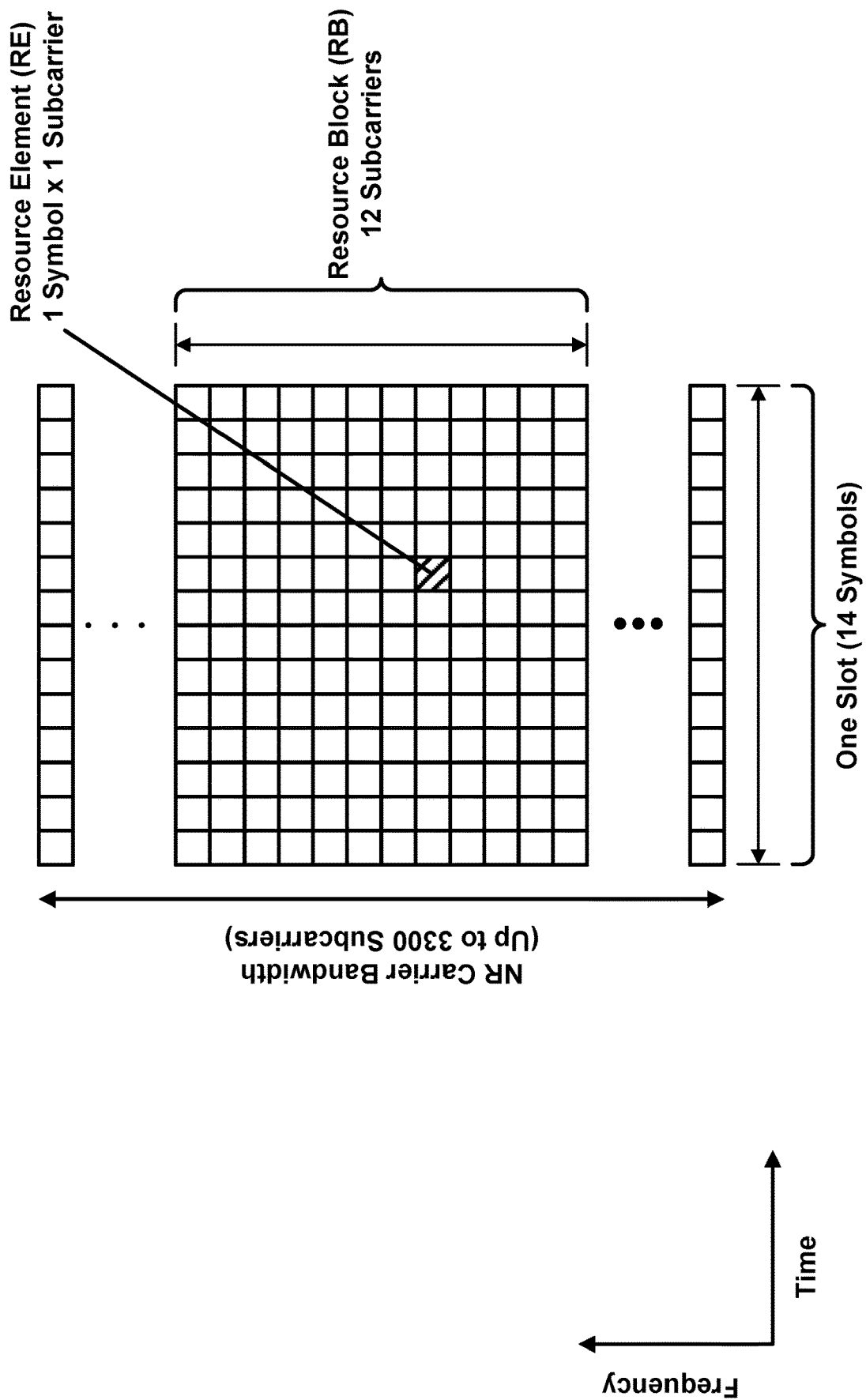
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESTS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, after or in response to receiving DCI indicating the second BWP as an active BWP. A wireless device may switch an active BWP from a first BWP to a second BWP, for example, after or in response to an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
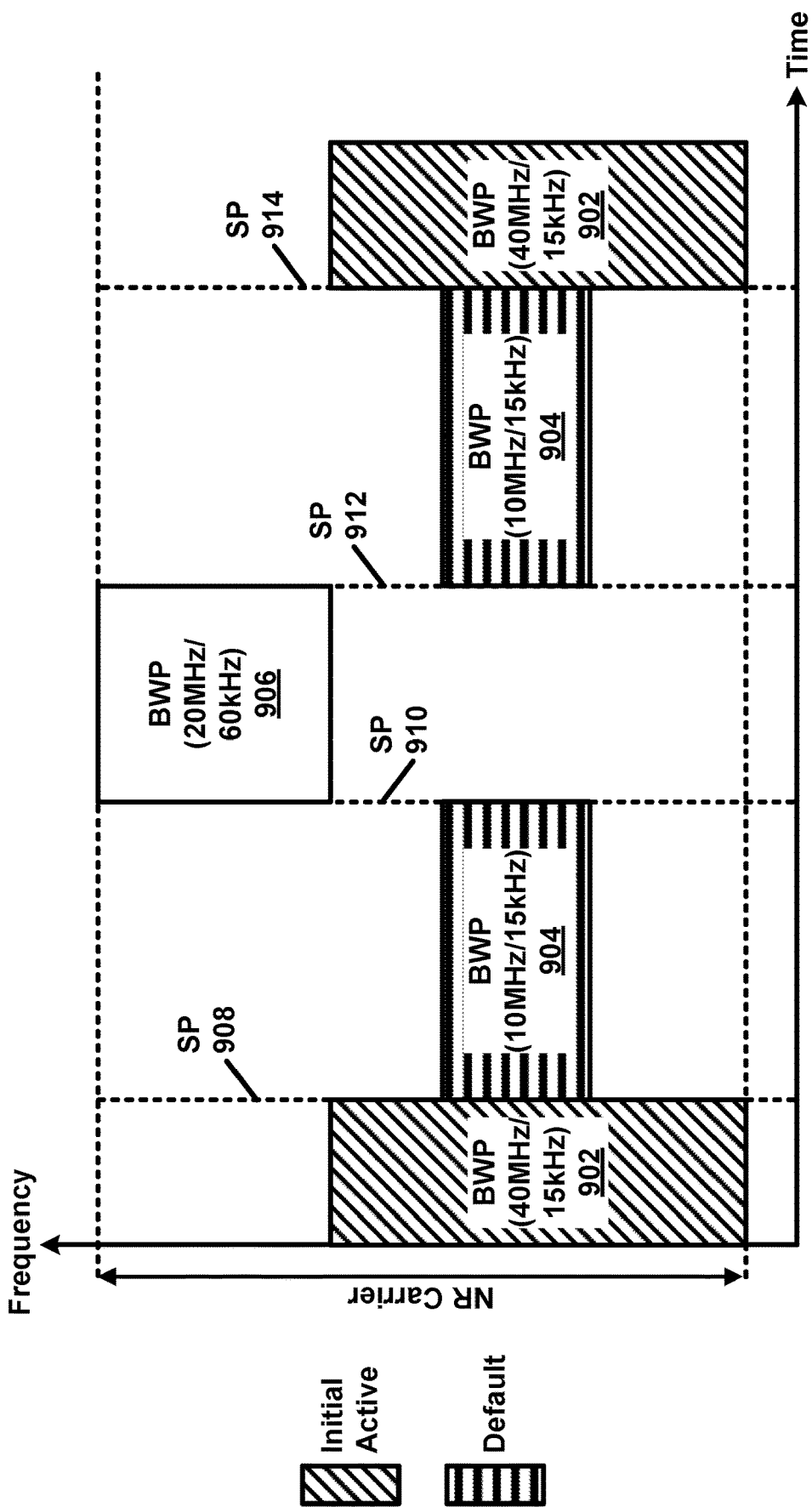
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, after or in response to an expiry of a BWP inactivity timer (e.g., indicating switching to the default BWP). The switching at the switching point 908 may occur, for example, after or in response to receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, after or in response to an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
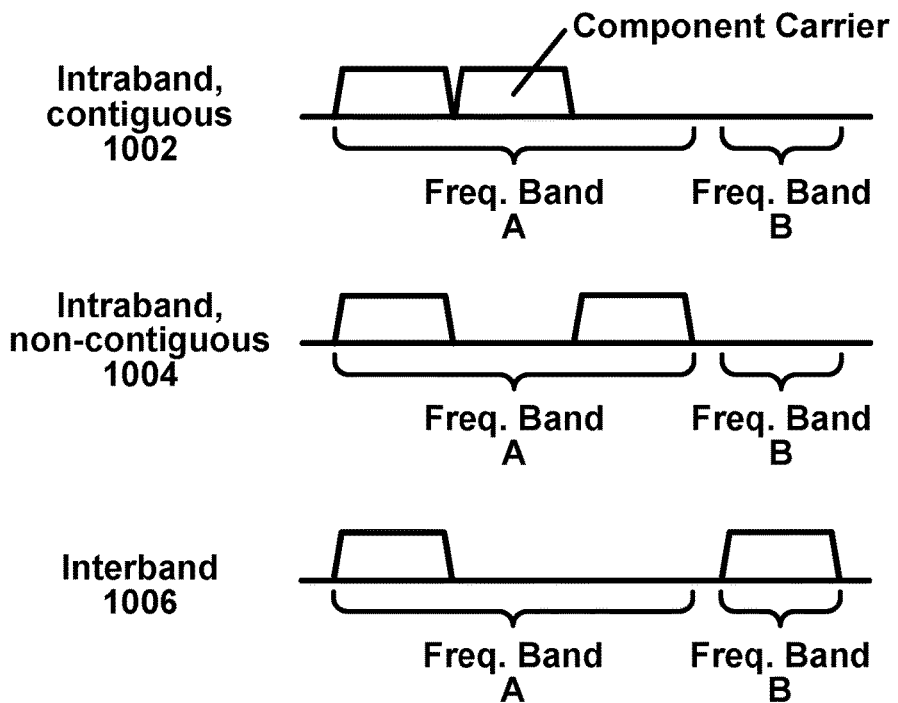
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, after or in response to an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
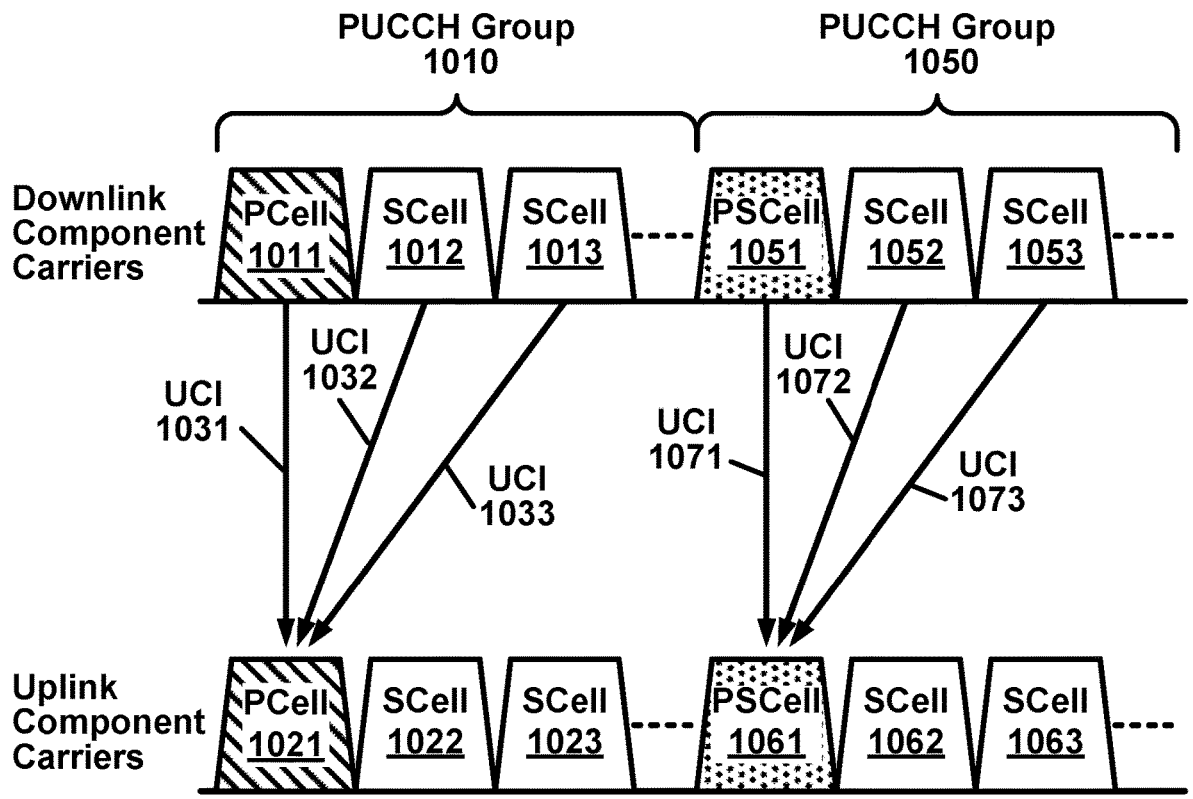
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
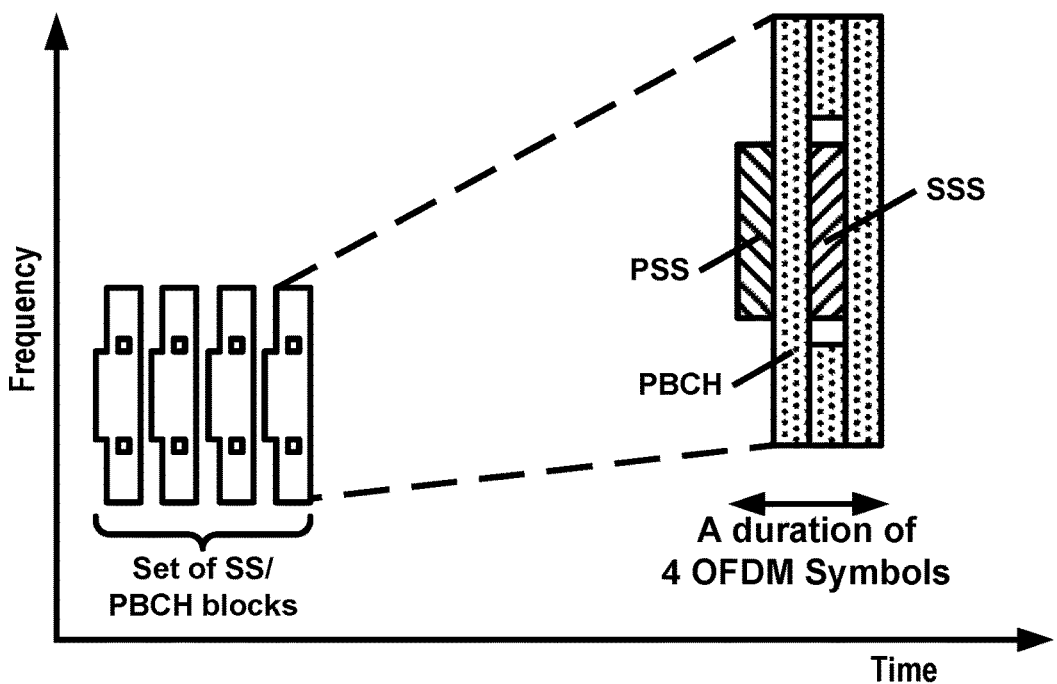
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
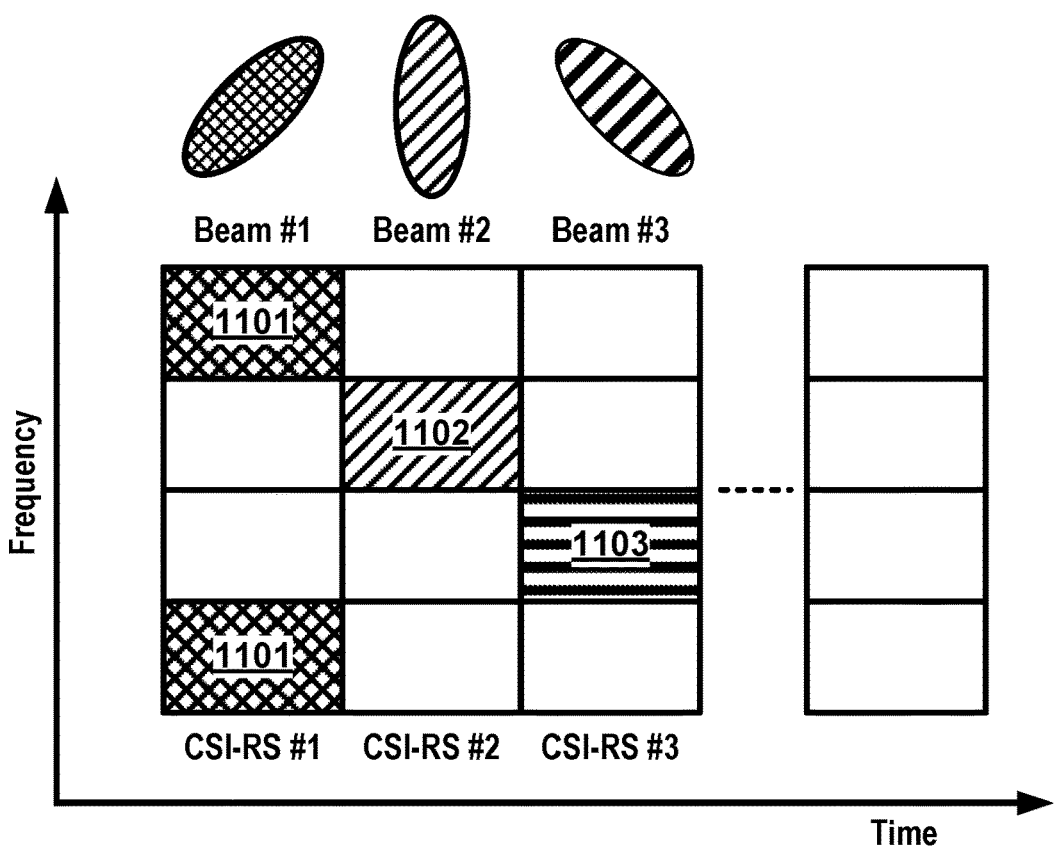
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the UE uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

Figure 13C:
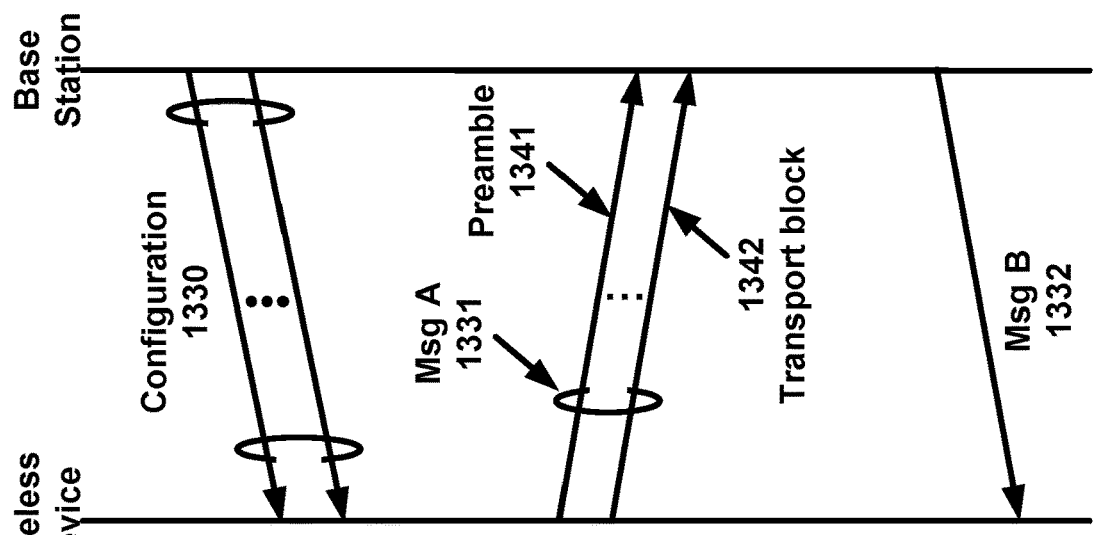
FIG. 13C shows an example two-step random access procedure.
Figure 13B:
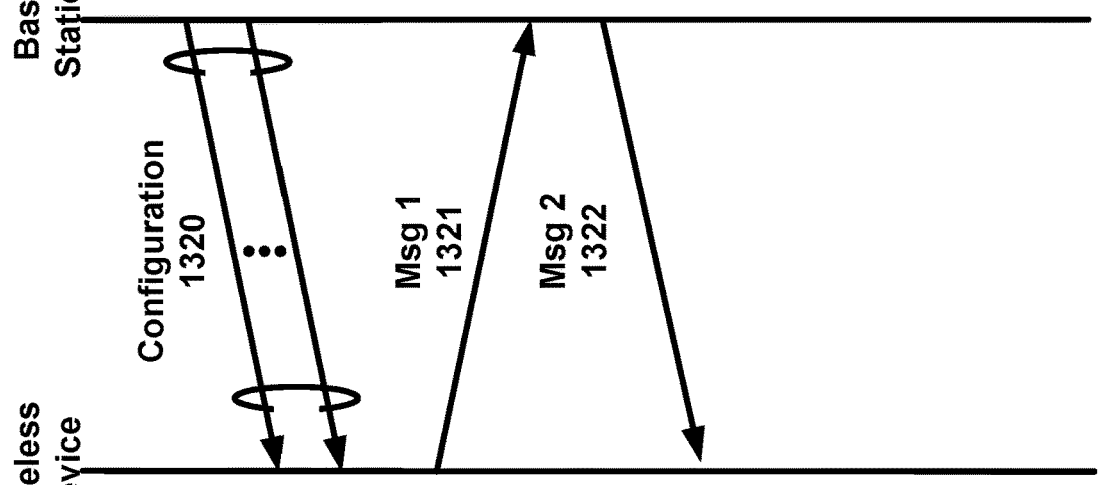
FIG. 13B shows an example two-step random access procedure.
Figure 13A:
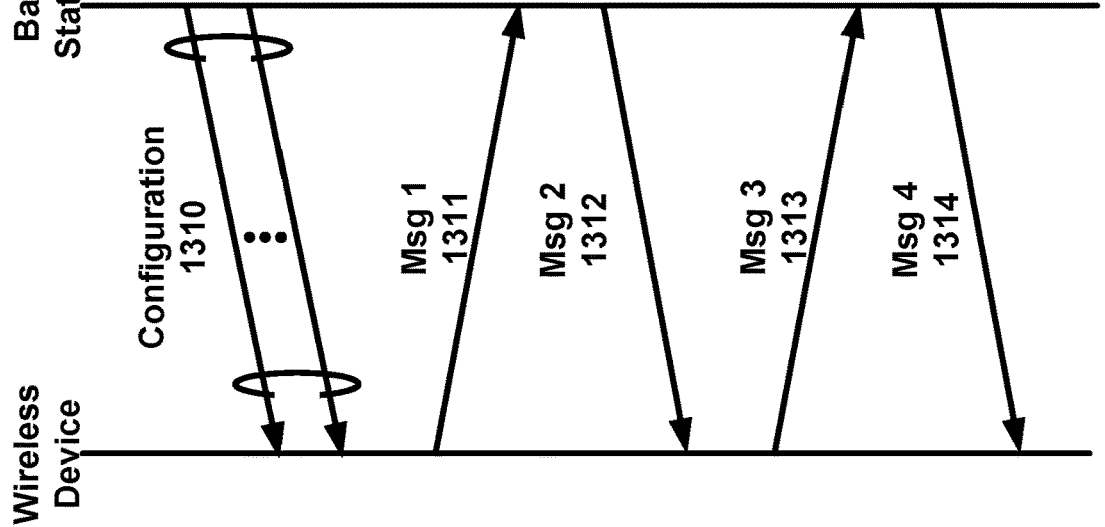
FIG. 13A shows an example four-step random access procedure.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device.

The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received after or in response to a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, after or in response to the transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, after or in response to a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, after or in response to the transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, after or in response to sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after transmitting a beam failure recovery request (e.g., the window may start any quantity of symbols and/or slots after transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, after or in response to transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1331 may be sent/transmitted in an uplink transmission by the wireless device. Msg A 1331 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, after or in response to transmitting the first message (e.g., Msg A 1331). The second message (e.g., Msg B 1332) may comprise contents that are similar and/or equivalent to the contents of the second message (e.g., Msg 2 1312) (e.g., an RAR shown in FIGS. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
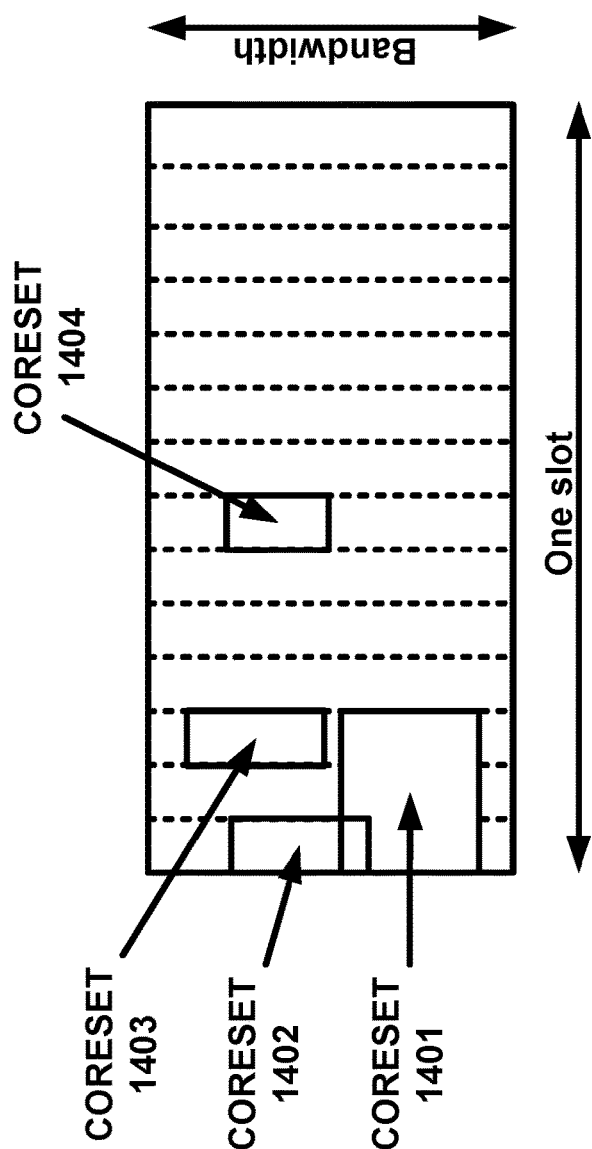
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
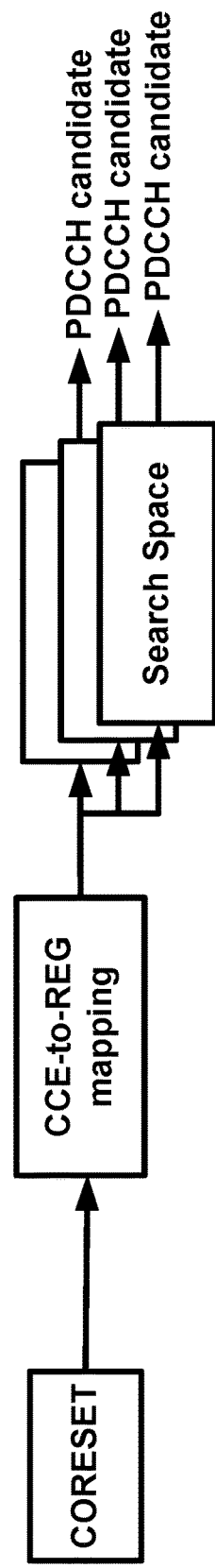
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, after or in response to CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The may send/transmit uplink control signaling (e.g., UCI) to a base station. The uplink control signaling may comprise HARQ acknowledgements for received DL-SCH transport blocks. The wireless device may send/transmit the HARQ acknowledgements, for example, after or in response to receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
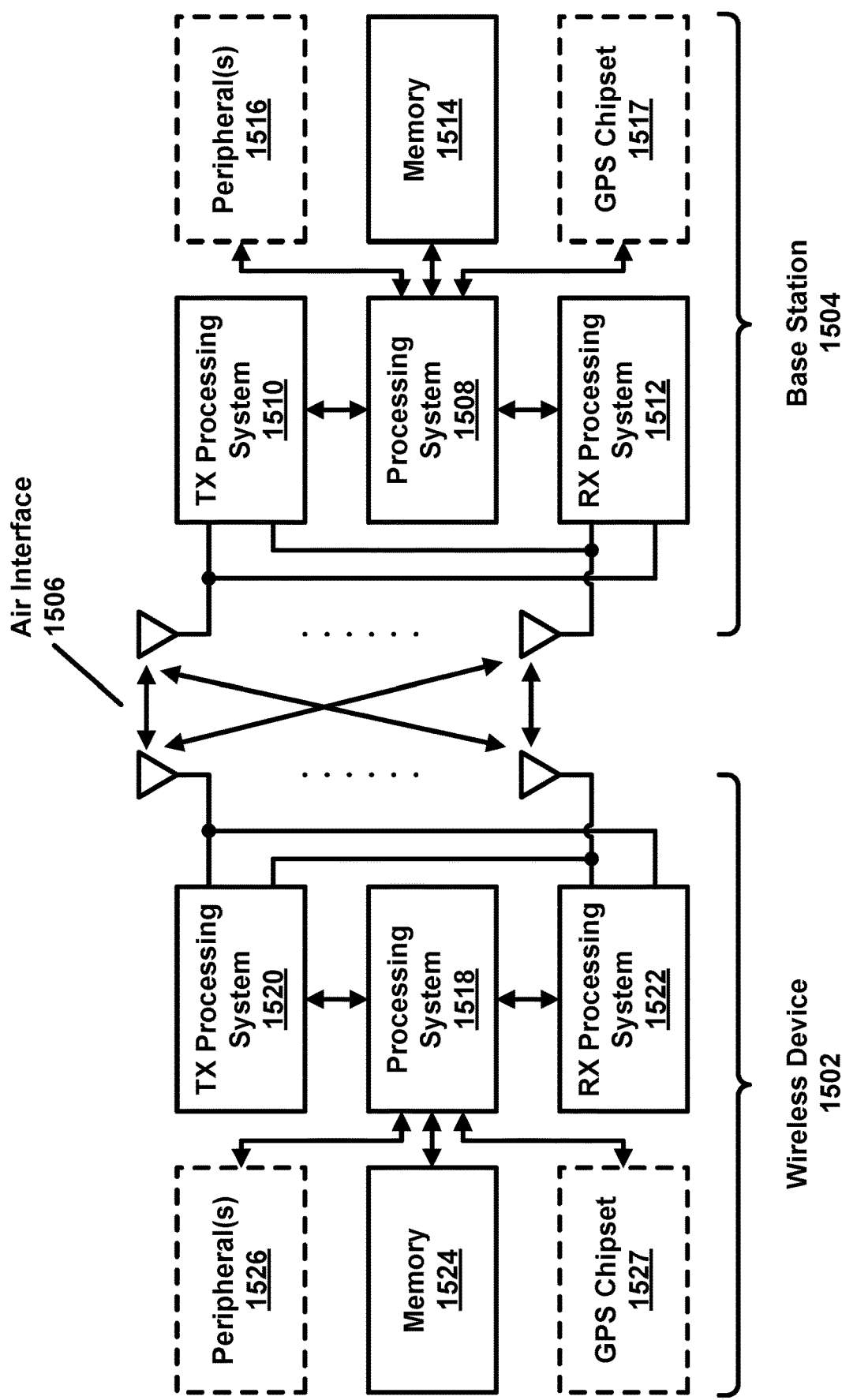
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
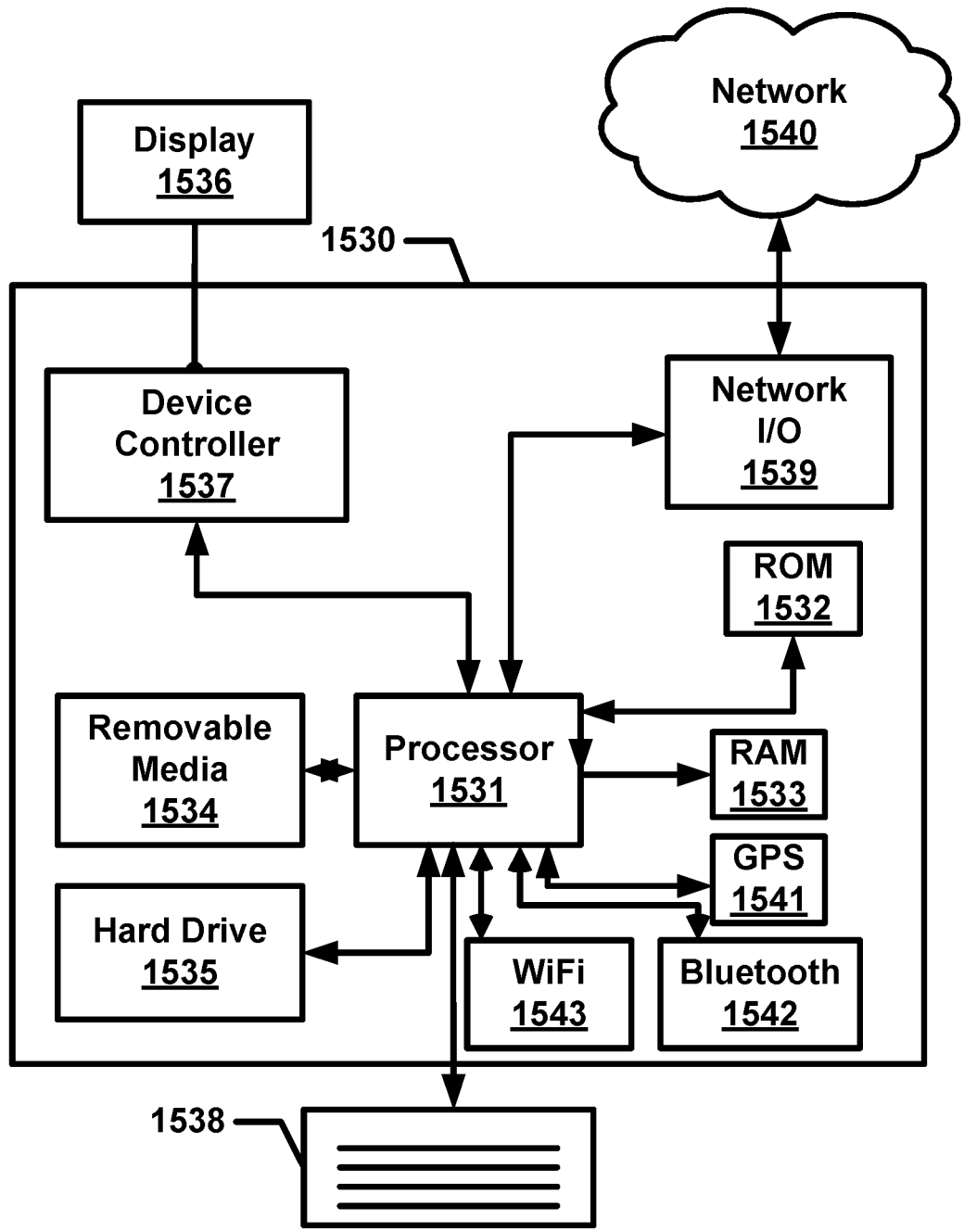
FIG. 15B shows example elements of a computing device that may be used to implement any of the various devices described herein

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, once it is started and continue running until it is stopped or until it expires. A timer may be started, for example, if it is not running or restarted if it is running A timer may be associated with a value (e.g., the timer may be started or restarted from a value or may be started from zero and expire once it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

A base station may initiate a random access procedure for a cell (e.g., PCell, SCell). The base station may initiate the random access procedure by sending/transmitting a message (e.g., an order) to a wireless device. The order may request transmission of a random access preamble by the wireless device. The order may be sent via a downlink channel (e.g., a PDCCH). An order sent via a PDCCH may be referred as a PDCCH order. While the message for initiating the random access procedure is referred to herein as a PDCCH order, it may be understood that other messages may be used by the base station for initiating the random access procedure in various examples described herein.

The wireless device may receive (e.g., from a base station), a PDCCH order for initiating the random access procedure for the cell. The random access procedure may be a contention-free random access procedure or a contention-based random access procedure. The wireless device may receive the PDCCH order via a CORESET of the cell.

The base station may configure (e.g., via RRC messaging) the CORESET with a TCI state. The TCI state may indicate a downlink reference signal (e.g., CSI-RS, SSB) associated with a downlink beam. The base station may activate (e.g., by sending a MAC CE) the CORESET with the TCI state indicating the downlink reference signal (e.g., CSI-RS, SSB). The wireless device may receive a downlink signal (e.g., DCI, PDCCH transmission, a PDCCH order) via the CORESET based on the downlink reference signal (e.g., via the downlink beam). DM-RS ports of the downlink signal (e.g., DCI, PDCCH transmission, PDCCH order) received via the CORESET may be quasi co-located with the downlink reference signal.

The wireless device may send/transmit a random access preamble (e.g., Msg 1 1311, Msg 1 1321, preamble 1341) for the random access procedure, for example, based on the receiving a PDCCH order. The wireless device may transmit the random access preamble via a resource indicated by the PDCCH order. The wireless device may transmit the random access preamble using a transmission power. The wireless device may calculate/determine the transmission power based on the downlink reference signal indicated in the TCI state of the CORESET (e.g., via which the PDCCH order is received). The wireless device may measure characteristics (e.g., RSRP, SINR) associated with the downlink reference signal to determine a pathloss estimate. The wireless device may use the pathloss estimate to determine the transmission power.

Beam management in a wireless network may comprise determination (e.g., at a base station, at a wireless device, etc.) of an uplink beam and/or a downlink beam. The wireless device and/or the base station may support beam correspondence (e.g., a downlink beam and an uplink beam have same/substantially similar channel characteristics, or are aligned/substantially aligned). The beam correspondence may enable a base station to determine a downlink beam based on measurements associated with uplink reference signals as determined by the base station. A downlink signal (e.g., DCI, PDCCH transmission, PDCCH order) may be used to trigger a transmission of an uplink reference signal from the wireless device. The downlink signal may be sent via a CORESET. A TCI state of the CORESET may indicate an uplink reference signal (e.g., an SRS) associated with an uplink beam. The wireless device may receive a PDCCH order via the CORESET with the TCI state indicating the uplink reference signal. The wireless device may send/transmit the uplink reference signal (e.g., via the uplink beam) to a base station, for example, based on receiving the PDCCH order. The uplink reference signal (e.g., as transmitted by the wireless device) may be measured at the base station for channel estimation and/or scheduling purposes. The base station may support beam correspondence and transmit downlink signals via a downlink beam determined/selected based on a measurement of the uplink reference signal at the base station.

In at least some types of wireless communications (e.g., compatible with 3GPP Release 16, earlier/later 3GPP releases or generations, and/or other access technology), a downlink signal (e.g., a PDCCH order for a random access procedure) may be sent via a CORESET associated with an uplink reference signal. The PDCCH order sent via the CORESET associated with the uplink reference signal may not be appropriate for determination of a transmission power by a wireless device (e.g., for transmission of a random access preamble). The wireless device may not be able to measure the uplink reference signal. The wireless device may not be able to measure the uplink reference signal because the uplink reference signal orginates from the wireless device itself. The wireless device may be unable to perform power calculation/determination for a random access preamble transmission, for example, if the wireless device receives the PDCCH order via a CORESET with a TCI state indicating an uplink reference signal. Calculating/determining a transmission power for the transmission of the random access preamble based on the uplink reference signal of the CORESET may result in sub-optimal/improper power control. The sub-optimal/improper power control may lead to increased interference to other cells and/or to other wireless devices. The calculated/determined transmission power may exceed the required transmission power and may result in an inefficient operation. The sub-optimal/improper power control may lead to a reduced coverage area, which may result in retransmissions of the random access preamble. Retransmissions may increase duration/latency of the random access preamble and/or power consumption at the wireless device and/or at the base station.

An enhanced procedure for calculating/determining a transmission power for a transmission (e.g., a random access preamble transmission) is described herein. The enhanced procedure may be used, for example, if a wireless device receives a message (e.g., a PDCCH order) via resources (e.g., a CORESET with a TCI state) indicating an uplink reference signal (e.g., rather than a downlink reference signal). The wireless device may determine a downlink reference signal to be used for determining a transmission power, in accordance with various examples described herein, for example, if a wireless device receives the message indicating an uplink reference signal.

The uplink reference signal indicated by the TCI state of the CORESET (via which the PDCCH order is received) may be associated with (e.g., may comprise) spatial relation information indicating a downlink reference signal. The wireless device may calculate/determine a transmission power for a random access preamble based on the downlink reference signal in the spatial relation information of the uplink reference signal. Alternatively, a base station may not send/transmit (e.g., may refrain from sending/transmitting) a PDCCH order via a CORESET with a TCI state indicating an uplink reference signal.

The wireless device may select a CORESET among a plurality of CORESETs to determine/calculate the transmission power. The base station may configure/activate the CORESET with a TCI state indicating a downlink reference signal (e.g., CSI-RS, SSB). The wireless device may calculate/determine the transmission power based on the downlink reference signal in the TCI state of the CORESET. The wireless device may measure the downlink reference signal for a pathloss estimate in the transmission power. The wireless device may select a CORESET with a lowest (or highest) CORESET indicator/index among CORESET indicators/indices of the plurality of CORESETs of the cell The wireless device may select the CORESET, among the plurality of CORESETs of the cell, associated/linked with (or comprising) a search space set for a random access procedure (e.g., indicated by higher layer parameter ra-searchspace).

The wireless device may select a pathloss reference signal (e.g., a pathloss reference RS signal) among one or more pathloss reference signals (e.g., configured for PUSCH, PUCCH, SRS) to determine/calculate the transmission power. The wireless device may select a pathloss reference signal with a lowest (or highest) pathloss reference signal indicator/index, among pathloss reference signal indicators/indices of the one or more pathloss reference signals. The wireless device may use a downlink reference signal (e.g., CSI-RS, SSB, pathloss reference signal) used in a most recent random access procedure (e.g., prior to reception of a PDCCH order via a CORESET with a TCI state indicating an uplink reference signal) to determine/calculate the transmission power. The wireless device may select a TCI state among one or more TCI states (e.g., activated for PDSCH reception) to determine/calculate the transmission power. The wireless device may calculate/determine the transmission power based on a downlink reference signal indicated by the selected TCI state. Example procedures for determination/selection of a CORESET (and/or a TCI state and/or a downlink reference signal) may enable improved power control signaling, reduced uplink overhead/retransmissions and interference, reduced wireless device and base station battery power consumption, and reduced delay/latency of random access procedure.

FIG. 17 shows an example of a TCI state information element (IE) 1700 for downlink beam management. The TCI state information element 1700 may comprise one or more higher layer parameters as shown. Information corresponding to the TCI state information element 1700 may be signaled by a base station, to a wireless device, via RRC messaging.

A base station may configure a wireless device with one or more CORESETs. The one or more CORESETs may be configured with one or more TCI states via a higher layer parameter (e.g., PDSCH-Config) for a serving cell (e.g., PCell, SCell). The base station may send, to the wireless device, an RRC message comprising the higher layer parameter (e.g., PDSCH-Config). The wireless device may detect a PDCCH transmission (e.g., DCI), via a CORESET, for the serving cell. The wireless device may use the one or more TCI states to decode a PDSCH transmission scheduled by the PDCCH transmission/DCI. The DCI may be intended for the wireless device and/or the serving cell of the wireless device.

A TCI state of the one or more TCI state may comprise one or more parameters (e.g., qcl-Type1, qcl-Type2, referenceSignal, etc). The TCI state may be indicated (e.g., identified) by a TCI state indicator/index (e.g., tci-StateId). The wireless device may use the one or more parameters in the TCI state to configure one or more quasi co-location relationships between at least one downlink reference signal (e.g., SS/PBCH block, CSI-RS) and DM-RS ports of a PDSCH. A first quasi co-location relationship, of the one or more quasi co-location relationships, may be configured by a first higher layer parameter (e.g., qcl-Type1) for a first downlink reference signal (e.g., indicated by the parameter referenceSignal) of the at least one downlink reference signal. A second quasi co-location relationship, of the one or more quasi co-location relationships, may be configured by a second higher layer parameter (e.g., qcl-Type2) for a second downlink reference signal (e.g., indicated by the parameter referenceSignal) of the at least one downlink reference signal (if configured). The wireless device may use a downlink beam indicated by the first downlink reference signal or the second downlink reference signal to receive a PDSCH transmission from the base station.

At least one quasi co-location type of the at least one downlink reference signal (e.g., the first downlink reference signal, the second downlink reference signal) may be provided to the wireless device by a higher layer parameter (e.g., qcl-Type in QCL-Info). A first QCL type (e.g., QCL-TypeA, QCL-TypeB) of a first downlink reference signal of at least two downlink reference signals and a second QCL type (e.g., QCL-TypeC, QCL-TypeD) of a second downlink reference signal of the at least two downlink reference signals may or may not be the same, for example, if at least two quasi co-location relationships, comprising the first QCL type and the second QCL type, between the at least two downlink reference signals and DM-RS ports of a PDSCH are configured. The first downlink reference signal and the second downlink reference signal may be the same. The first downlink reference signal and the second downlink reference signal may be different.

Figure 18A:
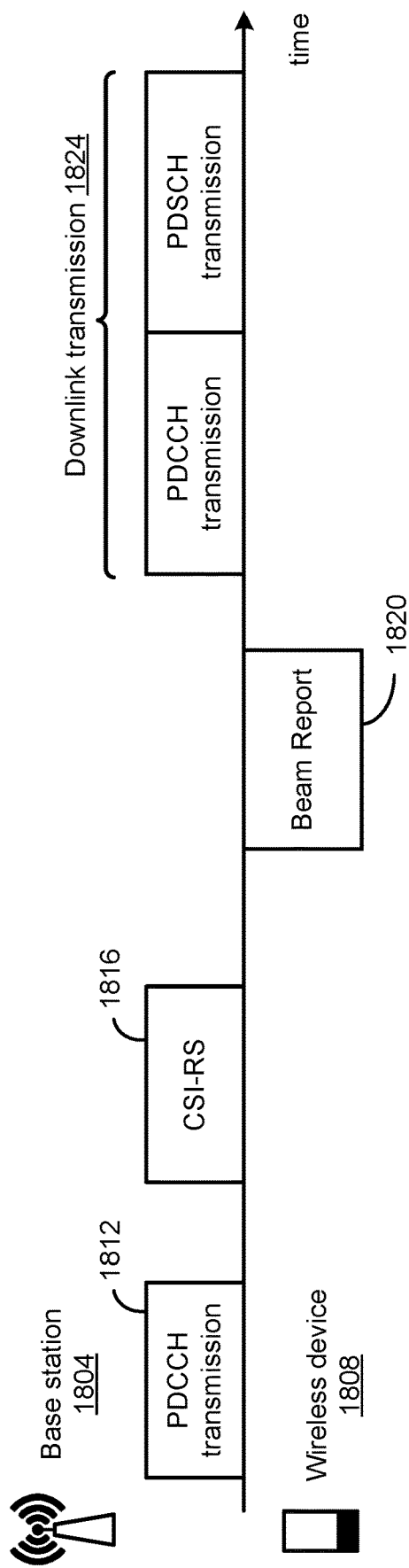
FIGS. 18A and 18B show examples of beam management for transmissions between a base station and a wireless device.
Figure 18B:
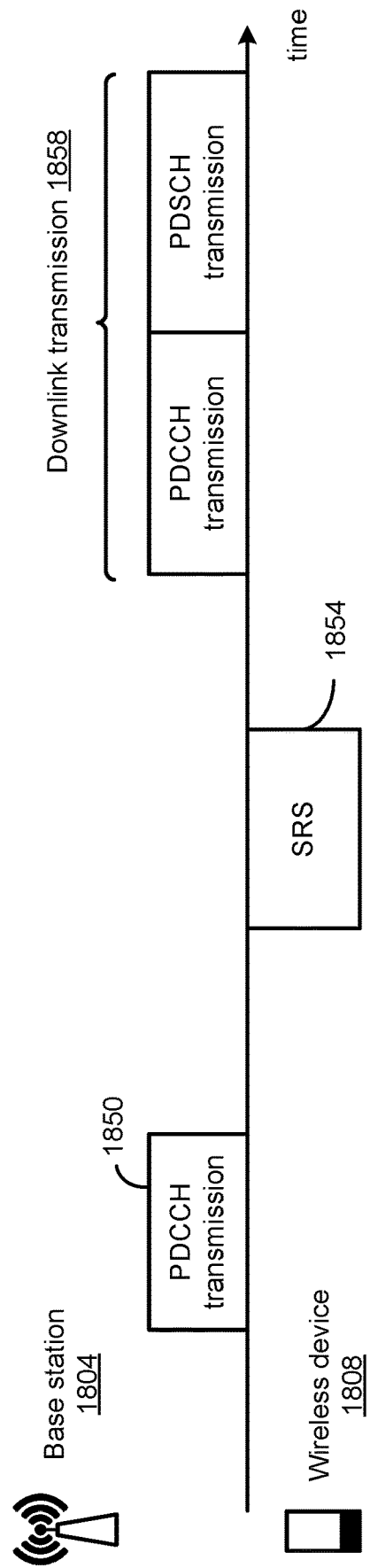

FIGS. 18A and 18B show examples of beam management for transmissions between a base station 1804 and a wireless device 1808. The base station 1804 may send/transmit, to the wireless device 1808, a PDCCH transmission, for example, to determine a downlink beam to be used for subsequent downlink transmissions.

FIG. 18A shows an example beam management based on beam reporting from the wireless device 1808. The base station 1804 may send/transmit a PDCCH transmission 1812 (e.g., DCI) via a CORESET that is associated with a downlink reference signal. The downlink reference signal may be associated with a downlink beam. The CORESET may be associated (e.g., configured) with a TCI state indicating the downlink reference signal. The downlink reference signal may correspond to a CSI-RS. The base station 1804 may send/transmit a CSI-RS 1816 via the downlink beam. The wireless device 1808 may determine/measure a signal quality (e.g., an RSRP, a pathloss measurement) of the received CSI-RS 1816 to determine a quality of the downlink beam. The wireless device 1808 may send/transmit, to the base station 1804, a beam report 1820 indicating measurements associated with the received CSI-RS 1816. The wireless device 1808 and the base station 1804 may exchange one or more messages corresponding to one or more downlink reference signals (e.g., associated with different beams) to determine signal qualities associated with the one or more downlink reference signals. The base station 1804 may select a downlink beam based on the determined signal qualities. The base station 1804 may select, for a downlink transmission 1824, a downlink beam that corresponds to a best received quality at the wireless device 1808. The downlink transmission 1824 may comprise a PDCCH transmission and/or a PDSCH transmission.

Signaling overhead for beam management may be reduced if beam correspondence between a downlink beam and an uplink beam is present. FIG. 18B shows an example beam management based on a reference signal sent by the wireless device 1808. The base station 1804 may send/transmit a PDCCH transmission 1850 (e.g., DCI) via a CORESET that is associated with an uplink reference signal (e.g., an SRS). The uplink reference signal may be associated with an uplink beam. The CORESET may be associated (e.g., configured) with a TCI state indicating the uplink reference signal. The wireless device 1808 may send/transmit, to the base station 1804, an SRS 1854, for example, based on receiving the PDCCH transmission 1850. The SRS 1854 may be sent via the uplink beam. The base station 1804 may determine/measure a signal quality (e.g., an RSRP, a pathloss measurement) of the received SRS 1854 to determine a quality of the uplink beam. The wireless device 1808 and the base station 1804 may exchange one or more messages corresponding to one or more uplink reference signals (e.g., associated with different beams) to determine signal qualities associated with the one or more uplink reference signals. The base station 1804 may select an uplink beam based on the determined signal qualities that corresponds to a best received quality at the base station 1804. The base station 1804 may determine a downlink beam corresponding to the selected uplink beam for the downlink transmission 1858. The downlink transmission 1858 may comprise a PDCCH transmission and/or a PDSCH transmission.

As shown in FIG. 18B, the base station 1804 may directly determine downlink beam based on uplink SRS transmissions from the wireless device 1808. The wireless device 1808 need not transmit a beam report to the base station 1804 indicating measurements associated with a downlink reference signal (e.g., as shown in FIG. 18A). Enabling SRS transmissions for beam management reduces signaling overhead in the wireless network, reduces power consumption at the wireless device 1808 (e.g., the wireless device 1808 need not measure downlink reference signals and determine a beam report as shown in FIG. 18A), and/or reduces power consumption at the base station 1804 (e.g., the base station 1804 need not transmit a CSI-RS as shown in FIG. 18A).

As described with reference to FIG. 18B, there may be scenarios in which it may be advantageous for a base station to send a PDCCH transmission via a CORESET that is associated with an uplink reference signal (e.g., SRS). As described herein, a PDCCH transmission (e.g., a PDCCH order) triggering a transmission of a random access preamble in a random access procedure may require the wireless device to measure a downlink reference signal associated with a CORESET (via which the PDCCH order is transmitted). Various examples described herein facilitate a use of a CORESET that is associated with an uplink reference signal for transmission of a PDCCH order to initiate a random access procedure. Various examples described herein enable the wireless device to determine a transmission power for a random access preamble even if the PDCCH order (triggering the random access preamble) is via a CORESET that is associated with an uplink reference signal.

Figure 19:
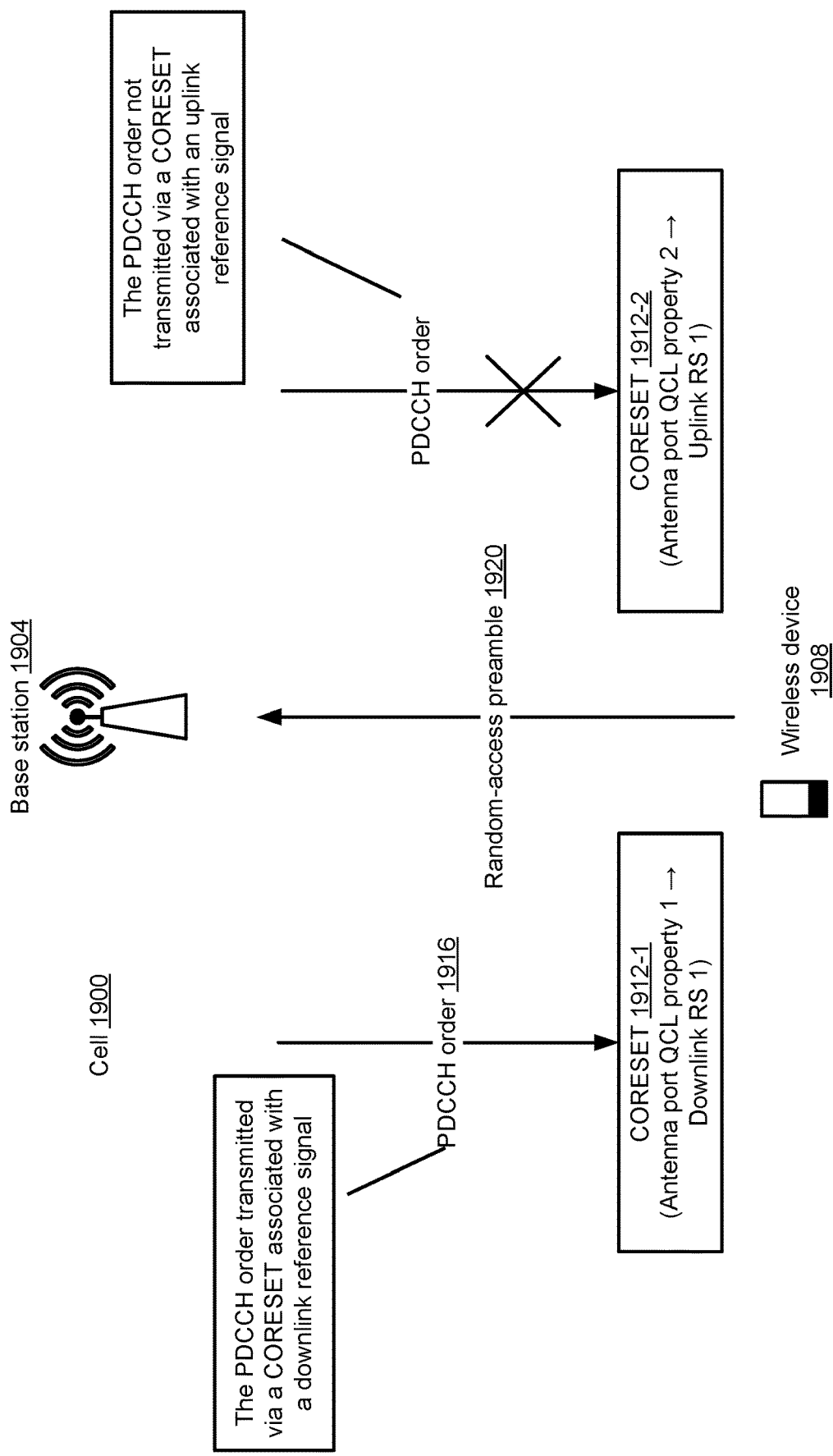
FIG. 19 shows an example random access procedure.

FIG. 19 shows an example random access procedure. A base station 1904 may configure one or more CORESETs with associated reference signals. A wireless device 1908 may use the configured CORESETs to receive downlink transmission(s) from the base station 1904. The downlink transmissions may comprise PDCCH transmissions (e.g., DCIs, PDCCH orders, etc.). The wireless device 1908 may send/transmit a random access preamble based on receiving a PDCCH transmission (e.g., a PDCCH order initiating a random access procedure). The base station 1904 may determine to send the PDCCH order via a CORESET that is associated with a downlink reference signal. The base station 1904 may determine to send the PDCCH order via a CORESET, for example, only if the CORESET is associated with a downlink reference signal. The wireless device 1908 may use the downlink reference signal for determining a transmission power of the random access preamble based on receiving the PDCCH order via the CORESET that is associated with the downlink reference signal.

The wireless device 1908 may receive one or more messages. The wireless device 1908 may receive the one or more messages from the base station 1904. The one or more messages may comprise one or more configuration parameters. The one or more configuration parameters may comprise PRACH transmission parameters (e.g., PRACH preamble format, time resources, and/or frequency resources for a PRACH transmission). The one or more configuration parameters may be for a cell (e.g., cell 1900). The PRACH transmission parameters may be (e.g., configured/indicated) for a PRACH transmission via/of the cell 1900. The PRACH transmission parameters may be (e.g., configured/indicated) for a random access procedure for the cell 1900. The cell 1900 may be a primary cell (PCell). The cell 1900 may be a secondary cell (SCell). The cell 1900 may be a secondary cell configured with a PUCCH (e.g., PUCCH SCell). The cell 1900 may be an unlicensed cell. The cell 1900 may be a licensed cell.

The one or more configuration parameters may indicate one or more CORESETs for the cell. The one or more CORESETs may comprise a first CORESET (e.g., CORESET 1912-1). The one or more CORESETs may comprise a second CORESET (e.g., CORESET 1912-2).

The one or more configuration parameters may indicate CORESET indicators/indices (e.g., provided by a higher layer parameter ControlResourceSetId) for the one or more CORESETs. Each CORESET of the one or more CORESETs may be indicated/identified by a respective CORESET indicator/index of the CORESET indicators/indices. The first CORESET 1912-1 may be indicated/identified by a first CORESET indicator/index of the CORESET indicators/indices. The second CORESET 1912-2 may be indicated/identified by a second CORESET indicator/index of the CORESET indicators/indices.

The wireless device 1908 may monitor, for DCI(s), PDCCH(s) via the one or more CORESETs. The wireless device 1908 may monitor the PDCCH(s) based on one or more antenna port quasi co-location properties (e.g., DM-RS antenna port quasi co-location property, for example antenna port QCL property 1, antenna port QCL property 2, as shown in FIG. 19). The one or more antenna port quasi co-location properties may comprise one or more TCI states. The wireless device 1908 may receive/detect PDCCH(s) transmissions comprising the DCI(s), via the one or more CORESETs, based on the one or more antenna port quasi co-location properties. The wireless device 1908 may receive/detect a PDCCH transmission comprising DCI, via each CORESET of the one or more CORESETs, based on a respective antenna port quasi co-location property of the one or more antenna port quasi co-location properties. A CORESET of the one or more CORESETs may be associated/configured with an antenna port quasi co-location property of the one or more antenna port quasi co-location properties. The CORESET being associated/configured with the antenna port quasi co-location property may comprise receiving/detecting a PDCCH transmission, via the CORESET, based the antenna port quasi co-location property. Receiving/detecting a PDCCH transmission, via a CORESET of the one or more CORESETs, based on an antenna port quasi co-location property of the one or more antenna port quasi co-location properties, may comprise that at least one DM-RS port of the PDCCH transmission is quasi co-located (QCL-ed) with a reference signal indicated by (or in) the antenna port quasi co-location property.

An antenna port quasi co-location property may comprise/indicate a reference signal (e.g., downlink RS 1 for CORESET 1912-1, uplink RS 1 for CORESET 1912-2). The antenna port quasi co-location property may comprise/indicate a reference signal indicator/index (e.g., ssb-index, csi-rs index, srs, etc) of the reference signal. Receiving/detecting a PDCCH transmission, via a CORESET based on an antenna port quasi co-location property, may comprise that the wireless device receives/detects the PDCCH transmission using a spatial receiving filter that is same as a spatial transmission (or receiving) filter used to transmit (or receive) a reference signal indicated by (or in) the antenna port quasi co-location property. The at least one DM-RS port of the PDCCH transmission may be quasi co-located with the reference signal with respect to at least one of: Doppler shift, Doppler spread, average delay, delay spread, and spatial receiving (RX) parameters. The at least one DM-RS port of the PDCCH transmission may be quasi co-located with the reference signal with respect to a quasi co-location type (e.g., QCL-TypeA, QCL-TypeB, QCL-TypeC, QCL-TypeD). The antenna port quasi co-location property may comprise/indicate the quasi co-location type. The antenna port quasi co-location property may comprise/indicate the quasi co-location type for the reference signal. The at least one DM-RS port of the PDCCH transmission may be quasi co-located with the reference signal with respect to Doppler shift, Doppler spread, average delay and delay spread, for example, if the at least one DM-RS port of the PDCCH is quasi co-located with the reference signal with respect to QCL-TypeA. The at least one DM-RS port of the PDCCH transmission may be quasi co-located with the reference signal with respect to Doppler shift and Doppler spread, for example, if the at least one DM-RS port of the PDCCH transmission is quasi co-located with the reference signal with respect to QCL-TypeB. The at least one DM-RS port of the PDCCH transmission may be quasi co-located with the reference signal with respect to Doppler shift and average delay, for example, if the at least one DM-RS port of the PDCCH transmission is quasi co-located with the reference signal with respect to QCL-TypeC. The at least one DM-RS port of the PDCCH transmission may be quasi co-located with the reference signal with respect to spatial RX parameters, for example, if the at least one DM-RS port of the PDCCH transmission is quasi co-located with the reference signal with respect to QCL-TypeD.

The base station 1904 may send the PDCCH transmission via a same beam as used for sending the reference signal, for example, if the at least one DM-RS port of the PDCCH transmission is quasi co-located with the reference signal with respect to QCL-TypeD and the reference signal is a downlink reference signal (e.g., SS/PBCH block, CSI-RS). The wireless device 1908 may receive the PDCCH transmission via a same beam as used for receiving the reference signal, for example, if the at least one DM-RS port of the PDCCH transmission is quasi co-located with the reference signal with respect to QCL-TypeD and the reference signal is a downlink reference signal (e.g., SS/PBCH block, CSI-RS).

The base station 1904 may send the PDCCH transmission via a same beam as used for receiving the reference signal, for example, if the at least one DM-RS port of the PDCCH transmission is quasi co-located with the reference signal with respect to QCL-TypeD and the reference signal is an uplink reference signal (e.g., SRS). The wireless device 1908 may receive the PDCCH transmission via a same beam as used for transmitting the reference signal, for example, if the at least one DM-RS port of the PDCCH transmission is quasi co-located with the reference signal with respect to QCL-TypeD and the reference signal is an uplink reference signal (e.g., SRS).

The wireless device 1908 may monitor, for first DCI, a first PDCCH in/via the CORESET 1912-1 based on a first antenna port quasi co-location property (e.g., antenna port QCL property 1) of the one or more antenna port quasi co-location properties. The wireless device may receive/detect a first PDCCH transmission (or monitor the first PDCCH) comprising the first DCI, via the CORESET 1912-1, based on the first antenna port quasi co-location property. The receiving/detecting the first PDCCH transmission (or monitoring the first PDCCH) in/via the CORESET 1912-1 may comprise that (e.g., the wireless device 1908 may determine that) at least one first DM-RS port of the first PDCCH transmission may be quasi co-located with a first reference signal (e.g., downlink RS 1 in FIG. 19) indicated by (or in) the first antenna port quasi co-location property. The receiving/detecting the first PDCCH transmission in/via CORESET 1912-1 may comprise that (e.g., the wireless device 1908 may determine that) at least one first DM-RS port of/for a reception of the first PDCCH transmission may be quasi co-located with a first reference signal (e.g., the downlink RS 1) indicated by (or in) the first antenna port quasi co-location property. The at least one first DM-RS port of the first PDCCH may be quasi co-located with the first reference signal with respect to a first quasi co-location type (e.g., QCL-TypeD, QCL-TypeA, or any other QCL type).

The first antenna port quasi co-location property may comprise/indicate the first quasi co-location type. The first antenna port quasi co-location property may comprise/indicate the first quasi co-location type for the first reference signal. The receiving/detecting the first PDCCH transmission (or monitoring the first PDCCH) in/via the CORESET 1912-1 may comprise that the wireless device 1908 may receive/detect the first PDCCH transmission using a spatial receiving filter that is same (or substantially same) as a spatial receiving filter used to receive the first reference signal (e.g., the downlink RS 1) indicated by (or in) the first antenna port quasi co-location property. The first CORESET 1912-1 may be associated/configured with the first antenna port quasi co-location property.

The wireless device 1908 may monitor, for second DCI, a second PDCCH in/via the CORESET 1912-2 based on a second antenna port quasi co-location property (e.g., antenna port QCL property 2) of the one or more antenna port quasi co-location properties. The wireless device 1908 may receive/detect a second PDCCH transmission (or monitor the second PDCCH) comprising the second DCI, via the second CORESET 1912-2, based on the second antenna port quasi co-location property. The receiving/detecting the second PDCCH transmission (or monitoring the second PDCCH) in/via the CORESET 1912-2 may comprise that (e.g., the wireless device 1908 may determine that) at least one second DM-RS port of the second PDCCH transmission is quasi co-located with a second reference signal (e.g., uplink RS 1 in FIG. 19) indicated by (or in) the second antenna port quasi co-location property. The receiving/detecting the second PDCCH transmission in/via the CORESET 1912-2 may comprise that (e.g., the wireless device 1908 may determine that) at least one second DM-RS port of/for a reception of the second PDCCH transmission is quasi co-located with the second reference signal (e.g., the uplink RS 1) indicated by (or in) the second antenna port quasi co-location property. The at least one second DM-RS port of the second PDCCH may be quasi co-located with the second reference signal with respect to a second quasi co-location type (e.g., QCL TypeD, QCL TypeA, or any other QCL type). The second antenna port quasi co-location property may comprise/indicate the second quasi co-location type. The second antenna port quasi co-location property may comprise/indicate the second quasi co-location type for the second reference signal. The receiving/detecting the second PDCCH transmission (or monitoring the second PDCCH) in/via the CORESET 1912-2 may comprise that the wireless device 1908 may receive/detect the second PDCCH transmission using a spatial receiving filter that is same (or substantially same) as a spatial transmission filter used to transmit the second reference signal (e.g., uplink RS 1) indicated by (or in) the second antenna port quasi co-location property. The CORESET 1912-2 may be associated/configured with the second antenna port quasi co-location property.

The first antenna port quasi co-location property and the second antenna port quasi co-location property may be same or substantially same. The first antenna port quasi co-location property and the second antenna port quasi co-location property may be different.

The one or more configuration parameters may indicate one or more TCI states for the one or more CORESETs. The one or more TCI states may provide quasi co-location relationships between downlink reference signals in a TCI state of the one or more TCI states and PDCCH DM-RS ports. The one or more TCI states may comprise one or more first TCI states for the CORESET 1912-1. The one or more TCI states may comprise one or more second TCI states for the CORESET 1912-2.

The wireless device 1908 may receive one or more MAC CEs (e.g., a TCI state indication for wireless device-specific PDCCH MAC CE) activating one or more TCI states of the one or more TCI states for the one or more CORESETs. Each of the one or more MAC CEs may activate a respective TCI state for a respective CORESET of the one or more CORESETs. The wireless device 1908 may activate/use each TCI state (of the one or more activated TCI states) for a respective CORESET (of the one or more CORESETs). The wireless device 1908 may activate/use each TCI state of the one or more activated TCI states for a (single) CORESET of the one or more CORESETs. The one or more activated TCI states may be applicable for PDCCH reception (in the one or more CORESETs) in an active downlink BWP of the cell 1900. The one or more activated TCI states may comprise a first TCI state for the CORESET 1912-1 and a second TCI state for the CORESET 1912-2.

A TCI state (e.g., each TCI state) of the one or more activated TCI states may comprise/indicate a respective antenna port quasi co-location property for a respective CORESET of the one or more CORESETs. A TCI state of the one or more activated TCI states may comprise/indicate an antenna port quasi co-location property for a CORESET among the one or more CORESETs. The TCI state and the antenna port quasi co-location property of the CORESET may be same (or substantially same). The TCI state may comprise/indicate a reference signal for the antenna port quasi co-location property of the CORESET. The TCI state may comprise/indicate the quasi co-location type for the antenna port quasi co-location property of the CORESET. The TCI state may comprise/indicate the quasi co-location type for the reference signal.

The wireless device 1908 may receive a first message (e.g., a first MAC CE, such as a TCI state indication for wireless device-specific PDCCH MAC CE) activating the first TCI state of the one or more first TCI states of the CORESET 1912-1. The first MAC CE may comprise a field indicating a first TCI state indicator/index (e.g., provided by a higher layer parameter tci-StateID) of the first TCI state. The wireless device 1908 may activate the first TCI state for the CORESET 1912-1, for example, based on the field indicating the first TCI state. The receiving/detecting first PDCCH transmission in/via the CORESET 1912-1 based on the first antenna port quasi co-location property may comprise receiving/detecting the first PDCCH transmission, in/via the CORESET 1912-1, based on the first TCI state. The receiving/detecting the first PDCCH transmission in/via the CORESET 1912-1 based on the first TCI state may comprise that (e.g., the wireless device 1908 may determine that) at least one first DM-RS port of the first PDCCH transmission is quasi co-located with the first reference signal (e.g., the downlink RS 1) indicated by (or in) the first TCI state. The at least one first DM-RS port of the first PDCCH transmission may be quasi co-located with the first reference signal with respect to a first quasi co-location type indicated by the first TCI state. The first TCI state may comprise/indicate the first antenna port quasi co-location property of the CORESET 1912-1. The first TCI state and the first antenna port quasi co-location property of the CORESET 1912-1 may be the same or substantially same. The first TCI state may comprise/indicate the first reference signal in/for the first antenna port quasi co-location property of the CORESET 1912-1. The first TCI state may comprise/indicate the first quasi co-location type in/for the first antenna port quasi co-location property of the CORESET 1912-1. The first TCI state may comprise/indicate the first quasi co-location type for the first reference signal. The receiving/detecting the first PDCCH transmission (or monitoring the first PDCCH) in/via the CORESET 1912-1 based on the first TCI state may comprise that the wireless device 1908 may receive/detect the first PDCCH transmission with a spatial receiving filter that is same as (or substantially same as) a spatial receiving filter used to receive the first reference signal (e.g., the downlink RS 1).

The wireless device 1908 may receive a second message (e.g., a second MAC CE, such as a TCI state indication for wireless device-specific PDCCH MAC CE) activating the second TCI state of the one or more second TCI states of the CORESET 1912-2. The second MAC CE may comprise a field indicating a second TCI state indicator/index of the second TCI state. The wireless device 1908 may activate the second TCI state for the CORESET 1912-2 based on the field indicating the second TCI state. The receiving/detecting the second PDCCH transmission in/via the CORESET 1912-2 based on the second antenna port quasi co-location property may comprise receiving/detecting the second PDCCH transmission, in/via the CORESET 1912-2, based on the second TCI state. The receiving/detecting the second PDCCH transmission in/via the CORESET 1912-2 state may comprise that (e.g., the wireless device 1908 may determine that) at least one second DM-RS port of the second PDCCH transmission is quasi co-located with the second reference signal (e.g., the uplink RS 1) indicated by (or in) the second TCI state. The at least one second DM-RS port of the second PDCCH transmission may be quasi co-located with the second reference signal with respect to a second quasi co-location type indicated by the second TCI state. The second TCI state may comprise/indicate the second antenna port quasi co-location property of the CORESET 1912-2. The second TCI state and the second antenna port quasi co-location property of the CORESET 1912-2 may be the same or substantially same. The second TCI state may comprise/indicate the second reference signal in/for the second antenna port quasi co-location property of the CORESET 1912-2. The second TCI state may comprise/indicate the second quasi co-location type in/for the second antenna port quasi co-location property of the CORESET 1912-2. The second TCI state may comprise/indicate the second quasi co-location type for the second reference signal. The receiving/detecting the second PDCCH transmission (or monitoring the second PDCCH) in/via the CORESET 1912-2 based on the second TCI state may comprise that the wireless device 1908 may receive/detect the second PDCCH transmission with a spatial receiving filter that is same as a spatial transmitting filter used to transmit the second reference signal (e.g., the uplink RS 1) indicated by (or in) the second TCI state.

The (activated) first TCI state may be applicable/used for receiving the first PDCCH transmission in/via the CORESET 1912-1 of an (active) downlink BWP of the cell 1900. The (activated) first TCI state being applicable/used for receiving the first PDCCH transmission in/via the CORESET 1912-1 of the (active) downlink BWP of the cell 1900 may comprise that (e.g., the wireless device 1908 may determine that) at least one first DM-RS port of the first PDCCH transmission is quasi co-located with the first reference signal (e.g., the downlink RS 1) (indicated by the first TCI state) with respect to a first quasi co-location type (e.g., QCL TypeD) (indicated by the first TCI state). The (activated) first TCI state being applicable/used for receiving the first PDCCH transmission in/via the CORESET 1912-1 may comprise that the wireless device 1908 may receive the first PDCCH transmission in/via the CORESET 1912-1 based on the first TCI state.

The (activated) second TCI state may be applicable/used for receiving the second PDCCH transmission in/via the CORESET 1912-2 of an (active) downlink BWP of the cell 1900. The (activated) second TCI state being applicable/used for receiving the second PDCCH transmission in/via the CORESET 1912-2 may comprise that (e.g., the wireless device may determine that) at least one second DM-RS port of the second PDCCH transmission is quasi co-located with the second reference signal (e.g., uplink RS 1 in FIG. 18) (indicated by the second TCI state) with respect to a second quasi co-location type (e.g., QCL TypeD) (indicated by the second TCI state). The (activated) second TCI state being applicable/used for receiving the second PDCCH transmission in/via the CORESET 1912-2 may comprise that the wireless device 1908 may receive the second PDCCH transmission in/via the CORESET 1912-2 based on the second TCI state. The (activated) second TCI state being applicable/used for receiving the second PDCCH transmission in/via the CORESET 1912-2 may comprise that the wireless device 1908 may receive/detect the second PDCCH transmission with a spatial receiving filter that is same as a spatial transmitting filter used to transmit the second reference signal (e.g., the uplink RS 1) indicated by (or in) the second TCI state.

The one or more configuration parameters may not indicate one or more TCI states for a CORESET (e.g., CORESET 1912-1, CORESET 1912-2) of the one or more CORESETs (e.g., using a higher layer parameter tci-StatesPDCCH-ToAddList and tci-StatesPDCCH-ToReleaseList). The wireless device 1908 may monitor, for DCI, a PDCCH in/via the CORESET based on an antenna port quasi co-location property (e.g., DM-RS antenna port quasi co-location property) of the one or more antenna port quasi co-location properties. The wireless device 1908 may receive a PDCCH transmission comprising the DCI in/via the CORESET based on the antenna port quasi co-location property. The receiving the PDCCH transmission in/via the CORESET based on the antenna port quasi co-location property may comprise that (e.g., the wireless device may determine that) at least one DM-RS port of the PDCCH may be quasi co-located with a reference signal (e.g., SS/PBCH block, CSI-RS). The at least one DM-RS port of the PDCCH transmission being quasi co-located with the reference signal may comprise that the at least one DM-RS port of a reception of the PDCCH transmission is quasi co-located with the reference signal. The at least one DM-RS port of the PDCCH transmission may be quasi co-located with the reference signal with respect to a quasi co-location type (e.g., QCL-TypeA, QCL-TypeD, etc). The wireless device 1908 may use/determine/identify the reference signal during a random access procedure. The wireless device may initiate the random access procedure for an initial access procedure. The random access procedure may be (initiated) for an initial access procedure. The one or more configuration parameters may not indicate one or more first TCI states for the CORESET 1912-1. The reference signal may be the first reference signal (e.g., the downlink RS 1) and the antenna port quasi co-location property may be the first antenna port quasi co-location property of the CORESET 1912-1, for example, if the CORESET is the CORESET 1912-1. The one or more configuration parameters may not indicate one or more second TCI states for the second CORESET. The reference signal may be the second reference signal (e.g., uplink RS 1) and the antenna port quasi co-location property may be the second antenna port quasi co-location property of the CORESET 1912-2, for example, if the CORESET is the CORESET 1912-2.

The one or more configuration parameters may indicate a plurality of transmission TCI states for a CORESET of the one or more CORESETs (e.g., provided by a higher layer parameter tci-StatesPDCCH-ToAddList and tci-StatesPDCCH-ToReleaseList). The one or more configuration parameters may indicate, for the CORESET, the plurality of transmission TCI states for a reconfiguration with synchronization procedure (e.g., a handover procedure). The wireless device 1908 may not receive a MAC CE (e.g., TCI state indication for wireless device-specific PDCCH MAC CE) activating a TCI state of the plurality of TCI states for the CORESET. The wireless device 1908 may monitor, for DCI, a PDCCH in/via the CORESET based on an antenna port quasi co-location property (e.g., DM-RS antenna port quasi co-location property), for example, based on receiving the one or more configuration parameters indicating the plurality of transmission TCI states and not receiving the MAC CE. The wireless device 1908 may receive a PDCCH transmission (e.g., the DCI) in/via the CORESET based on the antenna port quasi co-location property. The receiving the PDCCH transmission in/via the CORESET based on the antenna port quasi co-location property may comprise that (e.g., the wireless device 1908 may determine that) at least one DM-RS port of the PDCCH transmission is quasi co-located with a reference signal (e.g., SS/PBCH block, CSI-RS). The at least one DM-RS port of the PDCCH transmission may be quasi co-located with the reference signal with respect to a quasi co-location type (e.g., QCL-TypeA, QCL-TypeD, etc.). The wireless device 1908 may use/determine/identify the reference signal during/for a random access procedure. The random access procedure may be (initiated) for an initial access procedure. The random access procedure may be (initiated) by the reconfiguration with synchronization procedure. The reference signal may be the first reference signal (e.g., the downlink RS 1) and the antenna port quasi co-location property may be the first antenna port quasi co-location property of the CORESET 1912-1, for example, if the CORESET is the CORESET 1912-1. The reference signal may be the second reference signal (e.g., the uplink RS 1) and the antenna port quasi co-location property may be the second antenna port quasi co-location property of the CORESET 1912-2, for example, if the CORESET is the CORESET 1912-2.

The first reference signal in (or indicated by) the first antenna port quasi co-location property of the CORESET 1912-1 may be a reference signal used/determined/identified, by the wireless device 1908, during/for a random access procedure (e.g., initial access, reconfiguration with sync procedure). The second reference signal in (or indicated by) the second antenna port quasi co-location property of the CORESET 1912-2 may be a reference signal used/identified, by the wireless device 1908, during/for an random access procedure (e.g., initial access, reconfiguration with sync procedure).

The one or more configuration parameters may indicate a plurality of transmission TCI states for a CORESET (e.g., CORESET 1912-1, CORESET 1912-2) of the one or more CORESETs (e.g., provided by a higher layer parameter tci-StatesPDCCH-ToAddList and tci-StatesPDCCH-ToReleaseList). The CORESET may be indicated/identified by a CORESET indicator/index that is equal to zero. The CORESET may be indicated/identified by a CORESET indicator/index that is different from zero (e.g., non-zero). The wireless device 1908 may receive a message (e.g., a MAC CE, such as a TCI State indication for wireless device-specific PDCCH MAC CE) activating a TCI state of the plurality of TCI states for the CORESET. The TCI state may comprise/indicate a reference signal (e.g., SS/PBCH block, CSI-RS). The TCI state may comprise/indicate a quasi co-location type (e.g., QCL TypeD, QCL TypeD). The wireless device 1908 may monitor, for DCI, a PDCCH in/via the CORESET based on an antenna port quasi co-location property (e.g., DM-RS antenna port quasi co-location property), for example, based on the one or more configuration parameters indicating the plurality of transmission TCI states and receiving the MAC CE activating the TCI state. The monitoring, for the DCI, the PDCCH in/via the CORESET based on the antenna port quasi co-location property may comprise monitoring, for the DCI, the PDCCH in/via the CORESET based on the TCI state. The wireless device 1908 may receive/detect, in/via the CORESET, a PDCCH transmission (e.g., the DCI) based on the antenna port quasi co-location property. The receiving/detecting the PDCCH transmission in/via the CORESET based on the TCI state may comprise that (e.g., the wireless device 1908 may determine that) at least one DM-RS port of the PDCCH transmission is quais co-located with a reference signal indicated by (or in) the TCI state. The at least one DM-RS port of the PDCCH transmission may be quasi co-located with the reference signal with respect to a quasi co-location type indicated by the TCI state. The TCI state may comprise/indicate the antenna port quasi co-location property of the CORESET. The TCI state and the antenna port quasi co-location property of the CORESET may be the same. The TCI state may comprise/indicate the reference signal in/for the antenna port quasi co-location property of the CORESET. The TCI state may comprise/indicate the quasi co-location type in/for the antenna port quasi co-location property of the CORESET. The TCI state may comprise/indicate the quasi co-location type for the reference signal. The reference signal may be the first reference signal (e.g., the downlink RS 1), the quasi co-location type may be the first quasi co-location type, the TCI state may be the first TCI state, and the antenna port quasi co-location property may be the first antenna port quasi co-location property of the first CORESET, for example, if the CORESET is the CORESET 1912-1. The reference signal may be the second reference signal (e.g., the uplink RS 1), the quasi co-location type may be the second quasi co-location type, the TCI state may be the second TCI state and the antenna port quasi co-location property may be the second antenna port quasi co-location property of the second CORESET, for example, if the CORESET is the CORESET 1912-2.

The one or more configuration parameters may indicate a TCI state for a CORESET (e.g., CORESET 1912-1, CORESET 1912-2) of the one or more CORESETs (e.g., provided by a higher layer parameter tci-StatesPDCCH-ToAddList and tci-StatesPDCCH-ToReleaseList). The TCI state may be a single TCI state for the CORESET. A quantity/number of TCI states for the CORESET may be one. The TCI state may comprise/indicate a reference signal (e.g., SS/PBCH block, CSI-RS). The TCI state may comprise/indicate a quasi co-location type (e.g., QCL TypeD, QCL TypeD). The wireless device 1908 may monitor, for DCI, a PDCCH in/via the CORESET based on an antenna port quasi co-location property (e.g., DM-RS antenna port quasi co-location property), for example, based on the one or more configuration parameters indicating the TCI states for the CORESET. The wireless device 1908 may receive, in/via the CORESET, a PDCCH transmission (e.g., the DCI) based on the antenna port quasi co-location property. The receiving the PDCCH transmission in/via the CORESET based on the antenna port quasi co-location property may comprise that (e.g., the wireless device may determine that) at least one DM-RS port of the PDCCH transmission is quasi co-located with the reference signal indicated/configured by the TCI state. The receiving the PDCCH transmission in/via the CORESET based on the antenna port quasi co-location property may comprise that (e.g., the wireless device 1908 may determine that) at least one DM-RS port of the PDCCH transmission is quasi co-located with the reference signal indicated/configured by the TCI state with respect to the quasi co-location type indicated/configured by the TCI state.

The CORESET may be the CORESET 1912-1. The first TCI state of the CORESET 1912-1 may comprise/indicate the first antenna port quasi co-location property. The first TCI state of the CORESET 1912-1 and the first antenna port quasi co-location property may be the same. The wireless device 1908 may monitor, for first DCI, a first PDCCH in/via the CORESET 1912-1 based on the first antenna port quasi co-location property. The monitoring the first PDCCH in/via the CORESET 1912-1 based on the first antenna port quasi co-location property may comprise that the wireless device 1908 monitors, for the first DCI, the first PDCCH in/via the first CORESET 1912-1 based on the first TCI state. The first TCI state may comprise/indicate the first reference signal in/for the first antenna port quasi co-location property of the CORESET 1912-1. The first TCI state may comprise/indicate the first quasi co-location type in/for the first antenna port quasi co-location property of the CORESET 1912-1. The monitoring the first PDCCH in/via the CORESET 1912-1 based on the first TCI state may comprise that (e.g., the wireless device may determine that) at least one first DM-RS port of the first PDCCH is quasi co-located with the first reference signal indicated/configured by the first TCI state with respect to the first quasi co-location type indicated/configured by the first TCI state.

The CORESET may be the CORESET 1912-2. The second TCI state of the CORESET 1912-2 may comprise/indicate the second antenna port quasi co-location property. The second TCI state of the CORESET 1912-2 and the second antenna port quasi co-location property may be the same. The wireless device 1908 may monitor, for second DCI, a second PDCCH in/via the CORESET 1912-2 based on the second antenna port quasi co-location property. The monitoring the second PDCCH in/via the CORESET 1912-2 based on the second antenna port quasi co-location property may comprise that the wireless device 1908 monitors, for the second DCI, the second PDCCH in/via the CORESET 1912-2 based on the second TCI state. The second TCI state may comprise/indicate the second reference signal in/for the second antenna port quasi co-location property of the CORESET 1912-2. The second TCI state may comprise/indicate the second quasi co-location type in/for the second antenna port quasi co-location property of the CORESET 1912-2. The monitoring the second PDCCH in/via the CORESET 1912-2 based on the second TCI state may comprise that (e.g., the wireless device may determine that) at least one second DM-RS port of the second PDCCH is quasi co-located with the second reference signal indicated/configured by the second TCI state with respect to the second quasi co-location type indicated/configured by the second TCI state.

A CORESET, of the one or more CORESETs, may be indicated/identified with a CORESET indicator/index that is equal to zero. The wireless device 1908 may monitor, for DCI, a PDCCH in/via the CORESET based on an antenna port quasi co-location property. The wireless device 1908 may receive a PDCCH transmission comprising/including/with the DCI in/via the CORESET based on the antenna port quasi co-location property. The receiving the PDCCH transmission in/via the CORESET based on the antenna port quasi co-location property may comprise that (e.g., the wireless device may determine that) at least one DM-RS port of the PDCCH transmission may be quasi co-located with a reference signal. The wireless device 1908 may use/determine/identify the reference signal in/during a recent (or most recent or latest) random access procedure. The recent random access procedure may or may not be initiated based on receiving a PDCCH order. The wireless device 1908 may or may not initiate the recent random access procedure based on receiving a PDCCH order. The latest/recent random access procedure may or may not be initiated based on receiving a PDCCH order triggering a non-contention based random access procedure. The wireless device 1908 may or may not receive a message (e.g., a MAC CE, such as a TCI state indication for wireless device-specific PDCCH MAC CE) activating a TCI state of the plurality of TCI states for the CORESET after the recent random access procedure. The at least one DM-RS port of the PDCCH transmission via the CORESET may be quasi co-located with the reference signal used/identified in/during the recent random access procedure, for example, based on not receiving the MAC CE activating the TCI state for the CORESET after the recent random access procedure. The reference signal may be the first reference signal (e.g., the downlink RS 1) and the antenna port quasi co-location property may be the first antenna port quasi co-location property of the CORESET 1912-1, for example, if the CORESET is the CORESET 1912-1 and the first CORESET indicator of the CORESET 1912-1 is equal to zero. The reference signal may be the second reference signal (e.g., the uplink RS 1) and the antenna port quasi co-location property may be the second antenna port quasi co-location property of the second CORESET, for example, if the CORESET is the CORESET 1912-2 and the second CORESET indicator of the CORESET 1912-2 is equal to zero.

The cell 1900 may comprise a plurality of BWPs. The plurality of BWPs may comprise one or more uplink BWPs comprising an uplink BWP of the cell 1900. The plurality of BWPs may comprise one or more downlink BWPs comprising a downlink BWP of the cell 1900. The one or more configuration parameters may indicate the one or more CORESETs on/for the downlink BWP of the cell 1900.

A BWP of the plurality of BWPs may be in one of an active state and an inactive state. The active state of a downlink BWP of the one or more downlink BWPs may comprise monitoring a downlink channel/signal (e.g., a PDCCH, DCI, CSI-RS, a PDSCH) on/for/via the downlink BWP. The active state of a downlink BWP of the one or more downlink BWPs may comprise receiving a PDSCH transmission on/via the downlink BWP. The inactive state of a downlink BWP of the one or more downlink BWPs may comprise not monitoring a downlink channel/signal (e.g., a PDCCH, DCI, CSI-RS, a PDSCH) on/for the downlink BWP. The inactive state of a downlink BWP of the one or more downlink BWPs may comprise not receiving a PDSCH transmission on/via the downlink BWP.

The active state of an uplink BWP of the one or more uplink BWPs may comprise transmitting an uplink signal (e.g., a PUCCH transmission, a preamble, a PUSCH transmission, a PRACH transmission, an SRS, etc) via the uplink BWP. The inactive state of an uplink BWP of the one or more uplink BWPs may comprise not transmitting an uplink signal (e.g., a PUCCH transmission, a preamble, a PUSCH transmission, a PRACH transmission, SRS, etc) via the uplink BWP.

The wireless device 1908 may activate the downlink BWP of the one or more downlink BWPs of the cell 1900. The activating the downlink BWP may comprise that the wireless device 1908 sets the downlink BWP as an active downlink BWP of the cell 1900. The activating the downlink BWP may comprise that the wireless device 1908 sets the downlink BWP in the active state. The activating the downlink BWP may comprise switching the downlink BWP from the inactive state to the active state.

The wireless device 1908 may activate the uplink BWP of the one or more uplink BWPs of the cell 1900. The activating the uplink BWP may comprise that the wireless device 1908 sets the uplink BWP as an active uplink BWP of the cell 1900. The activating the uplink BWP may comprise that the wireless device 1908 sets the uplink BWP in the active state. The activating the uplink BWP may comprise switching the uplink BWP from the inactive state to the active state.

The base station 1904 may determine to send (e.g., transmit) a PDCCH order. The PDCCH order may initiate/trigger a random access procedure. The PDCCH order may initiate/trigger the random access procedure for the cell 1900. The PDCCH order may initiate/trigger the random access procedure for a second cell different from the cell 1900.

The base station 1904 may select/determine a CORESET, among the one or more CORESETs, to transmit the PDCCH order, for example, based on the determining to transmit the PDCCH order. The base station 1904 may select/determine the CORESET (e.g., the CORESET 1912-1 based on the CORESET being associated/configured with an antenna port quasi co-location property (e.g., or a TCI state) indicating a downlink reference signal (e.g., the downlink RS 1). The base station 1904 may select/determine the CORESET 1912-1 based on the CORESET 1912-1 being associated/configured with an antenna port quasi co-location property (e.g., or a TCI state), among the one or more antenna port quasi co-location properties, indicating a downlink reference signal (e.g., the downlink RS 1). The base station 1904 may select/determine the CORESET 1912-1 to transmit a PDCCH order 1916, for example, based on the CORESET 1912-1 being associated/configured with the antenna port quasi co-location property indicating the downlink reference signal. The base station 1904 may select/determine the CORESET 1912-1 to transmit the PDCCH order 1916, for example, based on the antenna port quasi co-location property, of the CORESET, indicating the downlink reference signal. The base station 1904 may send/transmit the PDCCH order 1916 via the CORESET 1912-1, for example, based on the selecting/determining the CORESET 1912-1.

The wireless device 1908 may send a preamble (e.g., a random access preamble 1920) based on receiving the PDCCH order 1916. The wireless device 1908 may calculate/determine a transmission power of the random access preamble 1920 based on the downlink reference signal (e.g., the downlink RS 1) indicated by the antenna port quasi-colocation property (e.g., or the TCI state) associated with CORESET 1912-1.

The base station 1904 may not send (e.g., may not transmit) a PDCCH order via a CORESET (e.g., CORESET 1912-2), among the one or more CORESETs, associated/configured with an antenna port quasi co-location property (e.g., or a TCI state) indicating an uplink reference signal (e.g., the uplink RS 1). The base station 1904 may not select/determine the CORESET 1912-2 to transmit the PDCCH order, for example, based on the CORESET 1912-2 being associated/configured with the antenna port quasi co-location property indicating the uplink reference signal. The base station 1904 may not select/determine the CORESET 1912-2 to transmit the PDCCH order, for example, based on the antenna port quasi co-location property of the CORESET 1912-2 indicating the uplink reference signal.

The one or more CORESETs may comprise a first CORESET associated/configured with a first antenna port quasi co-location property (e.g., or a first TCI state) indicating a first downlink reference signal. The one or more CORESETs may comprise a second CORESET associated/configured with a second antenna port quasi co-location property (e.g., or a second TCI state) indicating a second uplink reference signal. The one or more CORESETs may comprise a third CORESET associated/configured with a third antenna port quasi co-location property (e.g., or a third TCI state) indicating a third uplink reference signal. The base station 1904 may select/determine the first CORESET to send/transmit a PDCCH order, for example, based on the first CORESET being associated/configured with the first antenna port quasi co-location property indicating the first downlink reference signal. The base station 1904 may not select/determine the second CORESET to transmit the PDCCH order based on the second CORESET being associated/configured with the second antenna port quasi co-location property indicating the second uplink reference signal. The base station 1904 may not select the third CORESET to transmit the PDCCH order based on the third CORESET being associated/configured with the third antenna port quasi co-location property indicating the third uplink reference signal. The base station 1904 may transmit the PDCCH order via the first CORESET based on the selecting/determining the first CORESET.

The one or more CORESETs may comprise a first CORESET associated/configured with a first antenna port quasi co-location property (e.g., or a first TCI state) indicating a first downlink reference signal. The one or more CORESETs may comprise a second CORESET associated/configured with a second antenna port quasi co-location property (e.g., or a second TCI state) indicating a second uplink reference signal. The one or more CORESETs may comprise a third CORESET associated/configured with a third antenna port quasi co-location property (e.g., or a third TCI state) indicating a third downlink reference signal. The base station 1904 may select/determine a CORESET, among the first CORESET and the third CORESET, to transmit a PDCCH order, for example, based on the first CORESET being associated/configured with the first antenna port quasi co-location property indicating the first downlink reference signal and the third CORESET being associated/configured with the third antenna port quasi co-location property indicating the third downlink reference signal. The base station 1904 may not select the second CORESET to transmit the PDCCH order based on the second CORESET being associated/configured with the second antenna port quasi co-location property indicating the second uplink reference signal. The base station 1904 may transmit the PDCCH order via the CORESET (e.g., the first CORESET or the second CORESET) based on the selecting/determining the CORESET.

Figure 20:
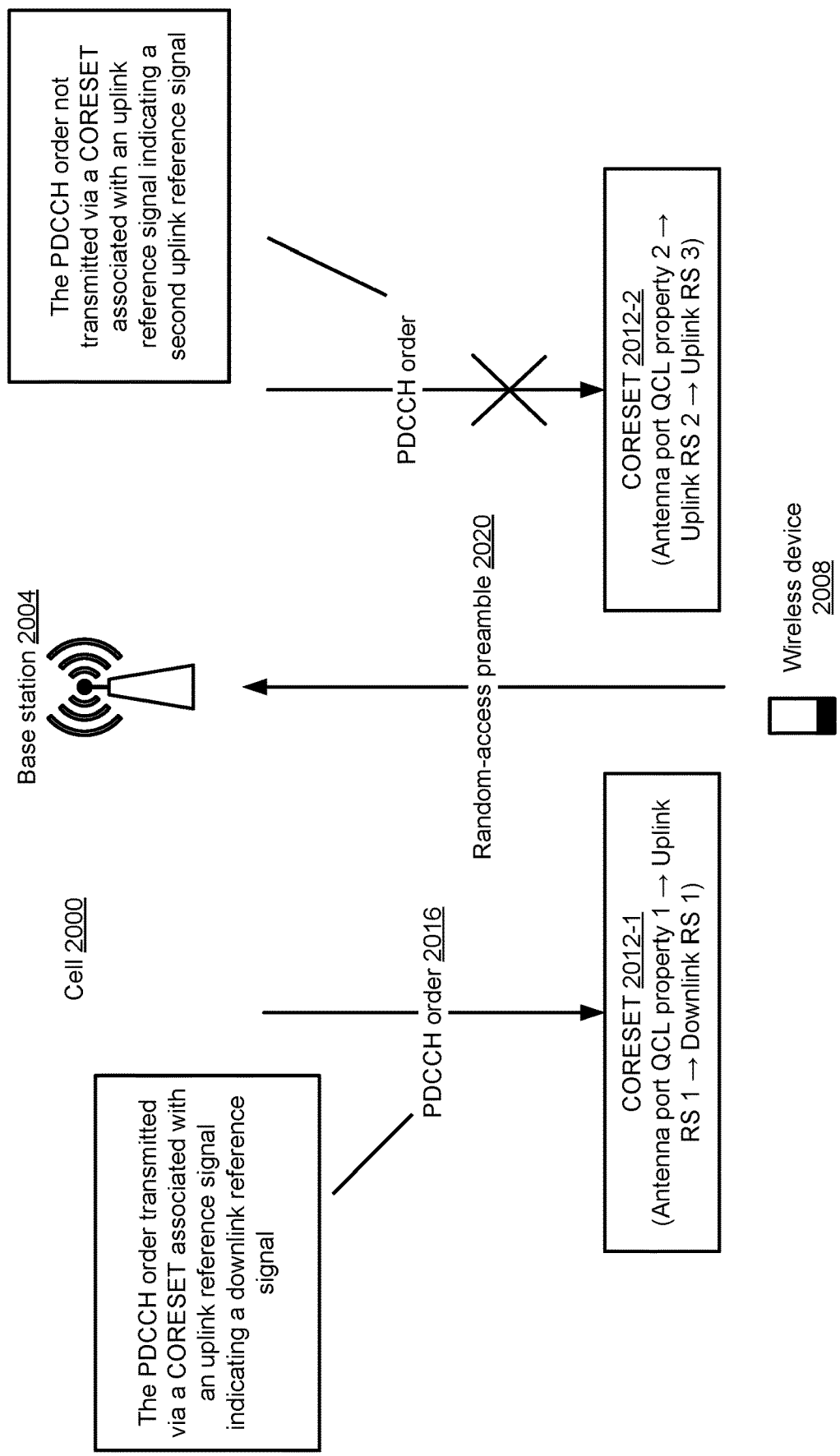
FIG. 20 shows an example random access procedure.

FIG. 20 shows an example random access procedure. A base station 2004 may configure one or more CORESETs with associated reference signals. A wireless device 2008 may use the configured CORESETs to receive downlink transmission(s) from the base station 2004. The downlink transmissions may comprise PDCCH transmissions (e.g., DCIs, PDCCH orders, etc.). The wireless device 2008 may send/transmit a random access preamble based on receiving a PDCCH transmission (e.g., a PDCCH order initiating a random access procedure). The base station 1904 may determine to send the PDCCH order via a CORESET that is associated with an uplink reference signal indicating a downlink reference signal. The base station 1904 may determine to send the PDCCH order via the CORESET that is associated with an uplink reference signal, for example, only if the CORESET that is associated with an uplink reference signal also indicates a downlink reference signal. The wireless device 1908 may use, for determining a transmission power of the random access preamble, the downlink reference signal based on receiving the PDCCH order via the CORESET that is associated with the uplink reference signal indicating the downlink reference signal. The base station 2004 and/or the wireless device 2008 may perform one or more operations described above with reference to the base station 1904 and/or the wireless device 1908.

The base station 2004 may select/determine a CORESET, among the one or more CORESETs of the cell, to transmit a PDCCH order. The CORESET (e.g., CORESET 2012-1) may be associated/configured with an antenna port quasi co-location property (e.g., or a TCI state) indicating an uplink reference signal (e.g., uplink RS 1). The antenna port quasi co-location property may comprise a reference signal index (e.g., SRS-ResourceId) indicating the uplink reference signal. The uplink reference signal may be a target reference signal (target RS). The one or more configuration parameters may indicate a spatial relation information (e.g., provided by a higher layer parameter spatialRelationInfo in SRS-Resource) for the uplink reference signal. The spatial relation information may indicate a downlink reference signal (e.g., ssb-Index, csi-RS-Index). The downlink reference signal (e.g., downlink RS 1) may be a reference reference signal (reference RS). The spatial relation information may indicate a spatial relation between the target RS and the reference RS. The wireless device 2008 may send/transmit the target RS based on a spatial filter used to transmit (or receive) the reference RS. The wireless device 2008 may transmit the target RS based on a spatial filter used to receive the reference RS, for example, based on the reference RS being the downlink reference signal.

The base station 2004 may select/determine the CORESET 2012-1 to transmit a PDCCH order 2016, for example, based on the spatial relation information of the uplink reference signal, indicated by the antenna port quasi co-location property of the CORESET 2012-1, indicating the downlink reference signal. The base station 2004 may select/determine the CORESET 2012-1 to transmit the PDCCH order 2016, for example, based on the CORESET 2012-1 being associated/configured with an antenna port quasi co-location property indicating the uplink reference signal with the spatial relation information indicating the downlink reference signal. The base station 2004 may send/transmit the PDCCH order 2016 via the CORESET 2012-1 based on selecting/determining the CORESET 2012-1.

The wireless device 2008 may send a preamble (e.g., a random access preamble 2020) based on receiving the PDCCH order 2016. The wireless device 2008 may calculate/determine a transmission power of the random access preamble 2020 based on the downlink reference signal (e.g., the downlink RS 1) indicated by the spatial relation information of the uplink reference signal (the uplink RS 1).

The base station 2004 may not send/transmit a PDCCH order via a CORESET (e.g., CORESET 2012-2), among the one or more CORESETs, associated/configured with an antenna port quasi co-location property (e.g., or a TCI state) indicating an uplink reference signal (e.g., uplink RS 2) with spatial relation information indicating a second uplink reference signal (e.g., uplink RS 3). The base station 2004 may determine that the CORESET 2012-2, among the one or more CORESETs, is associated/configured with an antenna port quasi co-location property (e.g., or a TCI state) indicating an uplink reference signal (e.g., the uplink RS 2). The base station 2004 may determine that the CORESET 2012-1, among the one or more CORESETs, is associated/configured with an antenna port quasi co-location property (e.g., or a TCI state) indicating an uplink reference signal (e.g., the uplink RS 2), for example, based on determining to transmit the PDCCH order. The antenna port quasi co-location property may comprise a reference signal index (e.g., SRS-ResourceId) indicating the uplink reference signal. The uplink reference signal may be a target RS. The one or more configuration parameters may indicate the spatial relation information for the uplink reference signal. The spatial relation information may indicate a second uplink reference signal (e.g., provided by a higher layer parameter SRS-ResourceId). The second uplink reference signal (e.g., the uplink RS 3) may be a reference RS. The spatial relation information may indicate a spatial relation between the target RS and the reference RS. The wireless device 2008 may send/transmit the target RS based on a spatial filter used to transmit (or receive) the reference RS. The wireless device 2008 may transmit the target RS based on a spatial filter used to transmit the reference RS based on the reference RS being the second uplink reference signal. The base station 2004 may not select/determine the CORESET 2012-2 to transmit the PDCCH order, for example, based on the determining that the spatial relation information of the uplink reference signal, indicated by the antenna port quasi co-location property of the CORESET 2012-2, indicates the second uplink reference signal. The base station may not transmit the PDCCH order via the CORESET 2012-2, for example, based on the determining that the spatial relation information of the uplink reference signal, indicated by the antenna port quasi co-location property of the CORESET 2012-2, indicates the second uplink reference signal.

Figure 21:
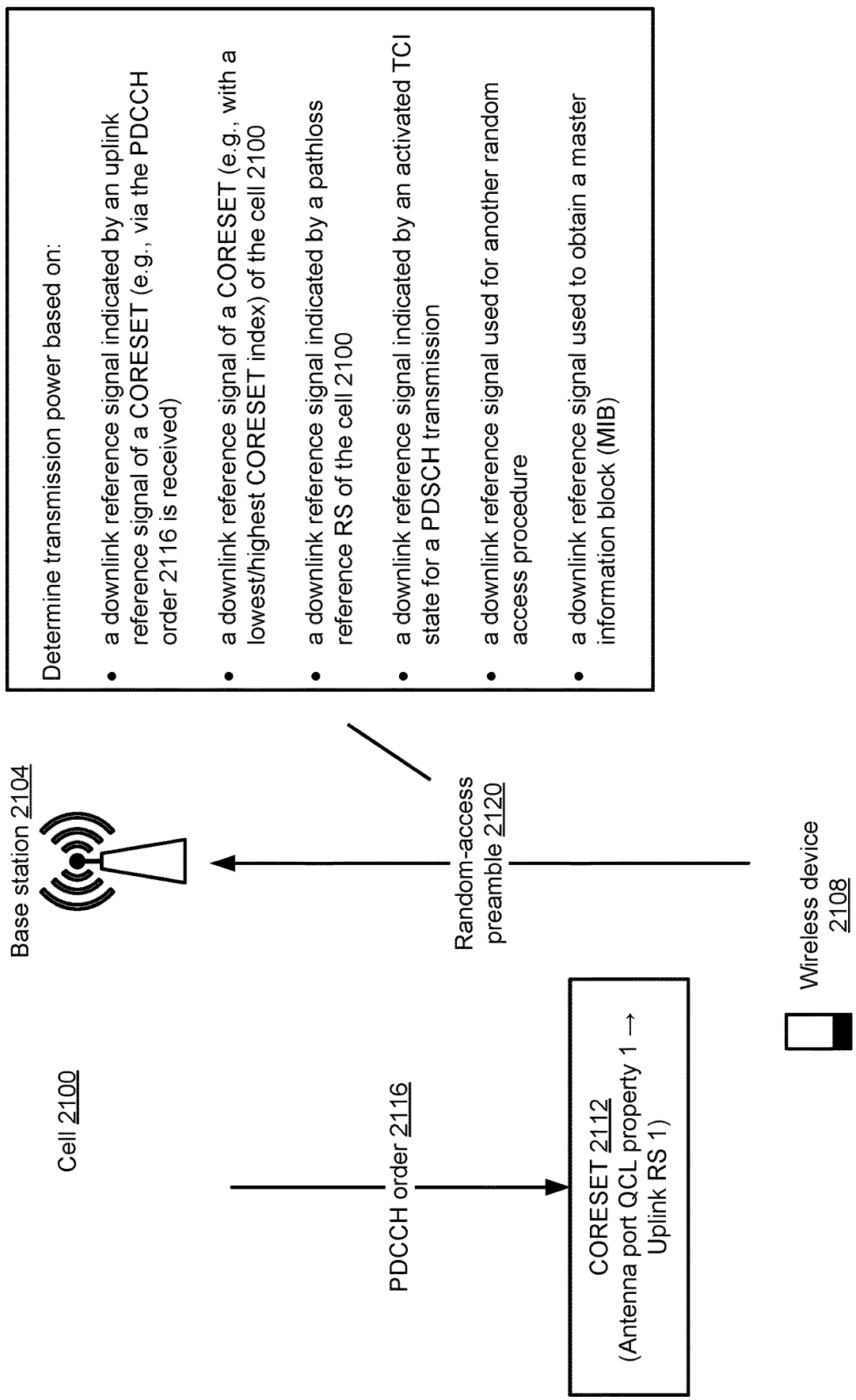
FIG. 21 shows an example random access procedure.

FIG. 21 shows an example random access procedure. A wireless device 2108 may determine a transmission power of a random access preamble as described with reference to FIG. 21, for example, if the wireless device 2108 receives a PDCCH order via a CORESET associated with an uplink reference signal. The wireless device 1908 may use, for determining a transmission power of the random access preamble, a downlink reference signal indicated by the uplink reference signal, a downlink reference signal of a CORESET with a specific CORESET index (e.g., a lowest CORESET index among configured CORESETs), and/or a downlink reference signal indicated by a pathloss reference RS. A base station 2104 and/or the wireless device 2108 may additionally, or alternatively, perform one or more operations described above with reference to the FIGS. 19 and 20.

The wireless device may receive, from the base station 2104, a PDCCH order 2116 initiating a random access procedure. The wireless device may receive the PDCCH order via a CORESET (e.g., CORESET 2112-1) of one or more CORESETs. The random access procedure may be a contention-free random access procedure (e.g., non-contention based random access procedure). The wireless device 2108 may initiate the random access procedure based on the receiving the PDCCH order 2116. The PDCCH order 2116 may indicate a cell 2100. The PDCCH order 2116 may indicate a cell index of the cell 2100. The wireless device 2108 may initiate the random access procedure for the cell 2100. The PDCCH order 2116 may initiate/trigger the random access procedure for the cell 2100. The wireless device 2108 may initiate the random access procedure for the cell 2100 based on the PDCCH order 2116 indicating the cell 2100.

The wireless device 2108 may send/transmit a random access preamble (e.g., a random access preamble 2120) for the random access procedure. The wireless device 2108 may transmit the random access preamble 2120 via at least one random access resource (e.g., a PRACH occasion) of an active uplink BWP of the cell 2100. The at least one random access resource may comprise at least one time resource. The at least one random access resource may comprise at least one frequency resource. A PRACH mask index field of the PDCCH order 2116 may indicate the at least one random access resource (e.g., the PRACH occasion). The at least one random access resource may be associated with a reference signal indicator/index (e.g., SS/PBCH block index), of a reference signal, indicated by a reference signal indicator/index field in/of the PDCCH order 2116. The wireless device 2108 may select, to transmit the random access preamble 2120, the at least one random access resource indicated by the PRACH mask index field. A value of a random access preamble index field in the PDCCH order 2116 may not be zero (e.g., non-zero). A value of a random access preamble index field in the PDCCH order 2116 may be zero. The random access preamble index may indicate/identify the preamble 2120. The wireless device 2108 may transmit the random access preamble 2120 indicated by the random access preamble index based on a reference signal (e.g., indicated/identified by the reference signal index) that is indicated by the reference signal index field in/of the PDCCH order 2116. The wireless device 2108 may transmit the random access preamble 2120 using a spatial transmission filter that is based on a spatial receiving filter used to receive the reference signal.

A CORESET via which the PDCCH order 2116 is received may be associated/configured with an antenna port quasi co-location property (e.g., a TCI state, antenna port QCL property 1) indicating a downlink reference signal. One or more antenna port quasi co-location properties may comprise the antenna port quasi co-location property. The antenna port quasi co-location property may comprise/indicate a quasi co-location type. The quasi co-location type may be QCL-TypeD (or any other QCL type). The antenna port quasi co-location property may comprise/indicate the quasi co-location type for the downlink reference signal.

The wireless device 2108 may transmit the random access preamble 2120 with a transmission power. The wireless device 2108 may determine/calculate the transmission power for the random access preamble 2120 based on the downlink reference signal indicated by (or in) the antenna port quasi co-location property of the CORESET via which the PDCCH order 2116 is received. The wireless device 2108 may determine/calculate the transmission power for the random access preamble 2120 based the downlink reference signal indicated by (or in) the antenna port quasi co-location property of the CORESET that the PDCCH order is received, for example, based on the initiating the random access procedure. The wireless device 2108 may determine/calculate the transmission power for the random access preamble 2120 based on the downlink reference signal with which at least one DM-RS port of a PDCCH indicating the PDCCH order 2116 is quasi co-located. The at least one DM-RS port of the PDCCH may be quasi co-located with the downlink reference signal with respect to a quasi co-location type (e.g., QCL TypeA, QCL TypeB, QCL TypeD, etc). The quasi co-location type may be QCL TypeD.

A CORESET (e.g., CORESET 2112) via which the PDCCH order 2116 is received may be associated/configured with an antenna port quasi co-location property (e.g., or a TCI state, antenna port QCL property 1) indicating an uplink reference signal (e.g., uplink RS 1). The uplink reference signal may be associated with spatial relation information indicating a downlink reference signal (e.g., downlink RS 1, as shown in FIG. 20). The one or more antenna port quasi co-location properties may comprise the antenna port quasi co-location property. The antenna port quasi co-location property may comprise/indicate a quasi co-location type. The quasi co-location type may be QCL TypeD (or any other QCL type). The antenna port quasi co-location property may comprise/indicate the quasi co-location type for the downlink reference signal. The antenna port quasi co-location property may comprise/indicate the quasi co-location type for the uplink reference signal.

The wireless device 2108 may send/transmit the random access preamble 2120 with a transmission power. The wireless device may determine/calculate the transmission power for the random access preamble 2120 based on the downlink reference signal in the spatial relation information of the uplink reference signal (e.g., indicated by the antenna port quasi co-location property of the CORESET 2112 via which the PDCCH order 2116 is received). The wireless device 2108 may determine/calculate the transmission power for the random access preamble 2120 based the downlink reference signal in the spatial relation information of the uplink reference signal (e.g., indicated by the antenna port quasi co-location property of the CORESET 2112 that the PDCCH order 2116 is received), for example, based on the initiating the random access procedure. The wireless device 2108 may determine/calculate the transmission power for the random access preamble 2120 based on the downlink reference signal. The wireless device 2108 may determine/calculate the transmission power for the random access preamble 2120 based on the downlink reference signal with which at least one DM-RS port of a PDCCH indicating the PDCCH order 2116 is quasi co-located. The at least one DM-RS port of the PDCCH 2116 may be quasi co-located with the downlink reference signal with respect to a quasi co-location type (e.g., QCL TypeA, QCL TypeB, QCL TypeD, etc). The quasi co-location type may be QCL TypeD.

The CORESET 2112 via which the PDCCH order 2116 is received may be associated/configured with an antenna port quasi co-location property (e.g., or a TCI state, antenna port QCL property 1 in FIG. 20) indicating an uplink reference signal (e.g., uplink RS 1) with spatial relation information indicating a second uplink reference signal (e.g., uplink RS 3, as shown in FIG. 20). The one or more antenna port quasi co-location properties may comprise the antenna port quasi co-location property. The antenna port quasi co-location property may comprise/indicate a quasi co-location type. The quasi co-location type may be QCL TypeD (or any other quasi co-location type). The antenna port quasi co-location property may comprise/indicate the quasi co-location type for the uplink reference signal. The antenna port quasi co-location property may comprise/indicate the quasi co-location type for the second uplink reference signal.

The wireless device 2108 may determine/calculate a transmission power for the random access preamble 2120 based on a selected CORESET of the one or more CORE- SETs of the cell 2100, for example, based on the CORESET 2112, via which the PDCCH order 2116 is received, being associated/configured with an antenna port quasi co-location property (e.g., or a TCI state, antenna port QCL property 1 in FIG. 20) indicating an uplink reference signal. Spatial relation information of the uplink reference signal may indicate a downlink reference signal. Spatial relation information of the uplink reference signal may indicate a second uplink reference signal. The wireless device 2108 may determine/calculate a transmission power for the random access preamble 2120 based on a selected CORESET of the one or more CORESETs of the cell 2100, for example, based on the CORESET 2112 being associated/configured with an antenna port quasi co-location property indicating an uplink reference signal and/or based on the spatial relation information of the uplink reference signal indicating a second uplink reference signal.

The wireless device 2108 may select/determine the selected CORESET among the one or more CORESETs of the cell based on CORESET indicators/indices (e.g., provided by a higher layer parameter ControlResourceSetId) of the one or more CORESETs. The wireless device 2108 may determine/select the selected CORESET, among the one or more CORESETs, with a lowest (or highest) CORESET index among the CORESET indices of the one or more CORESETs. The one or more CORESETs may comprise a first CORESET indicated/identified by a first CORESET index of the CORESET indices and a second CORESET indicated/identified by a second CORESET index of the CORESET indices. The wireless device 2108 may select/determine the selected CORESET among the first CORESET and the second CORESET based on the first CORESET index and the second CORESET index. The wireless device 2108 may determine/select the selected CORESET, among the first CORESET and the second CORESET, with a lowest (or highest) CORESET index among the first CORESET index and the second CORESET index. The first CORESET index may be lower than the second CORESET index. The wireless device 2108 may select the first CORESET as the selected CORESET, for example, based on the first CORESET index being lower than the second CORESET index. The wireless device 2108 may select the second CORESET as the selected CORESET, for example, based on the first CORESET index being lower than the second CORESET index. The first CORESET index may be higher than the second CORESET index. The wireless device 2108 may select the first CORESET as the selected CORESET, for example, based on the first CORESET index being higher than the second CORESET index. The wireless device 2108 may select the second CORESET as the selected CORESET, for example, based on the first CORESET index being higher than the second CORESET index.

The wireless device 2108 may select/determine the selected CORESET among the one or more CORESETs based on one or more antenna port quasi co-location properties of the one or more CORESETs. The wireless device 2108 may determine/select the selected CORESET, among the one or more CORESETs, associated/configured with an antenna port quasi co-location property indicating a downlink reference signal. The wireless device 2108 may determine/select the selected CORESET, among the one or more CORESETs, associated/configured with an antenna port quasi co-location property indicating an uplink reference signal with spatial relation information indicating a downlink reference signal.

The determining/calculating the transmission power for the random access preamble 2120 based on the selected CORESET may comprise determining/calculating the transmission power for the random access preamble 2120 based on the downlink reference signal indicated by the antenna port quasi co-location property of the selected CORESET. The determining/calculating the transmission power for the random access preamble 2120 based on the selected CORESET may comprise determining/calculating the transmission power for the random access preamble 2120 based on the downlink reference signal in the spatial relation information of the uplink reference signal indicated by the antenna port quasi co-location property of the selected CORESET. The wireless device 2108 may determine/calculate the transmission power for the random access preamble 2120 based on the downlink reference signal with which at least one DM-RS port of a PDCCH transmission (received via the selected CORESET) is quasi co-located. The determining/calculating the transmission power for the random access preamble 2120 based on the selected CORESET may comprise that the wireless device 2108 determines/calculates the transmission power for the random access preamble 2120 based on the downlink reference signal with which the at least one DM-RS port of the PDCCH transmission (received via the selected CORESET) is quasi co-located. The wireless device 2108 may transmit the random access preamble 2120 for the random access procedure with the transmission power determined/calculated based on the selected CORESET.

The one or more configuration parameters may indicate one or more pathloss reference reference signals (RSs) for a pathloss estimation of an uplink channel/signal (e.g., PUCCH, PUSCH, SRS) of/for the cell 2100. The uplink channel/signal may be PUCCH/PUCCH transmission and the one or more pathloss reference RSs may be provided by a first higher layer parameter (e.g., PUCCH-PathlossReferenceRS in PUCCH-PowerControl). The uplink channel/signal may be a PUSCH/PUSCH transmission and the one or more pathloss reference RSs may be provided by a second higher layer parameter (e.g., PUSCH-PathlossReferenceRS in PUSCH-PowerControl). The uplink channel/signal may be SRS and, the one or more pathloss reference RSs may be provided by a third higher layer parameter (e.g., PathlossReferenceRS in SRS-Resource Set). The pathloss estimation of the uplink channel/signal (e.g., PUCCH, PUSCH, SRS) of/for the cell 2100 may comprise a pathloss estimation of a transmission of an uplink signal (e.g., SRS, UCI, SR, HARQ-ACK, CSI) via an uplink channel (e.g., PUCCH, PUSCH) of the cell 2100. In an example, the one or more configuration parameters may indicate the one or more pathloss reference RSs for the active uplink BWP of the cell 2100.

The one or more configuration parameters may indicate pathloss reference RS indices (e.g., provided by a higher layer parameter pucch-PathlossReferenceRS-Id for PUCCH, provided by a higher layer parameter pusch-PathlossReferenceRS-Id for PUSCH, srs-ResourceSetId for SRS) for the one or more pathloss reference RSs. Each pathloss reference RS of the one or more pathloss reference RSs may be indicated/identified by a respective pathloss reference RS indicator/index of the pathloss reference RS indices. A first pathloss reference RS of the one or more pathloss reference RSs may be identified by a first pathloss reference RS index of the pathloss reference RS indices. A second pathloss reference RS of the one or more pathloss reference RSs may be identified by a second pathloss reference RS index of the pathloss reference RS indices.

The wireless device 2108 may determine/calculate a transmission power for the random access preamble 2120 based on a selected/determined pathloss reference RS among the one or more pathloss reference RSs, for example, based on the CORESET 2112 (via which the PDCCH order 2116 is received) being associated/configured with an antenna port quasi co-location property (e.g., or a TCI state, antenna port QCL property 1) indicating an uplink reference signal. Spatial relation information of the uplink reference signal may indicate a downlink reference signal. The spatial relation information of the uplink reference signal may indicate a second uplink reference signal.

The selecting/determining the pathloss reference RS among the one or more pathloss reference RSs may be based on the pathloss reference RS indices of the one or more pathloss reference RSs. The wireless device 2108 may select/determine the pathloss reference RS with a lowest (or highest) pathloss reference RS index among the pathloss reference RS indices of the one or more pathloss reference RSs. The one or more pathloss reference RSs may comprise a first pathloss reference RS identified by a first pathloss reference RS index and a second pathloss reference RS identified by a second pathloss reference RS index. The selecting/determining the pathloss reference RS among the first pathloss reference RS and the second pathloss reference RS may be based on the first pathloss reference RS index and the second pathloss reference RS index. The wireless device 2108 may select/determine the pathloss reference RS with a lowest (or highest) pathloss reference RS index among the first pathloss reference RS index and the second pathloss reference RS index.

The first pathloss reference RS index may be lower than the second pathloss reference RS index. The wireless device 2108 may select/determine the first pathloss reference RS as the selected/determined pathloss reference RS, for example, based on the first pathloss reference RS index being lower than the second pathloss reference RS index. In an example, based on the first pathloss reference RS index being lower than the second pathloss reference RS index, the wireless device may select/determine the second pathloss reference RS as the selected/determined pathloss reference RS.

The first pathloss reference RS index may be higher than the second pathloss reference RS index. The wireless device 2108 may select the first pathloss reference RS as the selected/determined pathloss reference RS, for example, based on the first pathloss reference RS index being higher than the second pathloss reference RS index. The wireless device 2108 may select the second pathloss reference RS as the selected/determined pathloss reference RS, for example, based on the first pathloss reference RS index being higher than the second pathloss reference RS index.

The selecting/determining the pathloss reference RS among the one or more pathloss reference RSs may be based on the pathloss reference RS indices of the one or more pathloss reference RSs. The wireless device 2108 may determine/select the pathloss reference RS with a pathloss reference RS index that is equal to a value (e.g., zero, or any other value). The wireless device 2108 may determine/select the pathloss reference RS with a pathloss reference RS index, among the pathloss reference RS indices of the one or more pathloss reference RSs, that is equal to the value. The value may be zero. The value may be preconfigured. The value may be fixed. The value may be configured by the base station 2104. The one or more configuration parameters may indicate the value.

The first pathloss reference RS index may be equal to the value (e.g., zero, or any other value). The second pathloss reference RS index may be different from the value. The wireless device 2108 may select the first pathloss reference RS as the selected/determined pathloss reference RS, for example, based on the first pathloss reference RS index being equal to the value.

The second pathloss reference RS index may be equal to the value (e.g., zero, or any other value). The first pathloss reference RS index may be different from the value. The wireless device 2108 may select the second pathloss reference RS as the selected/determined pathloss reference RS, for example, based on the second pathloss reference RS index being equal to the value.

The selected/determined pathloss reference RS may comprise/indicate a downlink reference signal (e.g., SS/PBCH block identified by a ssb-index, CSI-RS identified by a csi-rs-index). The reference signal may be a reference RS. The wireless device 2108 may use/measure the downlink reference signal in (or indicated by) the pathloss reference RS for a pathloss estimation for/of an uplink transmission (e.g., PUSCH, UCI, PUCCH, SRS, etc) via an uplink channel (e.g., PUCCH, PUSCH, SRS) of the cell 2100.

The one or more configuration parameters may not indicate a reference cell (e.g., by a higher layer parameter pathlossReferenceLinking) for the cell 2100. The one or more configuration parameters may not indicate a reference cell (e.g., by a higher layer parameter pathlossReferenceLinking) to be used for a pathloss estimation of the cell 2100. The downlink reference signal indicated by the pathloss reference RS may be transmitted on/via the cell 2100, for example, if the one or more configuration parameters do not indicate the reference cell. The base station 2104 may transmit the downlink reference signal indicated by the pathloss reference RS on/via the cell 2100, for example, if the one or more configuration parameters do not indicate the reference cell. The base station 2104 may configure the downlink reference signal indicated by the pathloss reference RS for the cell 2100, for example, if the one or more configuration parameters do not indicate the reference cell. The one or more configuration parameters may indicate the downlink reference signal indicated by the pathloss reference RS for the cell 2100, for example, if the one or more configuration parameters do not indicate the reference cell.

The one or more configuration parameters may indicate a reference cell (e.g., by a higher layer parameter pathlossReferenceLinking) for the cell 2100. The one or more configuration parameters may indicate a reference cell (e.g., by a higher layer parameter pathlossReferenceLinking) used for a pathloss estimation of the cell 2100. A plurality of cells may comprise the reference cell. The reference cell may be different from the cell 2100. The reference cell may be same as the cell 2100. The downlink reference signal indicated by the pathloss reference RS may be transmitted on/via the reference cell, for example, based on the one or more configuration parameters indicating the reference cell for the cell 2100. The base station 2104 may transmit the downlink reference signal indicated by the pathloss reference RS on/via the reference cell, for example, based on the one or more configuration parameters indicating the reference cell for the cell 2100. The base station 2104 may configure the downlink reference signal indicated by the pathloss reference RS for the reference cell, for example, based on the one or more configuration parameters indicating the reference cell for the cell 2100. The one or more configuration parameters may indicate the downlink reference signal indicated by the pathloss reference RS for the reference cell, for example, based on the one or more configuration parameters indicating the reference cell for the cell 2100. The reference cell may be for a pathloss estimation for the cell 2100. The wireless device 2108 may measure the downlink reference signal of the reference cell for the pathloss estimation of the cell 2100.

The determining/calculating the transmission power for the random access preamble 2120 based on the pathloss reference RS may comprise determining/calculating the transmission power for the random access preamble based on the downlink reference signal indicated by the pathloss reference RS. The wireless device 2108 may determine/calculate the transmission power for the random access preamble 2120 based on the downlink reference signal indicated by the pathloss reference RS. The determining/calculating the transmission power for the random access preamble 2120 based on the pathloss reference RS may comprise that the wireless device 2108 determines/calculates the transmission power for the random access preamble 2120 based on the downlink reference signal indicated by the pathloss reference RS. The wireless device 2108 may transmit the random access preamble 2120 for the random access procedure with the transmission power determined/calculated based on the pathloss reference RS.

The one or more configuration parameters may indicate one or more TCI states for (decoding) PDSCH transmissions of/for the cell 2100. The one or more configuration parameters may indicate the one or more TCI states for decoding PDSCH transmissions of/for the active downlink BWP of the cell 2100.

The one or more configuration parameters may indicate TCI state indicators/indices (e.g., provided by a higher layer parameter tci-StateID as shown in FIG. 17) for the one or more TCI states. Each TCI state of the one or more TCI states may be indicated/identified by a respective TCI state indicator/index of the TCI state indicators/indices. A first TCI state of the one or more TCI states may be identified by a first TCI state index of the TCI state indices. A second TCI state of the one or more TCI states may be identified by a second TCI state index of the TCI state indices.

The wireless device 2108 may receive a MAC CE (e.g., TCI states activation/deactivation for wireless device-specific PDSCH MAC CE) activating at least one TCI state of the one or more TCI states. The MAC CE may comprise a field indicating at least one TCI state index, among the TCI state indices, of the at least one TCI state. The field may be set to a value (e.g., one, or any other value) indicating activation of the at least one TCI state. The wireless device 2108 may activate the at least one TCI state, for example, based on the field indicating the at least one TCI state. The wireless device 2108 may map the at least one TCI state to at least one codepoint, for example, based on the activating the at least one TCI state. The at least one codepoint may be for/of DCI comprising a TCI field. A TCI field in DCI may indicate (or be equal to) a codepoint of the at least one codepoint. The at least one TCI state may comprise a first TCI state and a second TCI state. The wireless device 2108 may map the first TCI state to a first codepoint (e.g., 000, 001, 111) of the at least one codepoint. The wireless device 2108 may map the second TCI state to a second codepoint (e.g., 100, 100, 101) of the at least one codepoint.

The (activated) at least one TCI state may be applicable to PDSCH in the cell 2100. The (activated) at least one TCI state may be applicable to PDSCH in the active downlink BWP of the cell 2100. The (activated) at least one TCI state being applicable to PDSCH in the active downlink BWP of the cell 2100 may comprise that DCI scheduling a PDSCH transmission for the active downlink BWP of the cell 2100 indicates a TCI state of the at least one TCI state for reception/decoding of the PDSCH transmission. The (activated) at least one TCI state being applicable to PDSCH in the active downlink BWP of the cell 2100 may comprise that DCI scheduling a PDSCH transmission for the active downlink BWP of the cell 2100 does not indicate a TCI state that is not among the at least one TCI state for reception/decoding of the PDSCH transmission. The wireless device 2108 may receive/decode the PDSCH transmission based on a TCI state, for example, if DCI scheduling a PDSCH transmission for the active downlink BWP of the cell 2100 indicates the TCI state of the at least one TCI state for reception/decoding of the PDSCH transmission. The DCI may comprise a TCI field indicating the TCI state (or indicating a codepoint of the TCI state). The receiving/decoding the PDSCH transmission based on the TCI state may comprise that (e.g., the wireless device 2108 may determine that) at least one DM-RS port of the PDSCH transmission is quasi co-located with a reference signal indicated by the TCI state with respect to a quasi co-location type (e.g., QCL TypeD, or any other quasi co-location type) indicated by the TCI state.

The wireless device 2108 may determine/calculate a transmission power for the random access preamble 2120 based on a selected/determined TCI state among the at least one TCI state, for example, based on the CORESET 2112 via which the PDCCH order 2116 is received being associated/configured with an antenna port quasi co-location property (e.g., or a TCI state, antenna port QCL property 1) indicating an uplink reference signal. Spatial relation information of the uplink reference signal may indicate a downlink reference signal. Spatial relation information of the uplink reference signal may indicate a second uplink reference signal.

The selected/determined TCI state among the at least one TCI state may comprise/indicate a downlink reference signal (e.g., SSB, CSI-RS, DM-RS). The downlink reference signal may be a reference RS. The TCI state may comprise/indicate a quasi co-location type. The quasi co-location type may be QCL TypeD (or any other quasi co-location type). The TCI state may indicate the quasi co-location type (e.g., QCL TypeD, or any other quasi co-location type) for the downlink reference signal.

The selected/determined TCI state may comprise at least one quasi co-location information parameter (e.g., QCL-Info as shown in FIG. 17). The wireless device 2108 may select a quasi co-location information parameter, of the at least one quasi co-location information parameter, indicating/comprising a quasi co-location type that is same as the QCL TypeD. The quasi co-location information parameter may comprise/indicate the downlink reference signal. The wireless device 2108 may determine the downlink reference signal indicated by the quasi co-location information parameter.

The one or more configuration parameters may indicate at least one TCI state indicator/index (e.g., provided by a higher layer parameter tci-StateID as shown in FIG. 17) for the at least one TCI state (activated by the MAC CE). Each TCI state of the at least one TCI state may be indicated/identified by a respective TCI state indicator/index of the at least one TCI state index. A first TCI state of the at least one TCI state may be identified by a first TCI state index of the at least one TCI state index. A second TCI state of the at least one TCI state may be identified by a second TCI state index of the at least one TCI state index. The TCI state indices of the one or more TCI states may comprise the at least one TCI state index of the at least one TCI state.

The determining/selecting the TCI state among the at least one TCI state may be based on the TCI state indices (e.g., provided by a higher layer parameter tci-StateID in FIG. 17). The determining/selecting the TCI state among the at least one TCI state may be based on the at least one TCI state index of the at least one TCI state. The wireless device 2108 may determine/select the TCI state with a lowest (or highest) TCI state index among the at least one TCI state index of the at least one TCI state. The at least one TCI state may comprise a first TCI state identified by a first TCI state index and a second TCI state identified by a second TCI state index. The determining/selecting the TCI state among the first TCI state and the second TCI state may be based on the first TCI state index and the second TCI state index. The wireless device 2108 may determine/select the TCI state with a lowest (or highest) TCI state index among the first TCI state index and the second TCI state index. The first TCI state index may be lower than the second TCI state index. The wireless device 2308 may select the first TCI state as the selected/determined TCI state, for example, based on the first TCI state index being lower than the second TCI state index. The wireless device 2108 may select the second TCI state as the selected/determined TCI state, for example, based on the first TCI state index being lower than the second TCI state index. The first TCI state index may be higher than the second TCI state index. The wireless device 2108 may select the first TCI state as the selected/determined TCI state, for example, based on the first TCI state index being higher than the second TCI state index. The wireless device 2108 may select the second TCI state as the selected/determined TCI state, for example, based on the first TCI state index being higher than the second TCI state index.

The determining/calculating the transmission power for the random access preamble 2120 based on the TCI state may comprise determining/calculating the transmission power for the random access preamble 2120 based on the downlink reference signal indicated by the selected/determined TCI state. The wireless device 2108 may determine/calculate the transmission power for the random access preamble 2120 based on the downlink reference signal indicated by the selected/determined TCI state. The determining/calculating the transmission power for the random access preamble 2120 based on the TCI state may comprise that the wireless device 2108 determines/calculates the transmission power for the random access preamble 2120 based on the downlink reference signal indicated by the selected/determined TCI state. The wireless device 2108 may transmit the random access preamble 2120 for the random access procedure with the transmission power determined/calculated based on the selected/determined TCI state.

The wireless device 2108 may determine/calculate a transmission power for the random access preamble 2120 based on a downlink reference signal, for example, based on the CORESET 2112 via which the PDCCH order 2116 is received being associated/configured with an antenna port quasi co-location property (e.g., or a TCI state, antenna port QCL property 1) indicating an uplink reference signal. Spatial relation information of the uplink reference signal may indicate a second downlink reference signal. Spatial relation information of the uplink reference may indicate a second uplink reference signal.

The wireless device 2108 may determine/select a downlink reference signal used for/identified in/for a (another) random access procedure (e.g., an initial access procedure) of the cell 2100. The downlink reference signal may be an SS/PBCH block. The downlink reference signal may be a CSI-RS.

The wireless device 2108 may determine/select the downlink reference signal (e.g., SS/PBCH block, CSI-RS) that is used to obtain (e.g., receive) a master information block (MIB). The wireless device 2108 may use the downlink reference signal to obtain MIB. The wireless device 2108 may obtain the MIB for the cell 2100.

The wireless device 2108 may determine/select the downlink reference signal (e.g., SS/PBCH block, CSI-RS) that is used/indicated/identified in a recent (or most recent or latest) random access procedure for the cell 2100. The wireless device 2108 may use/indicate/identify the downlink reference signal in/during the recent (or most recent or latest) random access procedure. The latest/recent random access procedure may not be initiated based on receiving a PDCCH order. The latest/recent random access procedure may not be initiated based on receiving a PDCCH order triggering a non-contention based random access procedure. The latest/recent random access procedure may be initiated based on receiving a PDCCH order. The latest/recent random access procedure may be initiated based on receiving a PDCCH order triggering a non-contention based random access procedure.

The wireless device 2108 may determine/select a downlink reference signal indicated by the one or more configuration parameters. The one or more configuration parameters may indicate the downlink reference signal (e.g., a default downlink pathloss reference RS, cell-defining SSB) for the cell.

The PDCCH order 2116 may comprise a field comprising/indicating a reference signal indicator/index (e.g., SS/PBCH index). The reference signal index in the PDCCH order 2116 may indicate a downlink reference signal. The one or more configuration parameters may indicate the reference signal index for the downlink reference signal. The wireless device 2108 may transmit the random access preamble 2120 for the random access procedure with the transmission power determined/calculated based on the downlink reference signal.

Determining/calculating the transmission power for a random access preamble (e.g., the random access preamble 1920, the random access preamble 2020, or the random access preamble 2120) based on a reference signal (e.g., a downlink reference signal) may comprise determining/calculating a downlink pathloss estimate ($PL_{b,f,c}$) for the transmission power of the random access preamble based on the reference signal. The downlink pathloss estimate may be determined based on a first power term/parameter (e.g., referenceSignalPower) and a (determined) second power term/parameter (e.g., higher layer filtered RSRP, L3-RSRP). The downlink pathloss estimate may be equal to a difference between the first power term and the second power term (e.g., $PL_{b,f,c}$=referenceSignalPower−higher layer filtered RSRP).

A wireless device (e.g., the wireless device 1908, the wireless device 2008, or the wireless device 2108) may use the downlink pathloss estimate for determining the transmission power. The transmission power may comprise the downlink pathloss estimate.

The determining/calculating the downlink pathloss estimate for the transmission power of the random access preamble based on the reference signal may comprise measuring/assessing the reference signal to determine/calculate the second power term in the downlink pathloss estimate. The measuring/assessing the reference signal may comprise measuring a radio link quality (e.g., L1-RSRP, L3-RSRP, SINR, etc) of the reference signal.

The one or more configuration parameters may indicate a block power (e.g. by a higher layer parameter ss-PBCH- BlockPower). A value of the block power may indicate an average (e.g., a linear average) energy per resource element (EPRE) of resource elements that comprise/carry secondary synchronization signals (SSS). A base station (e.g., the base station 1904, the base station 2004, or the base station 2104) may use the SSS for an SS/PBCH transmission. The value of the block power may be in dBm (e.g., −60 dBm, −50 dBm, 0 dBm, 20 dBm, 30 dBm, 50 dBm, or any other value).

The wireless device may derive/determine the average EPRE (e.g., SS/PBCH SSS EPRE) based on the block power. A value of the block power may be equal to (or be defined as, or be substantially equal to) a linear average over power contributions of resource elements comprising/carrying SSS within the operating system bandwidth.

The one or more configuration parameters may indicate a power control offset (e.g. by a higher layer parameter powerControlOffsetSS). The one or more configuration parameters may indicate a power control offset for the reference signal. The power control offset may comprise (or be equal to, or be substantially equal to) a power offset of resource elements comprising/carrying non-zero power (NZP) CSI-RS to resource elements comprising/carrying SSS. A value of the power control offset may be in dB (e.g., −3 dB, 0 dB, 3 dB, 6 dB, or any other value). The wireless device 2108 may derive/determine an average EPRE (e.g., CSI-RS EPRE) based on the block power and the power control offset. The power control offset may indicate an offset of a transmission power of a CSI-RS transmission relative to a transmission power of an SS/PBCH block transmission.

The one or more configuration parameters may not indicate a power control offset (e.g. by a higher layer parameter powerControlOffsetSS). The wireless device may determine a value of the power control offset as a first offset (e.g., 0 dB, 1 dB, 3 dB, or any other value) based on the one or more configuration parameters not indicating the power control offset. The wireless device may set a value of the power control offset to a first offset based on the one or more configuration parameters not indicating the power control offset. The first offset may be equal to 0 dB (or any other value).

The determining/calculating the downlink pathloss estimate for the transmission power of the random access preamble based on the reference signal may comprise determining/calculating the first power term in the downlink pathloss estimate based on the reference signal. The reference signal may be a SS/PBCH block. The wireless device may determine the first power term (or a value for the first power term) based on the block power (e.g., provided by ss-PBCH-BlockPower). The determining/calculating the first power term in the downlink pathloss estimate based on the reference signal may comprise setting the first power term to a value of the indicated block power, for example, based on the reference signal being the SS/PBCH block. The determining/calculating the first power term in the downlink pathloss estimate based on the reference signal may comprise the first power term being equal to the indicated block power, for example, based on the reference signal being the SS/PBCH block.

The reference signal may be a CSI-RS. The wireless device 2108 may determine/calculate the power term (or a value for the first power term) based on the indicated block power (e.g., provided by ss-PBCH-BlockPower) and the indicated power control offset (e.g., provided by powerControlOffsetSS), for example, based on the reference signal being the CSI-RS. The wireless device may determine/calculate the first power term based on scaling the block power with a value of the power control offset. The scaling may comprise multiplying. The scaling may comprise dividing. The scaling may comprise adding. The scaling may comprise subtracting.

A first TCI state of CORESET (e.g., the CORESET 1912-1, the CORESET 2012-1, or the CORESET 2112) via which a PDCCH order (e.g., the PDCCH order 1916, the PDCCH order 2016, or the PDCCH order 2116) is received may indicate at least two reference signals. A first reference signal of the at least two reference signals may have a QCL TypeD (or any other quasi co-location type). The TCI state may indicate the QCL TypeD for the first reference signal of the at least two reference signals. A second reference signal of the at least two reference signals may have a different quasi co-location type (a quasi co-location type different from QCL TypeD). The TCI state may indicate, for the second reference signal, a QCL Type (e.g., QCL TypeA, QCL TypeB, QCL TypeC) different from QCL TypeD. The one or more configuration parameters may indicate power control offsets (e.g. by a higher layer parameter powerControlOffsetSS) for the at least two reference signals. The power control offsets may comprise a first power control offset for the first reference signal. The power control offsets may comprise a second power control offset for the second reference signal. The wireless device may determine a value for the power control offset based on the first power control offset, for example, based on the TCI state indicating the QCL TypeD for the first reference signal of the at least two reference signals. The determining the value for the power control offset based on the first power control offset may comprise setting the value of the power control offset as the first power control offset. The determining the value for the power control offset based on the first power control offset may comprise assigning a value of the first power control offset to the power control offset.

The wireless device may use an RS resource from the reference signal to determine the transmission power for the random access preamble. The wireless device may the use the reference signal as a pathloss reference RS to determine the transmission power.

The wireless device may send/transmit a random access preamble (e.g., the random access preamble 1920, the random access preamble 2020, or the random access preamble 2120) based on the determined/calculated transmission power. The wireless device 2108 may transmit the random access preamble based on the transmission power. The wireless device may transmit the random access preamble with the transmission power. The wireless device may transmit the random access preamble based on the downlink pathloss estimate.

The wireless device may monitor (or start monitoring) for DCI (e.g., DCI format 1_0), for example, based on transmitting the random access preamble. The DCI may schedule a PDSCH transmission comprising a random access response. The random access response may be for the random access preamble. A CRC of the DCI may be scrambled by an RNTI (e.g., RA-RNTI, C-RNTI, CS-RNTI, MCS-C-RNTI, TC-RNTI, etc). The RNTI may be an RA-RNTI. The RA-RNTI may be based on at least one random access resource (e.g., a PRACH occasion). The base station and/or the wireless device may determine the RA-RNTI based on the at least one random access resource. The monitoring for the DCI may comprise that the wireless device attempts to detect/receive the DCI in/during a response window (e.g., provided by a higher layer parameter ra-ResponseWindow). The one or more configuration parameters may indicate the response window. The wireless device may start the response window based on transmitting the random access preamble. The wireless device may attempt to detect/receive the DCI while the response window is running. The wireless device may monitor, for the DCI, a PDCCH in a second CORESET (e.g., CORESET 1912-2) of the one or more CORESETs. The second CORESET and a CORESET via which the PDCCH order is received (e.g., the CORESET 1912-1, the CORESET 2012-1, or the CORESET 2112) may be different. The second CORESET and the CORESET via which the PDCCH order is received may be the same. The one or more configuration parameters may indicate the second CORESET for a second cell (e.g., PCell) different from the cell (e.g., SCell) (e.g., the cell 1900, the cell 2000, the cell 2100). Tyhe one or more configuration parameters may indicate the second CORESET for the cell (e.g. PCell). The monitoring, for the DCI, the PDCCH in the second CORESET may comprise monitoring, for the DCI, the PDCCH for/in a search space set in (or associated with or linked to) the second CORESET. The search space set may be common search space (CSS) set (e.g., Type1-PDCCH CSS set). The search space set may be associated with (or linked to) the second CORESET. The search space set being associated with (or linked to) the second CORESET may comprise that a CORESET indicator/index field in/of the search space set indicates a second CORESET indicator/index of the second CORESET. The search space set being associated with (or linked to) the second CORESET may comprise that the one or more configuration parameters may indicate the second CORESET index of the second CORESET in a CORESET index field (e.g., provided by a higher layer parameter controlResourceSetId in the higher layer parameter SearchSpace) of the search space set. A value of the CORESET index field in/of the search space set may be equal to the second CORESET index of the second CORESET. The search space set being associated with (or linked to) the second CORESET may comprise that the one or more configuration parameters may indicate the second CORESET index of the second CORESET for the search space set.

The wireless device may monitor, for a DCI format with CRC scrambled by an RNTI (e.g., RA-RNTI or TC-RNTI), a PDCCH (or PDCCH candidates) in a search space set (e.g., Type1-PDCCH CSS set) on a cell (e.g., PCell. SCell). The Type1-PDCCH CSS set may be configured by higher layer parameter (e.g., ra-SearchSpace in PDCCH-ConfigCommon). The ra-SearchSpace may indicate/identify an index of a search space for a random access procedure. The ra-SearchSpace may be an indicator/index of a search space for a random access procedure. The ra-SearchSpace may be an identity of a search space for a random access procedure.

The one or more configuration parameters may indicate the ra-SearchSpace for the active downlink BWP of the cell. The one or more configuration parameters may indicate the ra-SearchSpace for the search space set. The one or more configuration parameters indicating the ra-SearchSpace for the search space set may comprise that a search space set index of the search space set is equal to the ra-SearchSpace. The one or more configuration parameters indicating the ra-SearchSpace for the search space set may comprise that the search space set is indicated/identified by the ra-SearchSpace.

The wireless device may receive the PDCCH transmission comprising/including the DCI in the second CORESET. The wireless device may receive the PDCCH transmission comprising/including the DCI for the search space set (e.g., Type1-PDCCH CSS set) in the second CORESET. The wireless device may receive the PDCCH transmission based on (or while) monitoring, for the DCI, the PDCCH for the search space set in the second CORESET. The DCI may schedule a PDSCH transmission comprising a random access response corresponding to the random access preamble (e.g., the random access preamble 1920, the random access preamble 2020, or the random access preamble 2120). The wireless device may complete the random access procedure based on receiving random access response corresponding to the random access preamble. The random access response corresponding to the random access preamble may indicate the random access preamble (or the random access preamble index of the random access preamble).

Figure 22:
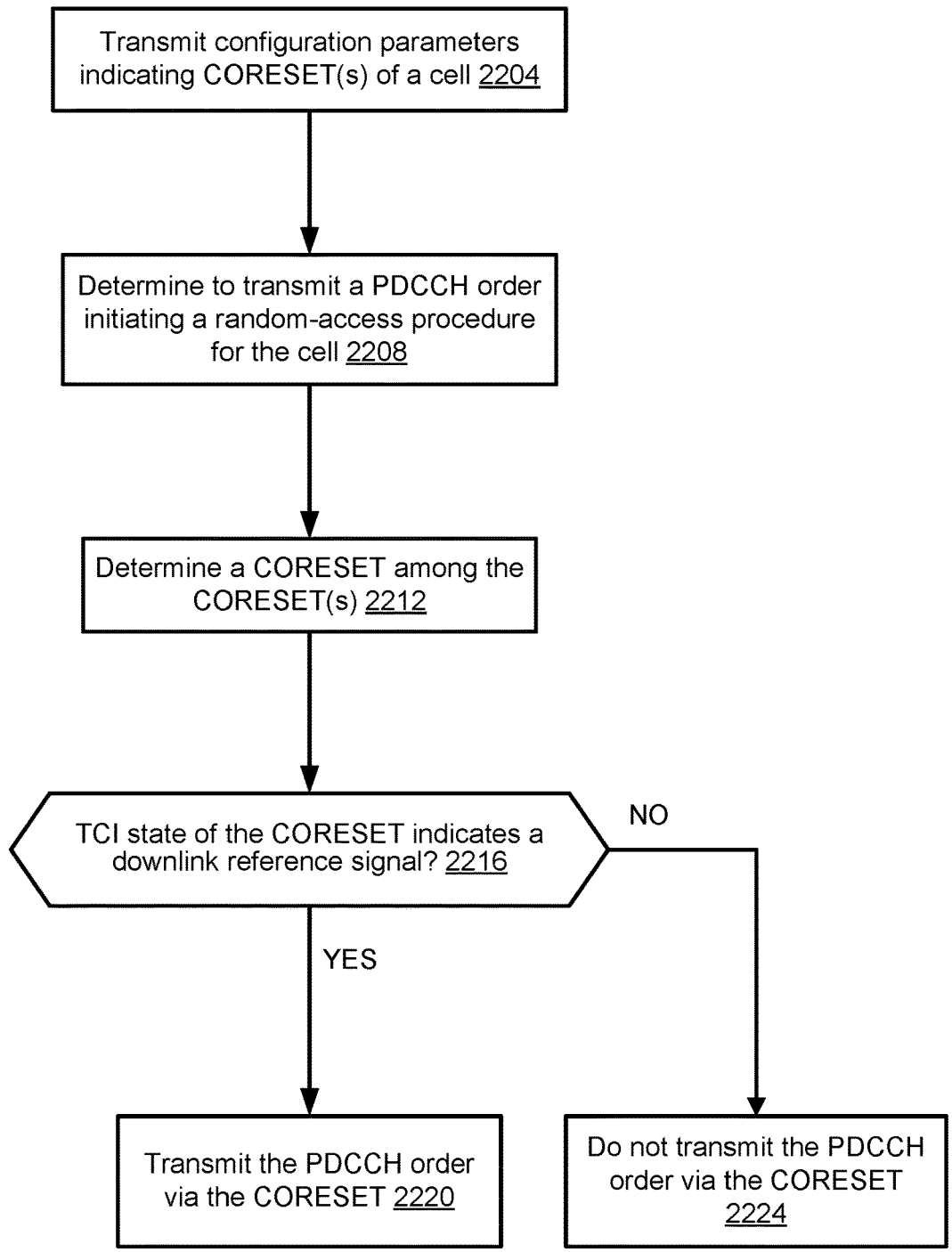
FIG. 22 shows an example method at a base station for a random access procedure.

FIG. 22 shows an example method at a base station for a random access procedure. The base station 1904 or the base station 2004 may perform the example method 2200. At step 2204, the base station may send/transmit configuration parameters indicating one or more CORESET(s) of a cell. At step 2208, the base station may determine to transmit a PDCCH order initiating a random access procedure for the cell. At step 2208, the base station may determine a CORESET among the one or more CORESET(s) (e.g., for transmission of the PDCCH order). At step 2216, the base station may determine whether a TCI state, associated with the CORESET, indicates a downlink reference signal. At step 2220, the base station may transmit the PDCCH order via the CORESET if the base station determines that the TCI state associated with the CORESET indicates a downlink reference signal. At step 2224, the base station may refrain from transmitting the PDCCH order via the CORESET if the base station determines that the TCI state associated with the CORESET does not indicate a downlink reference signal.

Figure 23:
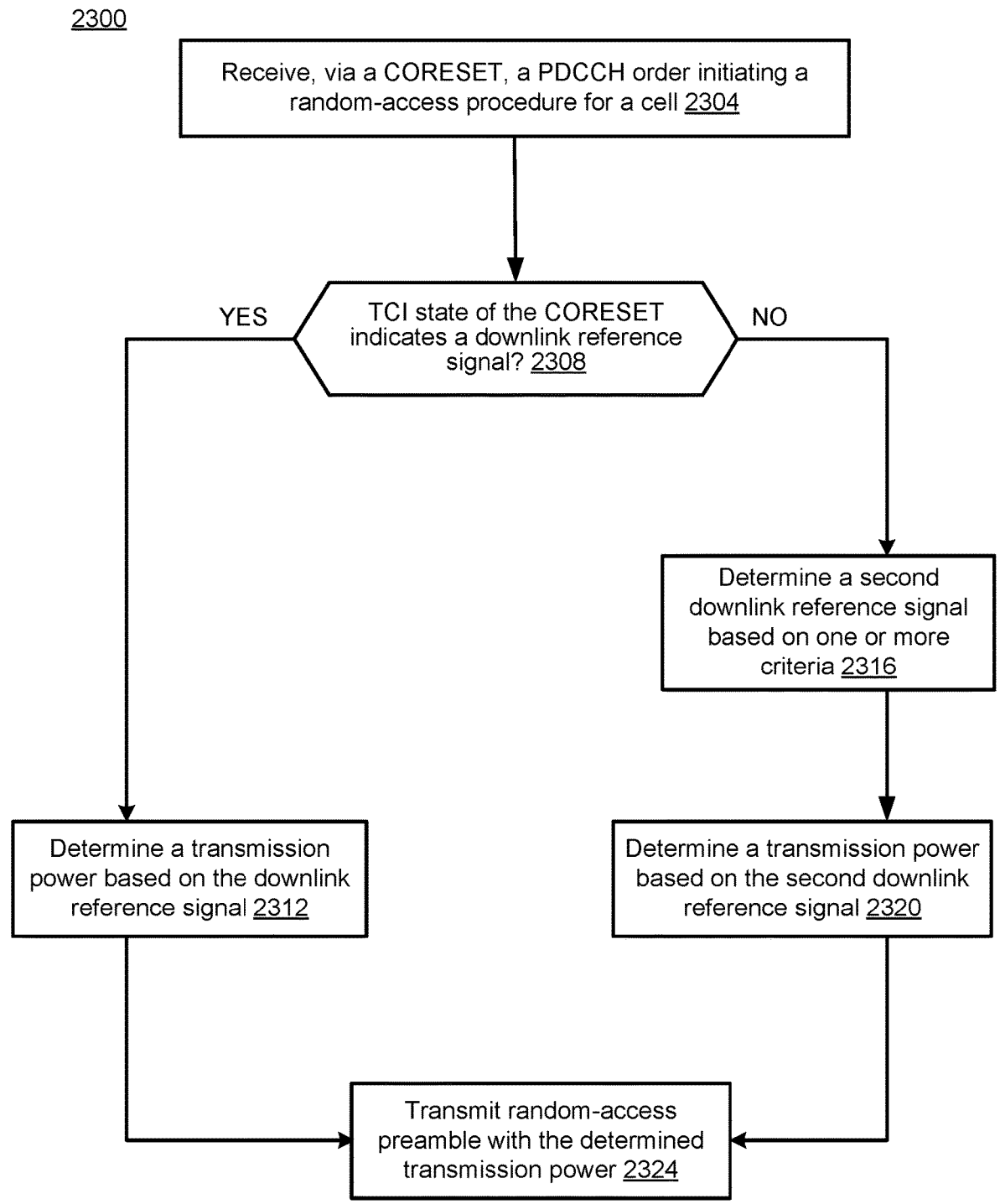
FIG. 23 shows an example method at a wireless device for a random access procedure.

FIG. 23 shows an example method at a wireless device for a random access procedure. The wireless device 1908, the wireless device 2008, or the wireless device 2108 may perform the example method 2300. At step 2304, the base station may receive, via a CORESET, a PDCCH order initiating a random access procedure for a cell. At step 2308, the wireless device may determine whether a TCI state of the CORESET indicates (e.g., is associated with) a downlink reference signal. At step 2312, the wireless device may determine a transmission power based on the downlink reference signal if the TCI state of the CORESET indicates a downlink reference signal. At step 2316, the wireless device may determine a second downlink reference signal based on one or more criteria (e.g., as described with reference to FIG. 21) if the TCI state of the CORESET does not indicate a downlink reference signal. At step 2324, the wireless device may send/transmit a random access preamble based on the determined transmission power (e.g., as determined at step 2312 or at step 2320).

A wireless device may receive (e.g., from a base station) a PDCCH order initiating a random access procedure (e.g., contention-free random access procedure or a contention-based random access procedure) for a cell (e.g., PCell, SCell). The wireless device may send/transmit a random access preamble for the random access procedure, for example, based on receiving the PDCCH order.

The wireless device may be equipped with a plurality of antenna panels. Each antenna panel of the plurality of antenna panels may correspond to (e.g., face, or be directed to transmit/receive to/from) a different direction. Each antenna panel of the plurality of antenna panels may transmit/receive via a different beam. Each antenna panel of the plurality of antenna panels may be associated with a different channel condition/environment.

The PDCCH order may indicate an antenna panel of the plurality of antenna panels. The antenna panel may or may not be synchronized (e.g., uplink synchronized). The wireless device may send/transmit a random access preamble, via the antenna panel indicated by the PDCCH order, based on the PDCCH order indicating the antenna panel.

In at least some types of wireless communications (e.g., compatible with 3GPP Release 16, earlier/later 3GPP releases or generations, and/or other access technology), a PDCCH order, indicating an antenna panel of a plurality of antenna panels associated with a wireless device, may comprise a field (e.g., a panel field) indicating the antenna panel. The panel field may 2 bits, 3 bits, or any other quantity of bits in length. A panel indicator/index of a first antenna panel, among a plurality of antenna panels, may be equal to a first value (e.g., 001). The PDCCH order may indicate the first antenna panel, of the plurality of antenna panels, for example, if a value of the panel field in the PDCCH order is equal to the first value (e.g., 001). A panel indicator/index of a second antenna panel may be equal to a second value (e.g., 101). The PDCCH order may indicate the second antenna panel, of the plurality of antenna panels, for example, if a value of the panel field in the PDCCH order is equal to the second value (e.g., 101).

Inclusion of the panel field in the PDCCH order may result in increased channel resource requirements for transmission of the PDCCH order, and/or reduce a quantity of available reserved bits in the PDCCH order (e.g., as set by a legacy communication protocol such as 3GPP Release 15, earlier/later 3GPP releases or generations, and/or other access technologies). The reserved bits may be used to indicate a serving cell, a UL/DL BWP, a TRP, CORESET index, etc., and using the reserved bits to indicate a panel index may remove this potential functionality of the reserved bits. Inclusion of an additional panel field may not be efficient and may increase the size of the PDCCH order. Inclusion of the panel field may increase resources required, at the wireless device, for blind decoding at the wireless device, which may lead to increased battery consumption.

Various examples described herein may implement enhanced signaling in a PDCCH order to indicate an antenna panel, for example, without adding additional field/bits. The base station may map each antenna panel of the plurality of antenna panels to a respective indicator/index that may be indicated in other fields of the PDCCH order. The wireless device may determine an antenna panel based on an indicator/index in a field of a received PDCCH order.

The base station may map each antenna panel of the plurality of antenna panels to a respective random access preamble indicator/index. The wireless device may determine an antenna panel, of the plurality of antenna panels, mapped to a random access preamble index indicated in the PDCCH order. The wireless device may send/transmit a random access preamble via the antenna panel mapped to the random access preamble index.

The base station may map each antenna panel of the plurality of antenna panels to a respective reference signal indicator/index (e.g., SS/PBCH block indicator/index). The wireless device may determine an antenna panel, of the plurality of antenna panels, mapped to a reference signal index indicated in the PDCCH order. The wireless device may send/transmit a random access preamble via the antenna panel mapped to the reference signal index.

The base station may map each antenna panel of the plurality of antenna panels to a respective CORESET (or search space set). The wireless device may determine an antenna panel, of the plurality of antenna panels, mapped to a control resource set (or a search space set) via which the PDCCH order is received. The wireless device may send/transmit a random access preamble via the antenna panel mapped to the control resource set (or the search space set). Determination of an antenna panel for transmission of a random access preamble as described herein may enable using an existing PDCCH order format without adding additional field/bits to indicate an antenna panel. The power consumption due to blind decoding at the wireless device may be reduced if additional fields are not included in a PDCCH order.

Figure 24:
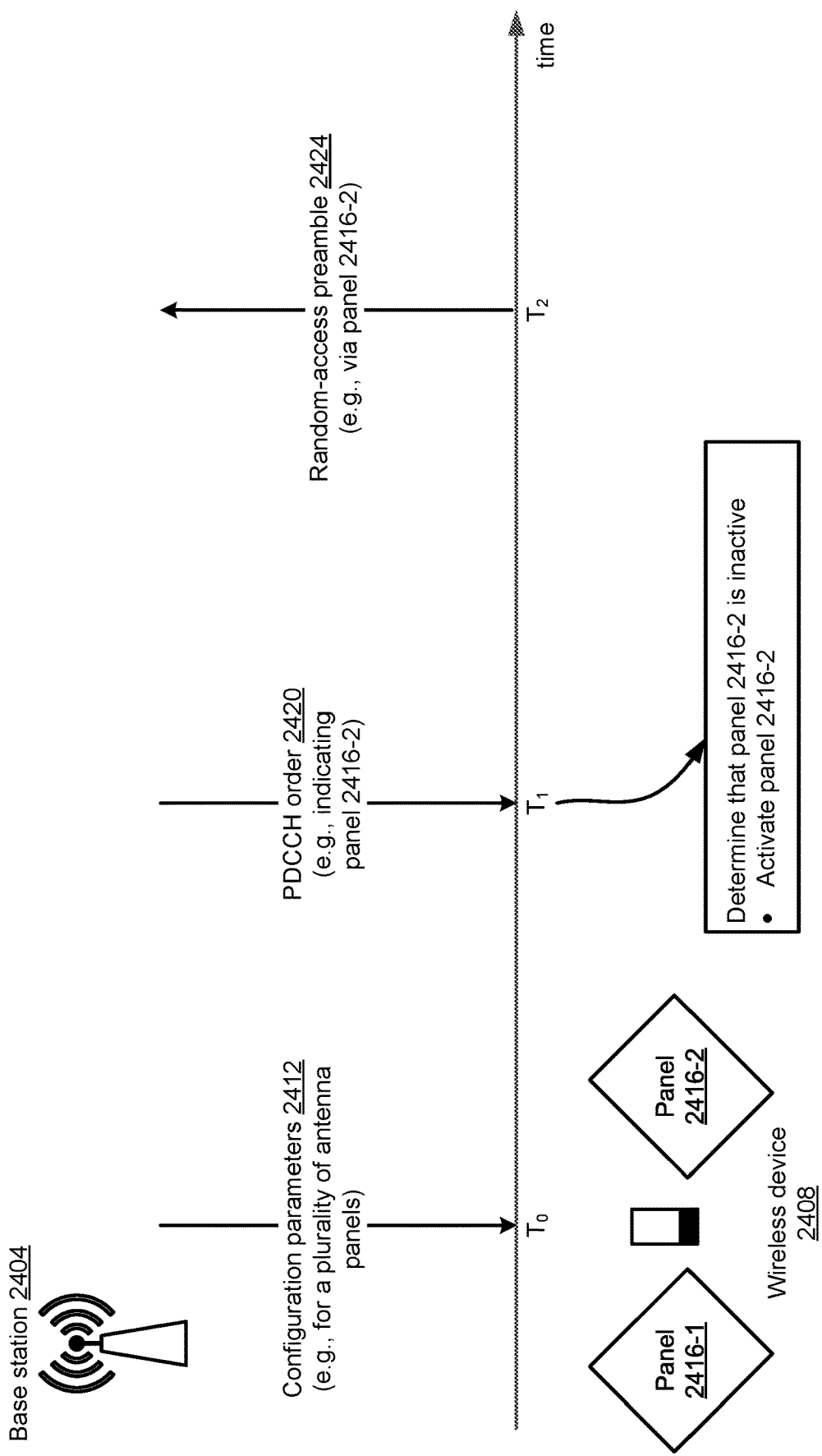
FIG. 24 shows example communications for a random access procedure comprising antenna panel determination.

FIG. 24 shows example communications for a random access procedure comprising antenna panel determination. The example communications may be used for determining/selecting an antenna panel, for a random access preamble transmission, at a multi-panel wireless device 2408. A base station 2404 may send, to the wireless device 2408, an indication (e.g., via a PDCCH order) indicating an antenna panel for the random access preamble transmission. The wireless device 2408 may select the indicated antenna panel and send/transmit the random access preamble based on the PDCCH order.

The wireless device 2408 may receive one or more messages (e.g., at or after time $T_0$). The wireless device 2408 may receive the one or more messages from the base station 2404. The one or more messages may comprise one or more configuration parameters 2412. The one or more configuration parameters may be for a cell.

The wireless device 2408 may be equipped with a plurality of antenna panels 2416 (e.g., panel 2416-1 and panel 2416-2). An antenna panel of the plurality of antenna panels 2416 may be in one of an active state and a deactivated state. The active state of an antenna panel may comprise monitoring a downlink channel/signal (e.g., a PDCCH, DCI, CSI-RS, a PDSCH) on/via/with the antenna panel. The active state of an antenna panel may comprise receiving a downlink signal (e.g., a PDCCH transmission, DCI, CSI-RS, a PDSCH transmission) on/via/with the antenna panel. The active state of an antenna panel may comprise sending/transmitting an uplink signal (e.g., a PUCCH transmission, a preamble, a PUSCH transmission, a PRACH transmission, SRS, etc) on/via/with the antenna panel.

The deactivated state of an antenna panel may comprise not monitoring a downlink channel/signal (e.g., a PDCCH, DCI, CSI-RS, a PDSCH) on/via/with the antenna panel. The deactivated state of an antenna panel may comprise not receiving a downlink signal (e.g., a PDCCH transmission, DCI, CSI-RS, a PDSCH transmission) on/via/with the antenna panel. The deactivated state of an antenna panel may comprise not transmitting (e.g., refraining from transmitting) an uplink signal (e.g., a PUCCH transmission, a preamble, a PUSCH transmission, a PRACH transmission, SRS, etc) on/via/with the antenna panel.

The one or more configuration parameters may indicate panel indices (e.g., provided by a higher layer parameter) for the plurality of antenna panels 2416. Each antenna panel of the plurality of antenna panels 2416 may be identified by a respective panel indicator/index of the panel indices. A first antenna panel (e.g., the panel 2416-1) of the plurality of antenna panels 2416 may be indicated/identified by a first panel indicator/index of the panel indices. A second antenna panel (e.g., the panel 2416-2) of the plurality of antenna panels may be indicated/identified by a second panel index of the panel indices.

The one or more configuration parameters 2412 may indicate one or more SRS resource sets for the cell (e.g., provided by a higher layer parameter SRS-ResourceSet).

The one or more configuration parameters 2412 may indicate SRS resource set indicators/indices (e.g., provided by a higher layer parameter SRS-ResourceSetId) for the one or more SRS resource sets. Each SRS resource set of the one or more SRS resource sets may be indicated/identified by a respective one SRS resource set indicator/index of the SRS resource set indicators/indices. A first SRS resource set of the one or more SRS resource sets may be indicated/identified by a first SRS resource set indicator/index. A second SRS resource set of the one or more SRS resource sets may be identified by a second SRS resource set indicator/index.

The wireless device 2408 may send/transmit a first SRS for the first SRS resource set via a first antenna panel (e.g., the panel 2416-1) of the plurality of antenna panels 2416. The wireless device 2408 may send/transmit a second SRS for the second SRS resource set via a second antenna panel (e.g., the panel 2416-2) of the plurality of antenna panels 2416. Each SRS resource set may be associated with a respective antenna panel of the plurality of antenna panels 2416. The first SRS resource set index may indicate/identify the first antenna panel. The second SRS resource set index may indicate/identify the second antenna panel. The first panel index and the first SRS resource set index may be the same. The second panel index and the second SRS resource set index may be the same. Each antenna panel of the plurality of antenna panels 2416 may be identified by a respective one SRS resource set index of the SRS resource set indices. The first panel index may be equal to the first SRS resource set index, for example, based on the transmitting first SRS for the first SRS resource set via the first antenna panel. The second panel index may be equal to the second SRS resource set index, for example, based on the transmitting second SRS for the second SRS resource set via the second antenna panel.

The one or more configuration parameters 2412 may indicate one or more CORESETs for the cell. The wireless device 2408 may receive a PDCCH order 2420 (e.g., at or after time $T_1$) initiating a random access procedure. The wireless device 2408 may receive the PDCCH order 2420 via an active antenna panel (e.g., the panel 2412-1) of the plurality of antenna panels 2412. The wireless device 2408 may receive the PDCCH order 2420 via a CORESET of the one or more CORESETs. The random access procedure may be a contention-free random access procedure (e.g., non-contention based random access procedure). The wireless device 2408 may initiate the random access procedure for the cell. The PDCCH order 2420 may initiate/trigger the random access procedure for the cell. The wireless device 2408 may initiate the random access procedure based on the receiving the PDCCH order 2420. The PDCCH order 2420 may indicate a random access preamble indicator/index. The PDCCH order 2420 may indicate a reference signal indicator/index.

Figure 25:
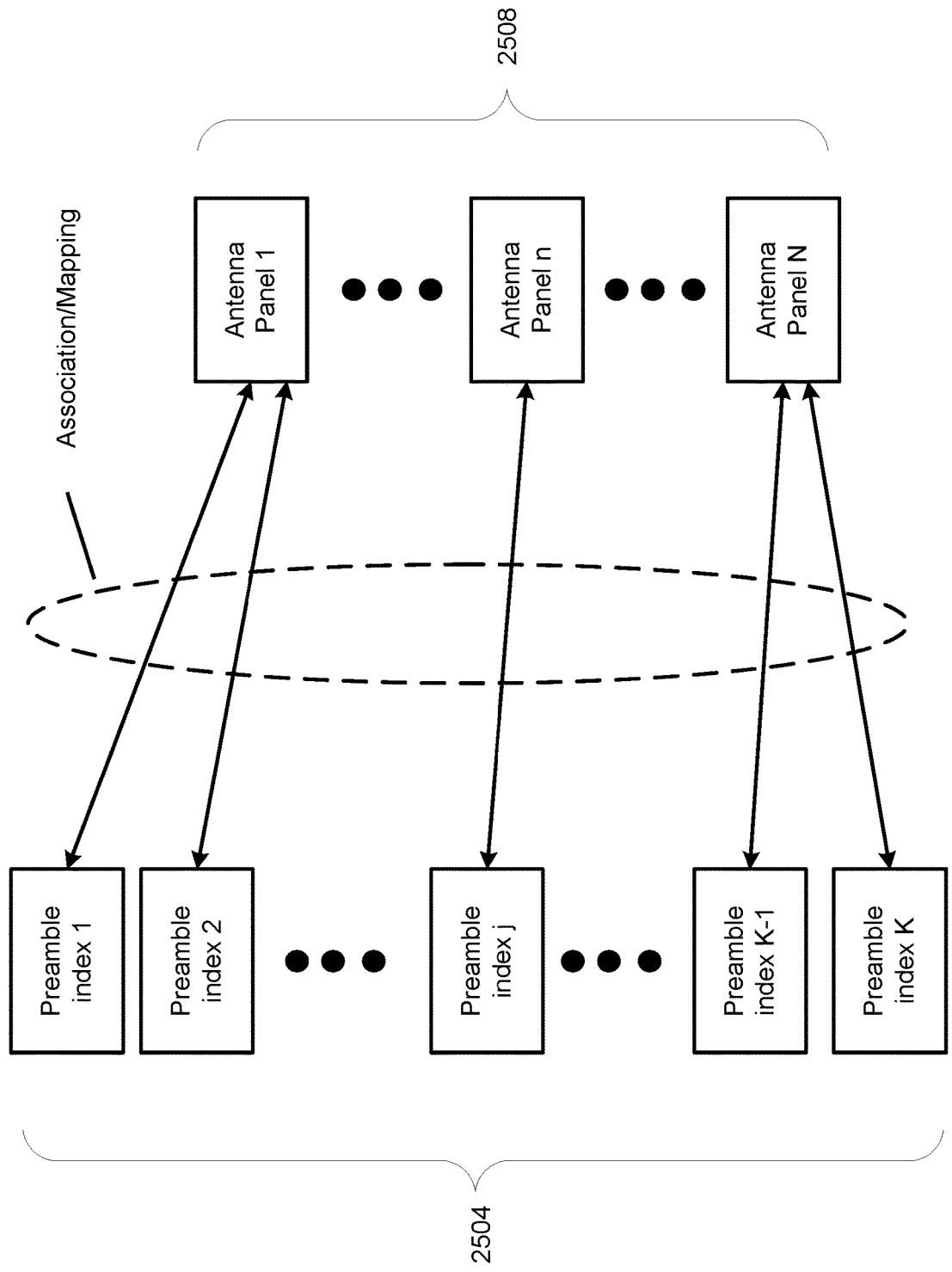
FIG. 25 shows example associations/mappings between one or more random access preamble indicators/indices and a plurality of antenna panels at a wireless device.

FIG. 25 shows example associations/mappings between one or more random access preamble indicators/indices 2504 and a plurality of antenna panels 2508 at a wireless device (e.g., the wireless device 2408). The one or more random access preamble indicators/indices 2504 may comprise a preamble index 1, a preamble index 2, . . . , a preamble index K. The plurality of antenna panels 2508 may comprise antenna panel 1, . . . , antenna panel N. One or more configuration paramaters (e.g., the one or more configuration parameters 2412) may indicate the associations/mappings. The associations may be one to one (e.g., preamble index j may be associated with (or mapped to) an antenna panel n and may not be associated with (or mapped to) an antenna panel m that is different than Antenna panel n). The associations may be many to one (e.g., preamble index 1 and preamble index 2 may be associated with (or mapped to) antenna panel 1; preamble index K−1 and preamble index K may be associated with (or mapped to) Antenna panel N). The associations may be one to many. The wireless device may send/transmit a random access preamble via antenna panel 1 associated with (or mapped to) the preamble index 1 in a PDCCH order (e.g., the PDCCH order 2420), for example, if the wireless device receives the PDCCH order comprising preamble index 1. The wireless device may send/transmit a random access preamble via antenna panel N associated with (or mapped to) the preamble index K in a PDCCH order, for example, if the wireless device receives a PDCCH order comprising preamble index K. A random access preamble index of the one or more random access preamble indices 2504 being associated with (or mapped to) an antenna panel of the plurality of antenna panels 2508 may comprise that the random access preamble index is associated with (or mapped to) a panel index of the antenna panel. One or more configuration parameters (e.g., the one or more configuration parameters 2412) may indicate the panel index for the random access preamble index. The one or more configuration parameters may associate (or map) the panel index with (or to) the random access preamble index. The panel indices may comprise the panel index.

The PDCCH order (e.g., the PDCCH order 2420) may comprise a random access preamble index (e.g., preamble index j) of the one or more random access preamble indices 2504. The PDCCH order may comprise at least one of: random access preamble indicator/index, an SUL indicator (e.g., UL/SUL indicator), a SS/PBCH indicator/index, and/or a PRACH mask indicator/index. The random access preamble indicator/index may indicate a random access preamble to use in the random access procedure. The SUL indicator may indicate whether to transmit the random access preamble on a SUL carrier or a NUL carrier. The SS/PBCH indicator/index may be used to identify a group of RACH occasions. The PRACH mask indicator/index may indicate a relative RACH occasion index that corresponds to the indicated SS/PBCH indicator/index.

The PDCCH order 2420 may indicate an antenna panel (e.g., the panel 2416-2) of the plurality of antenna panels 2416. The PDCCH order 2420 indicating the antenna panel may comprise that the random access preamble index in the PDCCH order 2420 may be associated with (or mapped to) the antenna panel (e.g., the panel 2416-2). The wireless device 2408 may determine the antenna panel, of the plurality of antenna panels 2416, associated with (or mapped to) the random-access preamble index in the PDCCH order 2420, for example, based on the one or more associations (or mappings) between the one or more random access preamble indices and the plurality of antenna panels. The wireless device 2408 may send/transmit a random access preamble 2424 via the determined antenna panel (e.g., panel 2416-2). The random access preamble 2424 may correspond to the random-access preamble index in the PDCCH order 2420. The wireless device may activate the panel 2416-2 (e.g., prior to transmitting the random access preamble 2424) based on receiving the PDCCH order 2420 if the panel 2416-2 is inactive.

Figure 26:
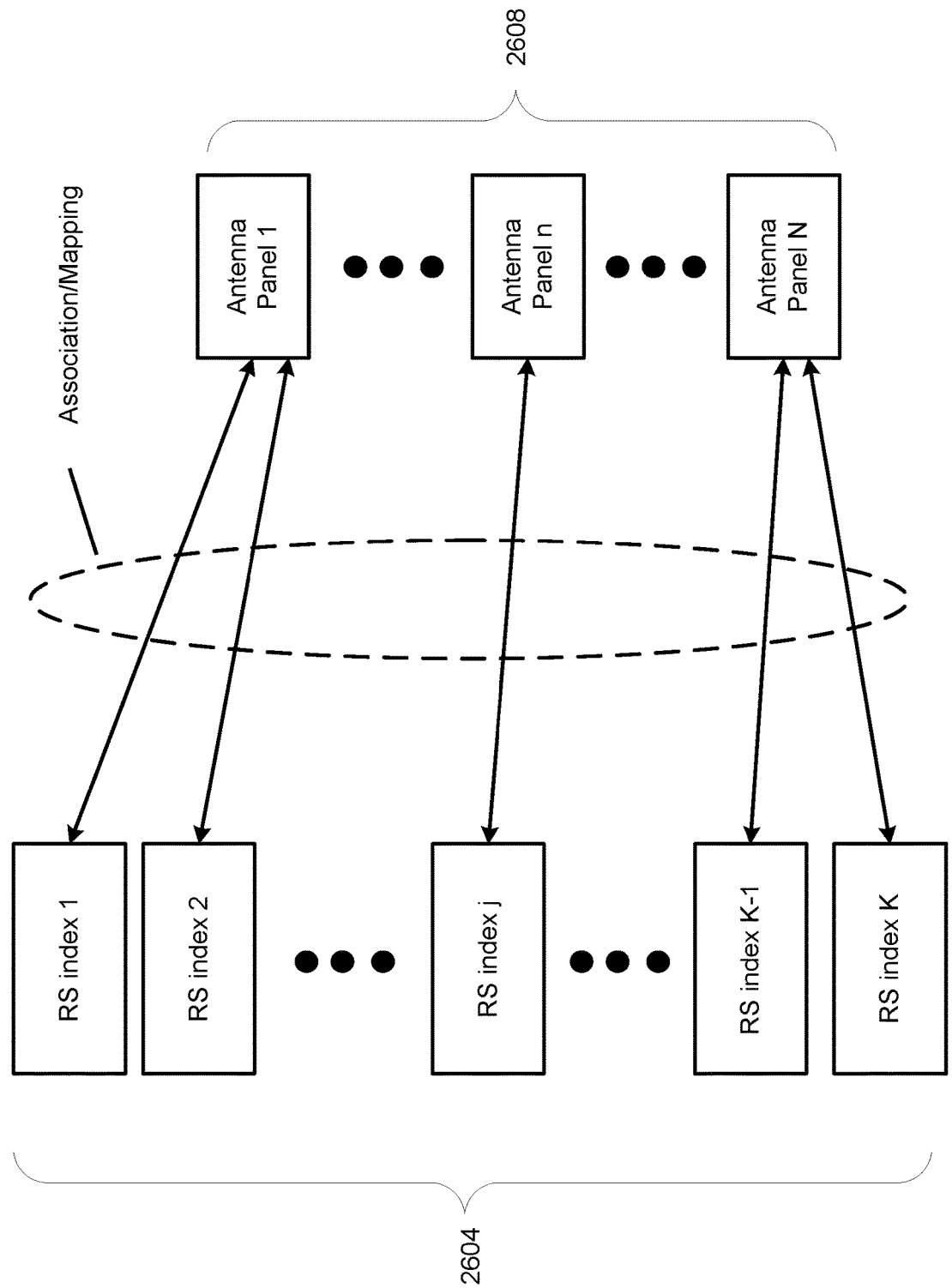
FIG. 26 shows example associations/mappings between one or more reference signal indicators/indices and a plurality of antenna panels at a wireless device.

FIG. 26 shows example associations/mappings between one or more reference signal indicators/indices 2604 and a plurality of antenna panels 2608 at a wireless device (e.g., the wireless device 2408). The one or more reference signal indicators/indices 2604 may comprise one or more of SS/PBCH index, RS index 1, RS index 2, . . . RS index K. The plurality of antenna panels 2608 may comprise antenna panel 1, . . . antenna panel N. One or more configuration paramaters (e.g., the one or more configuration parameters 2412) may indicate the associations/mappings. The associations may be one to one (e.g., RS index j may be associated with (or mapped to) an antenna panel n and RS index j may not be associated with (or mapped to) an antenna panel m that is different from the antenna panel n). The associations may be many to one (e.g., RS index 1 and RS index 2 may be associated with (or mapped to) antenna panel 1; RS index K−1 and RS index K may be associated with (or mapped to) antenna panel N). The associations may be one to many. The wireless device may send/transmit a random access preamble via antenna Panel 1 associated with (or mapped to) the RS index 1 in a PDCCH order (e.g., the PDCCH order 2420), for example, if the wireless device receives the PDCCH order comprising RS index 1 (e.g., SS/PBCH index). The wireless device may send/transmit a random access preamble via antenna Panel N associated with (or mapped to) the RS index K in a PDCCH order, for example, if the wireless device receives a PDCCH order comprising RS index K (e.g., SS/PBCH index). A reference signal index (e.g., SS/PBCH index) of the one or more reference signal indices being associated with (or mapped to) an antenna panel of the plurality of antenna panels may comprise that the reference signal index is associated with (or mapped to) a panel index of the antenna panel. One or more configuration parameters (e.g., the one or more configuration parameters 2412) may indicate the panel index for the reference signal index. The one or more configuration parameters may associate (or map) the panel index with (or to) the reference signal index. The panel indices may comprise the panel index.

The PDCCH order 2420 may comprise a reference signal index (e.g., SS/PBCH index) of the one or more reference signal indices. The reference signal index may indicate an indicated SS/PBCH index to identify a group of RACH occasions. The PDCCH order 2420 may indicate an antenna panel (e.g., the panel 2416-2) of the plurality of antenna panels 2416. The PDCCH order 2420 indicating the antenna panel (e.g., the panel 2416-2) may comprise that the reference signal index in the PDCCH order 2420 may be associated with (or mapped to) the antenna panel (e.g., the panel 2416-2). The wireless device 2408 may determine an antenna panel, of the plurality of antenna panels 2416, associated with (or mapped to) the reference signal index in the PDCCH order 2420, for example, based on the one or more associations (or mappings) between the one or more reference signal indices and the plurality of antenna panels 2416. The wireless device 2408 may send/transmit a random access preamble 2424 via the determined antenna panel (e.g., panel 2416-2). The wireless device may activate the panel 2416-2 (e.g., prior to transmitting the random access preamble 2424) based on receiving the PDCCH order 2420 if the panel 2416-2 is inactive.

Figure 27:
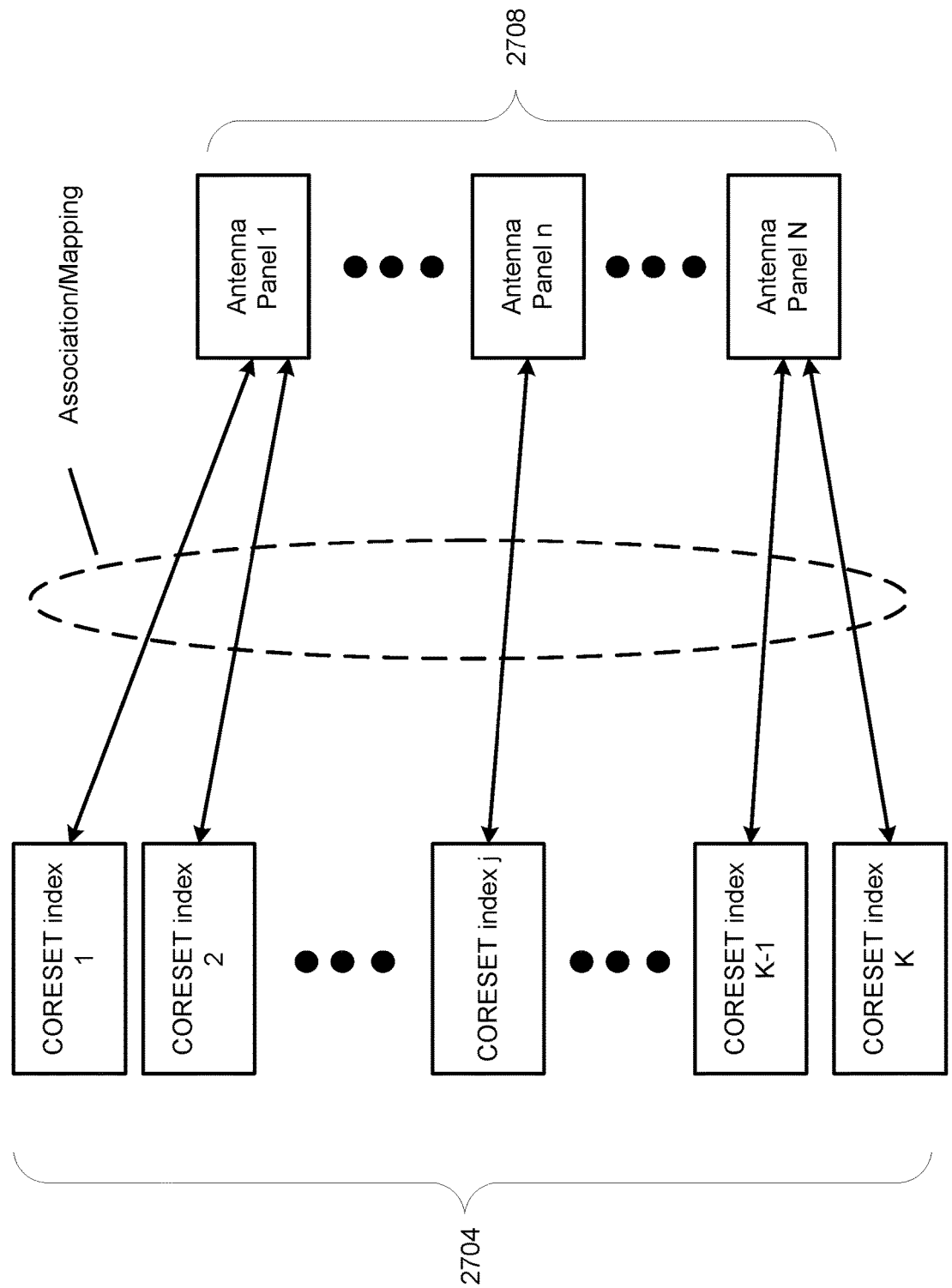
FIG. 27 shows example associations/mappings between CORESET indicators/indices and a plurality of antenna panels at a wireless device.

FIG. 27 shows example associations (or mappings) between CORESET indicators/indices 2704 of one or more CORESETs and a plurality of antenna panels 2708 at a wireless device (e.g., the wireless device 2408). The CORESET indicators/indices 2704 may comprise CORESET index 1, CORESET index 2, . . . CORESET index K. The CORESET indicators/indices 2704 may provided by a higher layer parameter (e.g., ControlResourceSetId). The plurality of antenna panels 2708 may comprise antenna panel 1, . . . antenna panel N. One or more configuration paramaters (e.g., the one or more configuration parameters 2412) may indicate the associations/mappings. The associations may be one to one (e.g., CORESET index j may be associated with (or mapped to) antenna panel n). The associations may be many to one (e.g., CORESET index 1 and CORESET index 2 may be associated with (or mapped to) antenna panel 1; CORESET index K−1 and CORESET index K may be associated with (or mapped to) antenna panel N). The associations may be one to many. The wireless device may send/transmit a random access preamble via antenna Panel 1 associated with (or mapped to) the CORESET index 1, for example, if the wireless device receives a PDCCH order (e.g., the PDCCH order 2420) via a CORESET identified with the CORESET index 1. The wireless device may send/transmit a random access preamble via antenna Panel N associated with (or mapped to) the CORESET index K, for example, if the wireless device receives a PDCCH order (e.g., the PDCCH order 2420) via a CORESET identified by a CORESET index K. A CORESET index of the CORESET indices being associated with (or mapped to) an antenna panel of the plurality of antenna panels may comprise that the CORESET index is associated with (or mapped to) a panel index of the antenna panel. The one or more configuration parameters (e.g., the one or more configuration parameters 2412) may indicate the panel index for a CORESET identified by the CORESET index. The one or more configuration parameters may associate (or map) the panel index with (or to) the CORESET index. The panel indices may comprise the panel index.

The wireless device 2408 may receive the PDCCH order 2420 via a CORESET of the one or more CORESETs. The CORESET may be identified by a CORESET index of the CORESET indices. The PDCCH order 2420 may indicate an antenna panel (e.g., panel 2416-2) of the plurality of antenna panels 2416. The PDCCH order 2420 indicating the antenna panel may comprise that the CORESET index of the CORESET via which the wireless device 2408 receives the PDCCH order 2420 may be associated with (or mapped to) the antenna panel. The wireless device 2408 may determine the antenna panel (e.g., panel 2416-2), of the plurality of antenna panels 2416, associated with (or mapped to) the CORESET index of the CORESET via which the PDCCH order 2420 is received, for example, based on the one or more associations (or mappings) between the CORESET indices and the plurality of antenna panels 2416. The wireless device 2408 may send/transmit a random access preamble 2424 via the determined antenna panel (e.g., panel 2416-2). The wireless device may activate the panel 2416-2 (e.g., prior to transmitting the random access preamble 2424) based on receiving the PDCCH order 2420 if the panel 2416-2 is inactive.

The one or more configuration parameters 2412 may indicate one or more search space sets for an active downlink BWP of the cell (e.g., as provided by a higher layer parameter SearchSpace). The one or more configuration parameters 2412 may indicate one or more search space sets for the cell (e.g., as provided by a higher layer parameter SearchSpace).

The one or more configuration parameters 2412 may indicate search space set indicators/indices for the one or more search space sets (e.g., provided by a higher layer parameter searchSpaceId). Each search space set of the one or more search space sets may be indicated/identified by a respective search space set indicator/index of the search space set indicators/indices. A first search space set of the one or more search space sets may be identified by a first search space set index of the search space set indices. A second search space set of the one or more search space sets may be identified by a second search space set index of the search space set indices.

Figure 28:
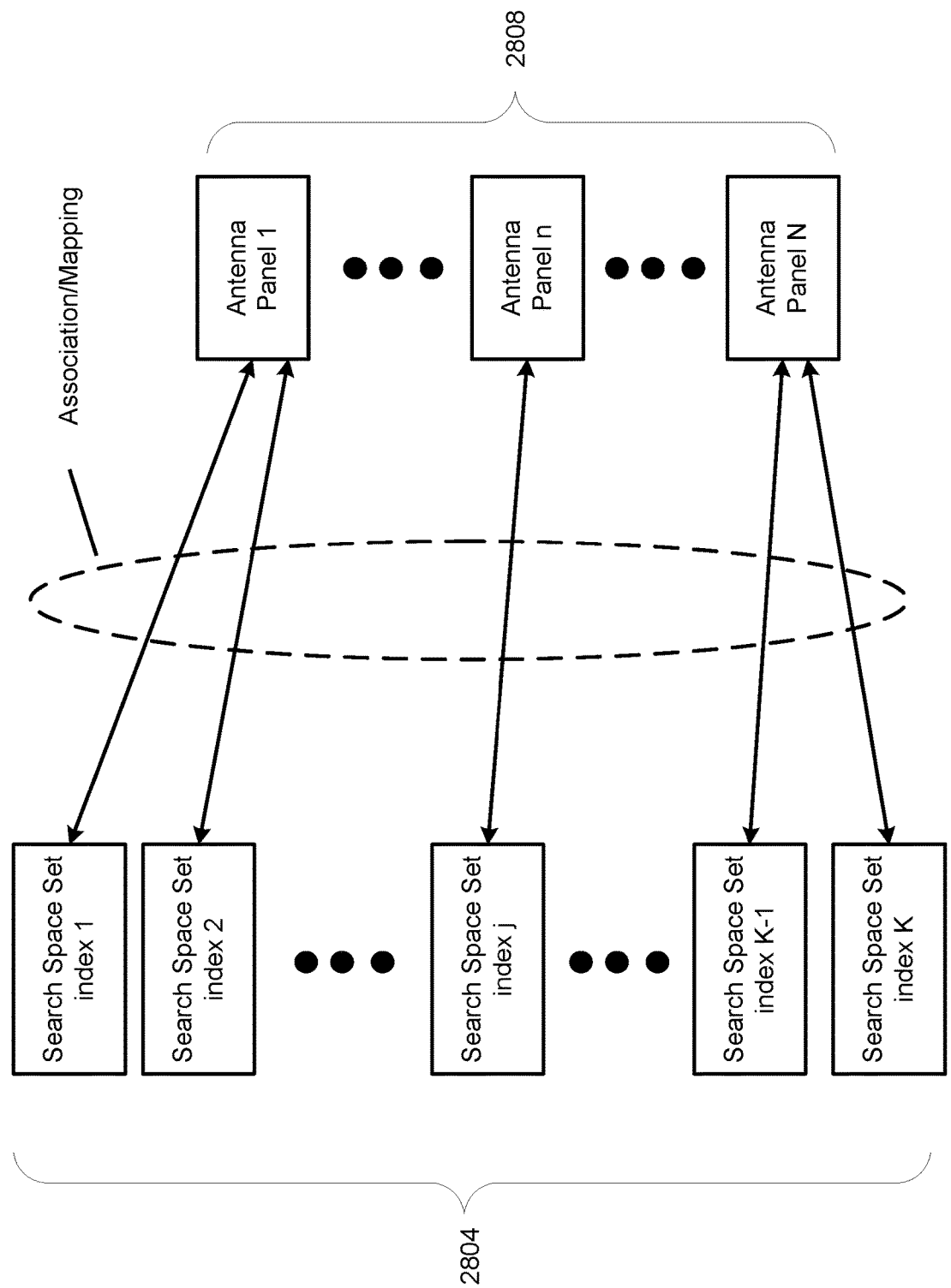
FIG. 28 shows example associations/mappings between search space set indicators/indices and a plurality of antenna panels at a wireless device.

FIG. 28 shows example associations/mappings between search space set indicators/indices 2804 and a plurality of antenna panels 2808 at a wireless device (e.g., the wireless device 2408). The search space set indicators/indices 2704 may comprise search space set index 1, search space set index 2, . . . search space set index K. The plurality of antenna panels 2808 may comprise antenna panel 1, . . . antenna panel N. One or more configuration paramaters (e.g., the one or more configuration parameters 2412) may indicate the associations/mappings. The associations may be one to one (e.g., search space set index j may be associated with (or mapped to) antenna panel n). The associations may be many to one (e.g., search space set index 1 and search space set index 2 may be associated with (or mapped to) antenna panel 1; search space set index K−1 and search space set index K may be associated with (or mapped to) antenna panel N). The associations may be one to many. The wireless device send/transmit a random access preamble via antenna panel 1 associated with (or mapped to) the search space set index 1, for example, if the wireless device receives a PDCCH order via a search space set indicated/ identified by a search space set index 1. The wireless device may send/transmit a random access preamble via antenna panel N associated with (or mapped to) the search space set index K, for example, if the wireless device receives a PDCCH order via a search space set indicated/identified by a search space set index K. A search space set index of the search space set indices being associated with (or mapped to) an antenna panel of the plurality of antenna panels may comprise the search space set index is associated with (or mapped to) a panel index of the antenna panel. The one or more configuration parameters may indicate the panel index for a search space set identified by the search space set index. The one or more configuration parameters may associate (or map) the panel index with (or to) the search space set index. The panel indices may comprise the panel index.

The wireless device 2408 may receive the PDCCH order 2420 via a search space set of the one or more search space sets. The search space set may be identified by a search space set index of the search space set indices. The PDCCH order 2420 may indicate an antenna panel (e.g., the panel 2416-2) of the plurality of antenna panels 2416. The PDCCH order 2420 indicating the antenna panel may comprise that the search space set index of the search space set via which the wireless device 2408 receives the PDCCH order 2420 may be associated with (or mapped to) the antenna panel. The wireless device 2408 may determine an antenna panel (e.g., the panel 2416-2), of the plurality of antenna panels 2416, associated with (or mapped to) the search space set index of the search space via which that the PDCCH order 2420 is received, for example, based on the one or more associations (or mappings) between the search space set indices and the plurality of antenna panels 2416. The wireless device 2408 may send/transmit a random access preamble 2424 via the determined antenna panel (e.g., panel 2416-2). The wireless device may activate the panel 2416-2 (e.g., prior to transmitting the random access preamble 2424) based on receiving the PDCCH order 2420 if the panel 2416-2 is inactive.

The wireless device 2408 may receive the PDCCH order 2420 in a search space set of a CORESET. The search space may be linked to (or associated with) the CORESET. The search space set may be CSS set. The search space set may be a wireless device (e.g., UE) specific search space (USS) set.

A search space set of the one or more search space sets may be associated with (or linked to) a CORESET of the one or more CORESETs. The one or more configuration parameters 2412 may indicate the CORESET (or a CORESET indicator/index of the CORESET) for the search space set (e.g., provided by a higher layer parameter controlResource-SetId in the higher layer parameter SearchSpace). The association (or the linkage) may be one-to-one. The association being one-to-one may comprise that the search space set may be associated with (or linked to) the CORESET and may not be associated (or linked to) a second CORESET that is different from the CORESET.

The wireless device 2408 may receive the PDCCH order 2420 via an active antenna panel (e.g., the panel 2416-1) different from the antenna panel (e.g., the panel 2416-2) indicated by the PDCCH order 2420. The plurality of antenna panels 2416 may comprise the active antenna panel. The active antenna panel may be in an active state.

The PDCCH order 2420 indicating the antenna panel may comprise that a new index/indicator in the PDCCH order 2420 may indicate a panel index of the antenna panel. A value of the new indicator/index may be equal to (or the same as) the panel index of an antenna panel. The new indicator/index in the PDCCH order 2420 may be equal to a first panel index of a first antenna panel (e.g., the panel 1 2416-2). The PDCCH order 2420 may indicate the first antenna panel, for example, based on the new index being equal to the first panel index of the first antenna panel. The new indicator/index in the PDCCH order 2420 may be equal to a second panel index of a second antenna panel (e.g., the panel 2416-2). The PDCCH order 2420 may indicate the second antenna panel, for example, based on the new index being equal to the second panel index of the second antenna panel. The wireless device 2408 may send/transmit a random access preamble 2424 via the indicated antenna panel (e.g., panel 2416-2). The wireless device may activate the panel 2416-2 (e.g., prior to transmitting the random access preamble 2424) based on receiving the PDCCH order 2420 if the panel 2416-2 is inactive.

The wireless device 2408 may determine that the antenna panel (e.g., the panel 2416-2) indicated by the PDCCH order 2420 is in a deactivated state (e.g., or not in an active state, in an inactive state). The wireless device 2408 may activate the antenna panel, for example, based on the determining that the antenna panel indicated by the PDCCH order 2420 is in the deactivated state. The activating the antenna panel may comprise transitioning the antenna panel into an active state (e.g., from the deactivated state).

The wireless device 2408 may send/transmit a random access preamble 2424 for the random access procedure (e.g., at or after time $T_2$), for example, based on the receiving the PDCCH order 2420. The wireless device 2408 may transmit the random access preamble 2424 via at least one random access resource (e.g., a PRACH occasion) of an active uplink BWP of the cell. The wireless device 2408 may transmit the random access preamble 2424 via/with the antenna panel (e.g., the panel 2416-2) indicated by the PDCCH order 2420. The wireless device 2408 may transmit the random access preamble 2424 via/with the antenna panel indicated by the PDCCH order 2420, for example, based on the activating the antenna panel.

Figure 29:
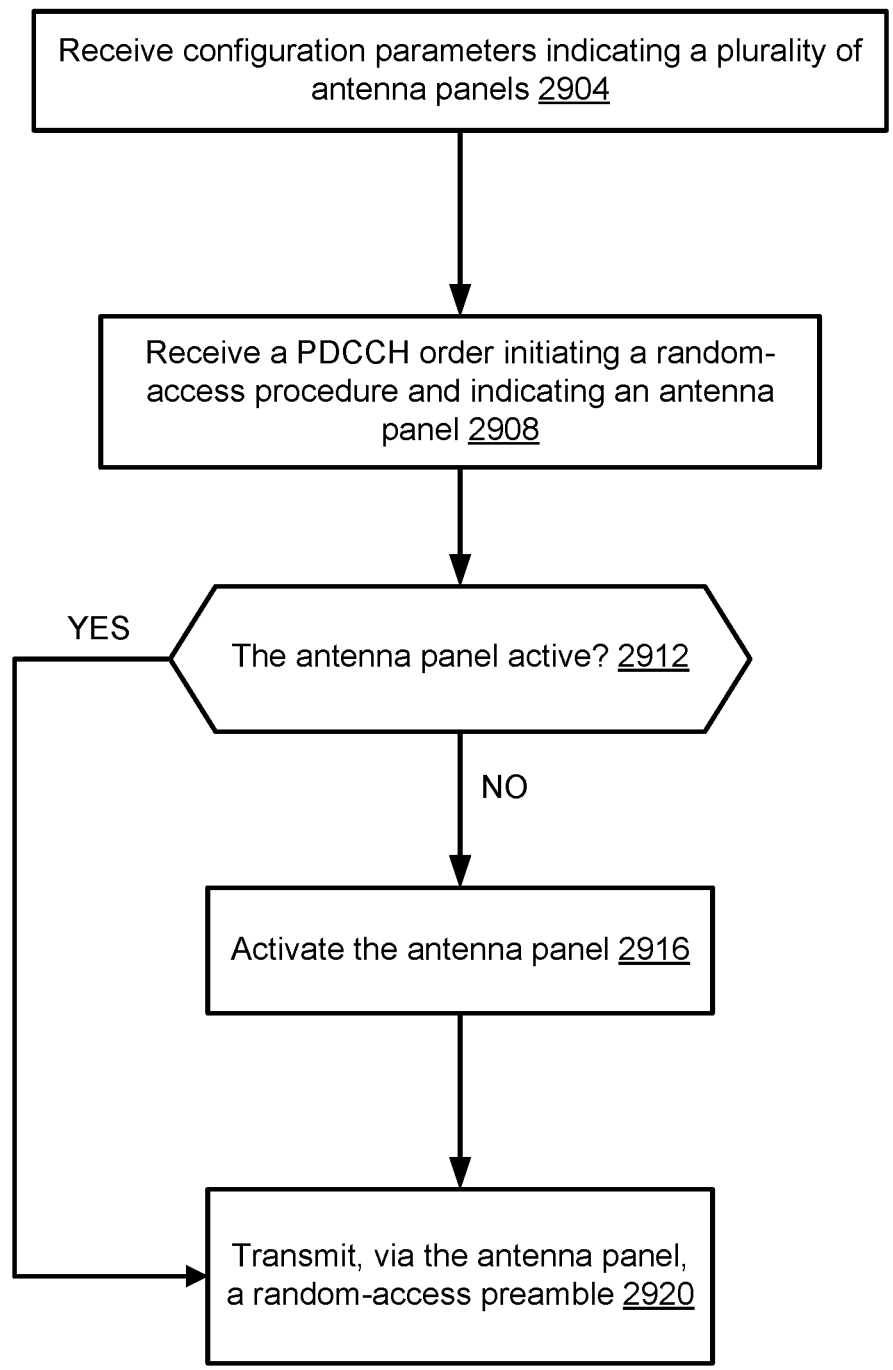
FIG. 29 shows an example method for a random access procedure at a wireless device.

FIG. 29 shows an example method for a random access procedure at a wireless device. The wireless device 2408 may perform the example method 2900. At step 2904, the wireless device may receive configuration parameters indicating a plurality of antenna panels. At step 2908, the wireless device may receive a PDCCH order initiating a random access procedure. The PDCCH order may indicate an antenna panel. The PDCCH order may indicate the antenna panel based on one or more mappings/associations as described above with reference to FIGS. 24-28. At step 2912, the wireless device may determine whether the indicated antenna panel is active. At step 2916, the wireless device may activate the indicated antenna panel if the indicated antenna panel is not active. At step 2920, the wireless device may transmit, via the antenna panel, a random access preamble for the random-access procedure.

Figure 30:
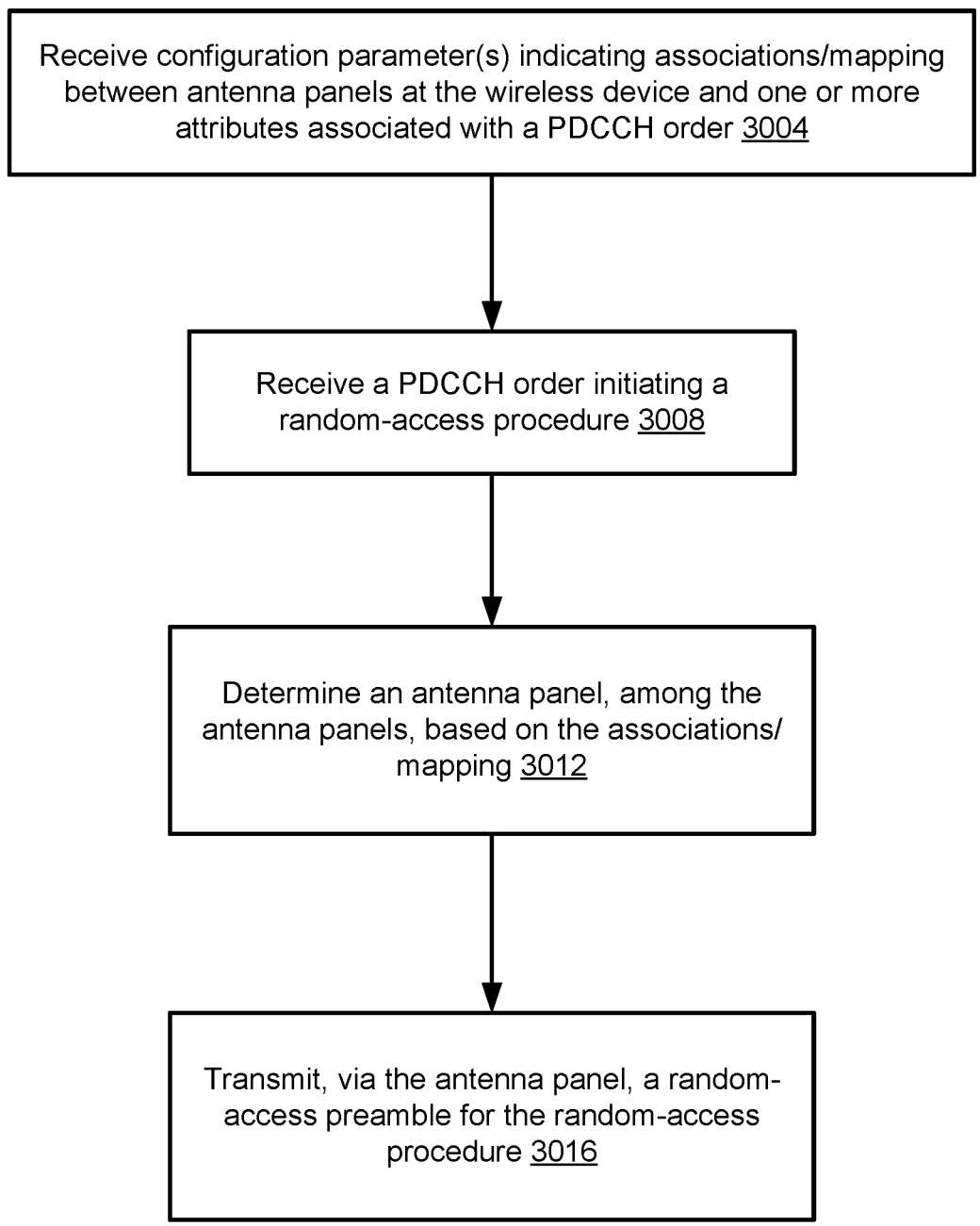
FIG. 30 shows an example method for a random access procedure at a wireless device.

FIG. 30 shows an example method for a random access procedure at a wireless device. The wireless device 2408 may perform the example method 3000. At step 3004, the wireless device may receive configuration parameters indicating a plurality of antenna panels, and associations/mappings between the plurality of antenna panels and one or more attributes associated with a PDCCH order. The one or more attributes may comprise preamble indicators/indices, reference signal indicators/indices, CORESET indicators/indices, and/or search space set indicators/indices. At step 3008, the wireless device may receive a PDCCH order initiating a random access procedure. At step 3012, the wireless device may determine an antenna panel, among the plurality of antenna panels, based on an attribute (e.g., preamble indicator, reference signal indicator, CORESET indicator, search space set indicator) of the PDCCH order and the associations/mappings. At step 3016, the wireless device may send/transmit, via the determined antenna panel, a random access preamble for the random/access procedure.

A wireless device may receive (e.g., from a base station) a PDCCH order initiating a random access procedure (e.g., contention-free random access procedure or a contention-based random access procedure) for a cell (e.g., PCell, SCell). The wireless device may send/transmit a random access preamble for the random access procedure. The wireless device may transmit the random access preamble, for example, after a time duration following the reception of the PDCCH order. The wireless device may determine the time duration based on various considerations. The wireless device may use, to determine the time duration, at least one of, for example: a BWP switching delay, a PUSCH preparation time, and/or operating frequency/frequency ranges (e.g., sub-6 GHz frequency range, 410 MHz-7.225 GHz frequency range, frequency range FR1, 6 GHz, 23 GHz, 24.25 GHZ-52.6 GHz frequency range, frequency range FR2, or any other frequency/frequency range). The base station may determine the time duration and/or an expected time at which the random access preamble may be received, from the wireless device, based on one or more of the BWP switching delay, the PUSCH preparation time, and/or the operating frequency/frequency ranges.

In at least some types of wireless communications (e.g., compatible with 3GPP Release 16, earlier/later 3GPP releases or generations, and/or other access technology), an antenna panel indicated by a PDCCH order may be in a deactivated state (e.g., inactive, not active). A wireless device may determine/need to activate the antenna panel, as indicated in the PDCCH order, for transmission of the random access preamble. Antenna panel activation at the wireless device may be associated with an antenna panel activation delay (e.g., 1 ms, 2 ms, 3 ms, or any other duration of time). The wireless device may activate the antenna panel within the antenna panel activation delay.

Determination of a time (e.g., at the wireless device) of transmission of a random access preamble and/or the expected time of reception of the random access preamble (e.g., at the base station)_without accounting for an antenna panel activation delay (e.g., based solely on BWP switching delay, PUSCH preparation time, and/or operating frequency/frequency range) may result in communication inefficiencies and synchronization issues between the wireless device and the base station. For example, the wireless device may attempt to send/transmit the random access preamble before an antenna panel is activated. The base station may expect the random access preamble to arrive at a time that is earlier than a time at which the preamble may actually be received at the base station. The base station may expect the random access preamble to arrive at a time that is earlier than a time at which the wireless device may activate the antenna panel for preamble transmission and transmit the preamble. Untimely transmission of the random access preamble may lead to the base station missing the random access preamble, which may result in the wireless device needing to retransmit the random access preamble. The retransmission of the random access preamble may increase the power consumption at the wireless device, increase the uplink interference to other cells/devices, and/or increase the duration/latency of the random access procedure.

Various examples described herein provide an enhanced procedure for calculating/determining a time for transmission of a random access preamble at a wireless device, at a base station, or at any device transmitting and/or receiving a message. The enhanced procedures may account for an antenna panel activation delay at the wireless device, for example, if the wireless device activates an antenna panel based on receiving a PDCCH order indicating the antenna panel. Determining the time of transmission/reception of the random access preamble may comprise determining a time duration between a reception of the PDCCH order at the wireless device and the time of transmission of the random access preamble from the wireless device.

The wireless device may determine the time duration (and/or the time of transmission of the random-access preamble) based on at least one of, for example: an antenna panel activation delay, a BWP switching delay, a PUSCH preparation time and/or an operation frequency/frequency range. The time duration may be based on (e.g., equal to, or greater than) the antenna panel activation delay. The time duration may be based on the antenna panel activation delay and the BWP switching delay. The time duration may be a sum of the antenna panel activation delay and the BWP switching delay. The wireless device may not switch to an active uplink BWP and activate an antenna panel in parallel (e.g., simultaneously). The time duration may be based on (e.g., be equal to) a larger of the antenna panel activation delay and the BWP switching delay. The wireless device may switch to an active uplink BWP and activate an antenna panel in parallel (e.g., simultaneously).

The base station may determine the time duration (and/or the time of reception of the random access preamble, and/or a second time duration between the transmission of the PDCCH order and the reception of the random-access preamble) based on at least one of, for example: an antenna panel activation delay, a BWP switching delay, a PUSCH preparation time and/or an operation frequency/frequency range. The base station may determine the time duration (and/or the estimated time of reception and/or the second time duration) based on one or more considerations as described herein with respect to determination of the time duration at the wireless device. Determination of the time duration as described herein may improve random access preamble detection, reduce random access preamble retransmissions, reduce uplink overhead/retransmissions and interference, reduce wireless device and base station battery power consumption, and/or reduce delay/latency of random access procedure.

Figure 31:
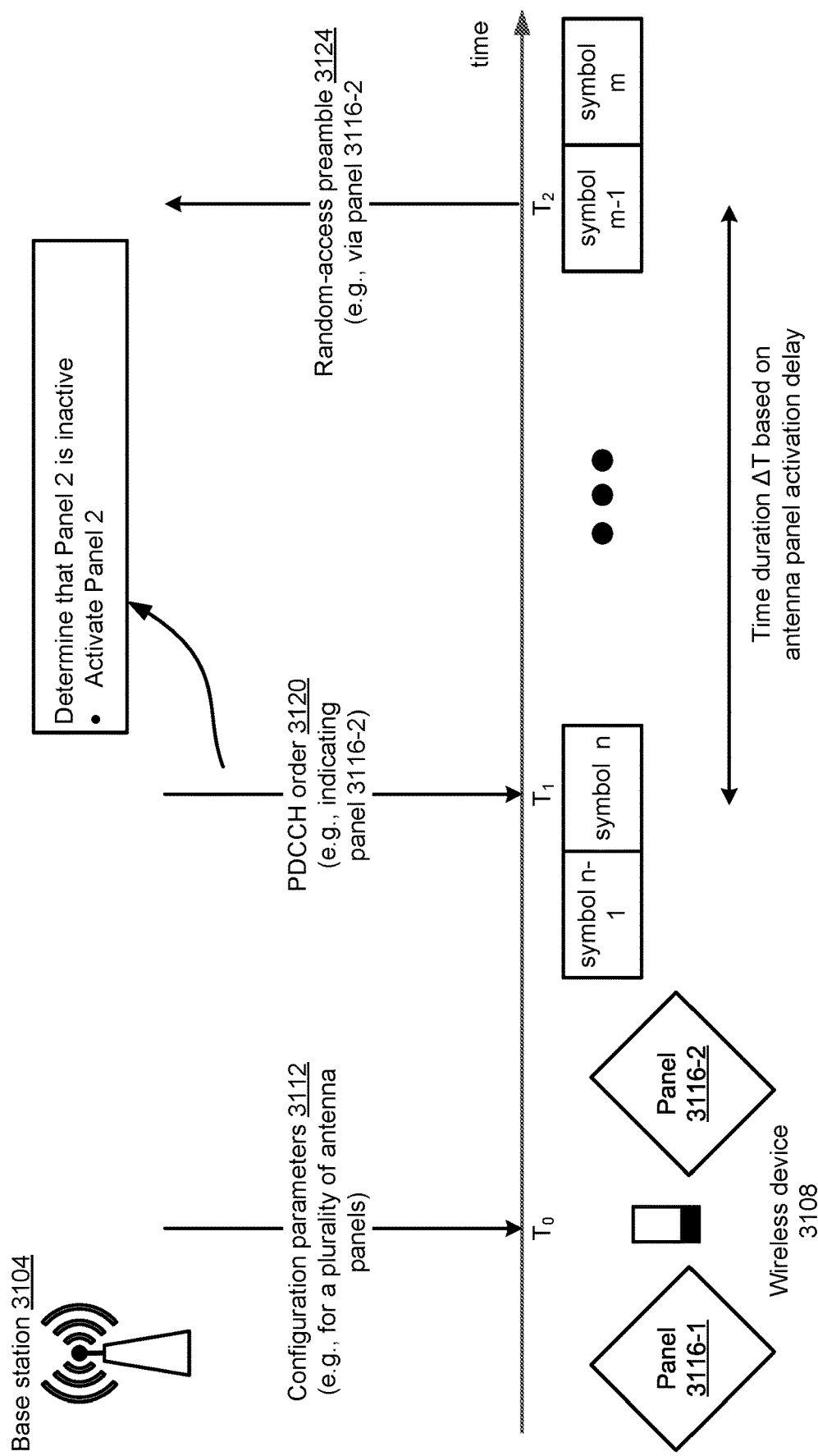
FIG. 31 shows example communications for a random access procedure accommodating an antenna panel activation delay at a wireless device.

FIG. 31 shows example communications for a random access procedure accommodating an antenna panel activation delay at a wireless device. A base station 3104 may send, to the wireless device 2408, an indication (e.g., via a PDCCH order) indicating an antenna panel for the random access preamble transmission. The wireless device 3108 may select the indicated antenna panel and send/transmit the random access preamble based on the PDCCH order. The base station may determine a time duration between the transmission of the PDCCH order and a reception of the random access preamble based on the antenna panel activation delay.

The base station 3104 and the wireless device 3108 may be configured in a similar manner as, and perform one or more operations as described with reference to, the base station 2404 and the wireless device 2408, respectively. The configuration parameters 3112 and the PDCCH order 3120 may be similar to the configuration parameters 2412 and the PDCCH order 2420, respectively. The PDCCH order 3120 may indicate an antenna panel (e.g., panel 3116-2) of a plurality of antenna panels 3316 at the wireless device, for example, as described with reference to one or more examples corresponding to FIGS. 24-28. The wireless device 3108 may send/transmit, via the indicated antenna panel, a random access preamble 3124.

The wireless device may receive the PDCCH order 3120 in one or more first symbols (e.g., symbol n−1, symbol n as shown in FIG. 31). The wireless device 3108 may send/transmit the random access preamble 3124 in one or more second symbols (e.g., symbol m−1, symbol m as shown in FIG. 31). A time duration $\Delta T$ between a last symbol (e.g., symbol n) of the one or more first symbols (via which the PDCCH order 3120) is received and a first symbol (e.g., symbol m−1) of the one or more second symbols (via which the random access preamble 3124 is transmitted) may be based on an antenna panel activation delay. The wireless device 3108 may determine/calculate the time duration $\Delta T$. The time duration may $\Delta T$ be determined in units of ms, seconds, or any other units of time. Determining the time duration $\Delta T$ may comprise determining a symbol, time slot, slot, mini-slot, frame and/or subframe for the transmission of the random access preamble 3124.

The time duration $\Delta T$ may be determined based on an uplink transmission (e.g., a PUSCH transmission) preparation time (e.g., $N_{T,2}$), a BWP switching delay (e.g., $\Delta_{BWPSwitching}$), a delay based on an operating frequency/frequency range (e.g., $\Delta_{Delay}$), and/or an antenna panel activation delay (e.g., $\Delta_{AP,delay}$) The time duration $\Delta T$ may be larger than or equal to a sum of one or more of a first time duration (e.g., $N_{T,2}$), a second time duration (e.g., $\Delta_{BWPSwitching}$), a third time duration ($\Delta_{Delay}$), and/or the antenna panel activation delay (e.g., $\Delta_{AP,delay}$). For example, time duration $\Delta T$ may be determined as:

$$\Delta T \geq N_{T,2} + \Delta_{BWPSwitching} + \Delta_{Delay} + \Delta_{AP,delay}$$

The time duration $\Delta T$ may be larger than or equal to a sum of the first time duration (e.g., $N_{T,2}$), the third time duration (e.g., $\Delta_{Delay}$), and a maximum of the second time duration (e.g., $\Delta_{BWPSwitching}$) and the antenna panel activation delay (e.g., $\Delta_{AP,delay}$). For example, time duration $\Delta T$ may be determined as:

$$\Delta T \geq N_{T,2} + \Delta_{Delay} + \text{maximum}(\Delta_{BWPSwitching}, \Delta_{AP,delay})$$

The maximum of the second time duration (e.g., $\Delta_{BWPSwitching}$) and the antenna panel activation delay (e.g., $\Delta_{AP,delay}$) may be equal to the second time duration if the second time duration is greater than or equal to the antenna panel activation delay. The maximum of the second time duration and the antenna panel activation delay may be equal to the antenna panel activation delay if the antenna panel activation delay is greater than or equal to the second time duration.

The first time duration (e.g., $N_{T,2}$) may comprise a time duration corresponding to a number of symbols (e.g., $N_2$). Each symbol may correspond to a particular duration of time. The number of symbols may correspond to the PUSCH preparation time based on processing capability of the wireless device 3108. The second time duration (e.g., $\Delta_{BWPSwitching}$) may be zero if the PDCCH order 3120 does not trigger a change of an active uplink BWP. The PDCCH order 3120 may not trigger the change of the active uplink BWP if the active uplink BWP of the cell comprises PRACH resources (e.g., PRACH occasions). The second time duration may be non-zero (e.g., 1 ms, 2 ms, 3 ms, or any other duration of time) if the PDCCH order 3120 triggers an active uplink BWP change. The PDCCH order 3120 may trigger the active uplink BWP change if the active uplink BWP of the cell does not comprise PRACH resources (e.g., PRACH occasions). The third time duration ($\Delta_{Delay}$) may depend on/be based on the frequency range in which the cell operates. The third time duration may be equal to 0.5 ms (or any other quantity), for example, if the cell operates at a first frequency range (e.g., frequency range 1, FR1, sub-6 GHz frequency range). The third time duration may be equal to 0.25 ms (or any other quantity), for example, if the cell operates at a second (e.g., frequency range 2, FR2, above-6 GHz frequency range).

The antenna panel activation delay may be non-zero (e.g., 1 ms, 2 ms, 3 ms, or any other quantity) if the PDCCH order 3120 triggers an active antenna panel change. The antenna panel activation delay may be non-zero based on the wireless device 3108 activating the antenna panel indicated by the PDCCH order 3120. The antenna panel activation delay may be non-zero if the PDCCH order 3120 indicates an antenna panel that is in a deactivated state. The wireless device 3108 may complete activating the antenna panel within the antenna panel activation delay. The wireless device may start activating the antenna panel at a first time (e.g., symbol, slot, frame, mini-slot). The wireless device 3108 may finish/complete activating the antenna panel at (or before) a second time which may be equal to a sum of the first time and the antenna panel activation delay.

The antenna panel activation delay may be zero if the PDCCH order 3120 does not trigger an active antenna panel change. The antenna panel activation delay may be zero if the wireless device 3108 does not activate an antenna panel indicated by the PDCCH order 3120. The antenna panel activation delay may be zero if the PDCCH order 3120 indicates an antenna panel that is in an activated state.

The wireless device 3108 may send/transmit the random access preamble 3124 based on the time duration $\Delta T$ (e.g., at or after time $T_2$). The wireless device 3108 may transmit the random access preamble 3124, for example, at (or after) a time (e.g., symbol, time slot, slot, mini-slot, frame and/or subframe) that is after the time duration $\Delta T$ (e.g., following the reception of the PDCCH order 3120). The wireless device 3108 may start transmitting the random access preamble at a symbol (e.g., first symbol, symbol m−1), for example, after the time duration ΔT (e.g., following the reception of the PDCCH order 3120).

The base station 3104 may receive the random access preamble 3124 based on the time duration ΔT. The base station 3104 may receive the random access preamble 3124, for example, at (or after) a time (e.g., symbol, slot, mini-slot, frame and/or subframe) that is after the time duration ΔT (e.g., following the transmission of the PDCCH order 3120). The base station 3104 may start receiving the random access preamble at a symbol, for example, after the time duration ΔT (e.g., following the reception of the PDCCH order 3120). The base station 3104 may determine a time of reception of the random access preamble based on a round-trip transit time between the base station 3104 and the wireless device 3108 and the time duration ΔT.

Figure 32:
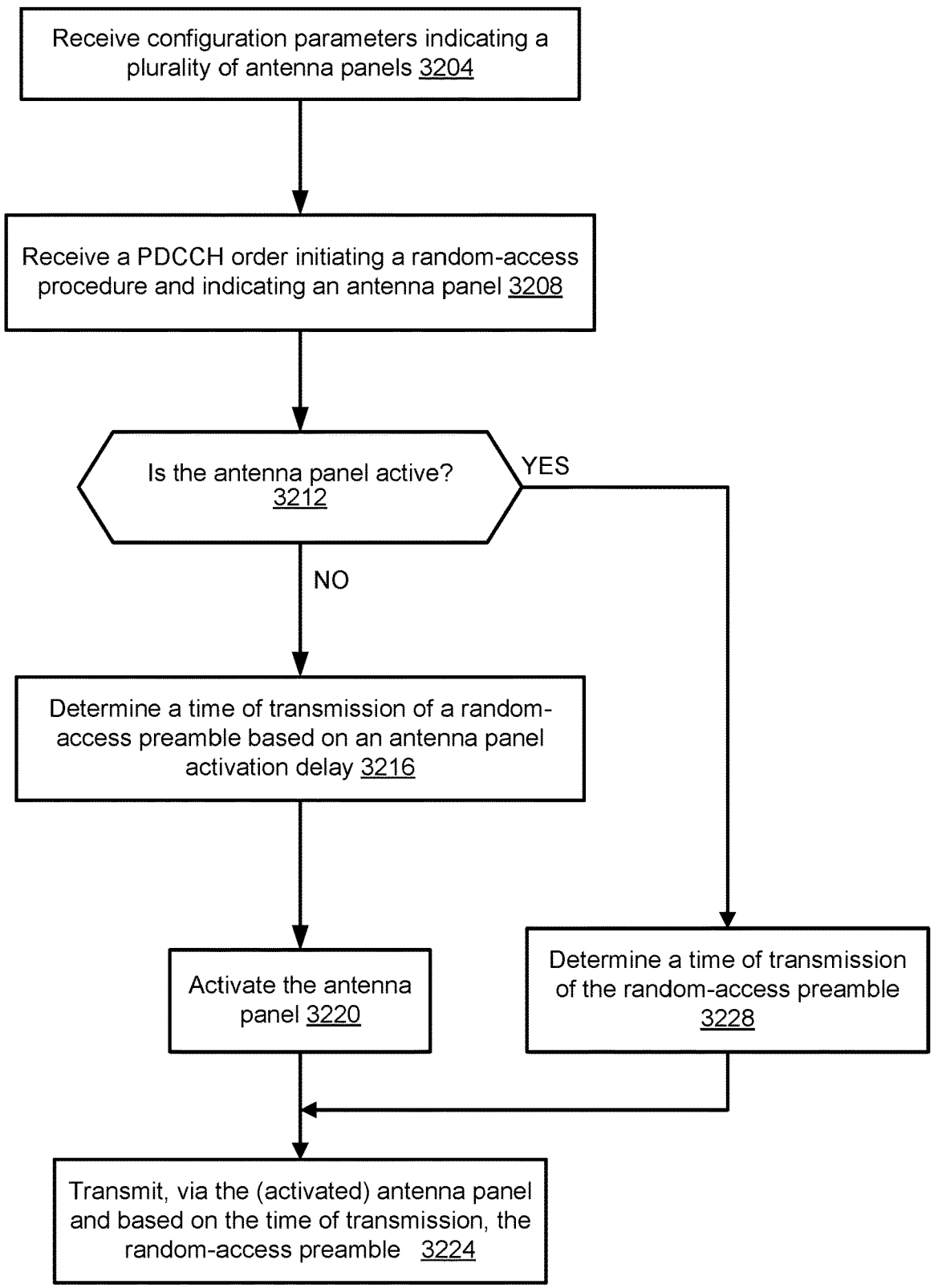
FIG. 32 shows an example method for a random access procedure at a wireless device.

FIG. 32 shows an example method for a random access procedure at a wireless device. The wireless device 3108 may perform the example method 3200. At step 3204, the wireless device may receive configuration paramaters indicating a plurality of antenna panels. For example, the configuration parameters may indicate panel indices (for the plurality of antenna panels. At step 3208, the wireless device may receive a PDCCH order initiating a random access procedure. The PDCCH order may further indicate an antenna panel of the plurality of antenna panels (e.g., as described with reference to FIGS. 24-28). At step 3216, the wireless device may determine a time of transmission of a random access preamble (e.g., associated with the random access procedure) based on an antenna panel activation delay, for example, if the indicated antenna panel is not active at the wireless device. At step 3220, the wireless device may activate the indicated antenna panel. At step 3228, the wireless device may determine a time of transmission of the random access preamble (e.g., using a set of parameters that does not include an antenna panel activation delay), for example, if the indicated antenna panel is active at the wireless device. Determining the time of transmission of the random access preamble may comprise determining a time duration between a reception of the PDCCH order and the transmission of the random-access preamble. At step 3224, the wireless device may send/transmit, via the (activated) antenna panel and based on the time of transmission, the random access preamble.

A wireless device may perform a method comprising multiple operations. The wireless device may receive an indication to initiate a random access procedure, and an indication of an antenna panel for the random access procedure. The wireless device may activate the antenna panel for the random access procedure. The wireless device may determine, based on an antenna panel activation delay, a slot (e.g., time slot) for transmission of a random access preamble associated with the random access procedure. The wireless device may transmit, in the slot and via the activated antenna panel, the random access preamble. The wireless device may also perform one or more additional operations. The wireless device may receive one or more configuration parameters, wherein the one or more configuration parameters indicate associations between one or more random access preamble indexes and a plurality of antenna panels at the wireless device, wherein the receiving the indication of the antenna panel comprises receiving a random access preamble index associated with the antenna panel. The wireless device may, based on the receiving the indication to initiate the random access procedure, switching from a first active uplink bandwidth part (BWP) to a second active uplink BWP. The determining the slot for the transmission of the random access preamble may be further based on a bandwidth part (BWP) switching delay. The receiving the indication to initiate the random access procedure may comprise receiving, via a second antenna panel different from the antenna panel, the indication to initiate the random access procedure. The wireless device may receive one or more configuration parameters, wherein the one or more configuration parameters may indicate associations between one or more reference signal indexes and a plurality of antenna panels at the wireless device and wherein the receiving the indication of the antenna panel may comprise receiving a reference signal index associated with the antenna panel. The receiving the indication to initiate the random access procedure and the indication of the antenna panel may comprise receiving a physical downlink control channel (PDCCH) order comprising the indication to initiate the random access procedure and the indication of the antenna panel. The determining the slot may be based on determining a time duration between the receiving the indication to initiate the random access procedure and the transmitting the random access preamble, wherein the time duration may be based on at least one of a sum or a maximum of: the antenna panel activation delay; and a bandwidth part (BWP) switching delay. The receiving the indication of the antenna panel may comprise receiving at least one of: a sounding reference signal (SRS) resource set index; a reference signal index; a synchronization signal/physical broadcast channel (SS/PBCH) index. The receiving the indication of the antenna panel comprises receiving a random access preamble index associated with the antenna panel, and wherein the transmitting the random access preamble comprises transmitting the random access preamble associated with the random access preamble index. The wireless device may receiving one or more configuration parameters, wherein the one or more configuration parameters may indicate associations between one or more control resource set (CORESET) indexes and a plurality of antenna panels (e.g., at the wireless device), and wherein the receiving the indication of the antenna panel may comprise receiving the indication to initiate the random access procedure via a CORESET with a CORESET index associated with the antenna panel. The wireless device may receive one or more configuration parameters, wherein the one or more configuration parameters may indicate associations between one or more search space set indexes and a plurality of antenna panels (e.g., at the wireless device), and wherein the receiving the indication of the antenna panel may comprise receiving the indication to initiate the random access procedure via a search space set associated with the antenna panel. The receiving the indication to initiate the random access procedure may comprise receiving the indication to initiate the random access procedure in a second slot, wherein a time duration between a last symbol of the second slot and the first symbol of the slot may be based on the antenna panel activation delay. The activating the antenna panel may comprise starting activation of the antenna panel in a second slot and completing the activation the antenna panel at a third slot that is within the antenna panel activation delay following the second slot. The activating the antenna panel may comprise at least one of: receiving a downlink signal via the antenna panel; or transmitting an uplink signal via the antenna panel. The wireless device may receive one or more messages comprising one or more configuration parameters, wherein the one or more configuration parameters may indicate a plurality of panel indexes for a plurality of antenna panels (e.g., at the wireless device).

The random-access procedure may be a contention-free random-access procedure. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to send the indication to initiate the random access procedure. A computer-readable medium may store instructions that, when executed, cause performance of the described method, additional operations and/or include the additional elements.

A wireless device may perform a method comprising multiple operations. The wireless device may receive, via a first antenna panel, one or more indications to initiate a random access procedure via a second antenna panel, wherein the second antenna panel may be in a deactivated state. The wireless device may determine, based on an antenna panel activation delay, a slot for transmission of a random access preamble associated with the random access procedure. The wireless device may transmit, in the slot and via the second antenna panel, the random access preamble. The wireless device may also perform one or more additional operations. The wireless device may activate the second antenna panel for the random access procedure, wherein the one or more indications may comprise an indication of the second antenna panel. The wireless device may, based on the receiving the one or more indications, switching from a first active uplink bandwidth part (BWP) to a second active uplink BWP. The determining the slot for the transmission of the random access preamble may be further based on a bandwidth part (BWP) switching delay. The wireless device may receive one or more configuration parameters, wherein the one or more configuration parameters may indicate associations between one or more random access preamble indexes and a plurality of antenna panels (e.g., at the wireless device), and wherein the one or more indications may comprise a random access preamble index associated with the second antenna panel. The wireless device may receive one or more configuration parameters, wherein the one or more configuration parameters may indicate associations between one or more reference signal indexes and a plurality of antenna panels (e.g., at the wireless device), and wherein the one or more indications may comprise a reference signal index associated with the second antenna panel. The receiving the one or more indications may comprise receiving a physical downlink control channel (PDCCH) order comprising the one or more indications. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to send the one or more indications to initiate the random access procedure. A computer-readable medium may store instructions that, when executed, cause performance of the described method, additional operations and/or include the additional elements.

A wireless device may perform a method comprising multiple operations. The wireless device may receive one or more configuration parameters, wherein the configuration parameters may comprise an indication of a random access preamble index associated with an antenna panel. The wireless device may receive one or more indications to initiate a random access procedure, wherein the one or more indications comprise the random access preamble index. The wireless device may, based on the one or more indications: switch from a first active uplink bandwidth part (BWP) to a second active uplink BWP; and determine the antenna panel associated with the random access preamble index. The wireless device may determine, based on an antenna panel activation delay and a BWP switching delay, a time duration between the receiving the one or more indications and transmission of a random access preamble. The wireless device may transmit, in a slot based on the time duration, the random access preamble. The one or more indications may comprise at least one of: a sounding reference signal (SRS) resource set index; a reference signal index; or a synchronization signal/physical broadcast channel (SS/PBCH) index. The random access preamble may be indicated by the random access preamble index. The time duration may be based on at least one of a sum or a maximum of: the antenna panel activation delay; and the BWP switching delay. The wireless device may determine the slot by determining an available slot that is after the time duration. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to send the one or more indications to initiate the random access procedure. A computer-readable medium may store instructions that, when executed, cause performance of the described method, additional operations and/or include the additional elements.

A base station may perform a method comprising multiple operations. The base station may transmit, to a wireless device: an indication to initiate a random-access procedure; and an indication of an antenna panel for the random access procedure, wherein the antenna panel is deactivated. The base station may determine, based on an antenna panel activation delay of the antenna panel, a slot for reception of a random access preamble associated with the random access procedure. The base station may receive, in the slot, the random-access preamble. The base station may transmit one or more configuration parameters, wherein the one or more configuration parameters may indicate associations between one or more random access preamble indexes and a plurality of antenna panels (e.g., at the wireless device), wherein the transmitting the indication of the antenna panel may comprise transmitting a random access preamble index associated with the antenna panel. The determining the slot for the reception of the random access preamble may be further based on a bandwidth part (BWP) switching delay. The base station may transmit one or more configuration parameters, wherein the one or more configuration parameters may indicate associations between one or more reference signal indexes and a plurality of antenna panels (e.g., at the wireless device), wherein the transmitting the indication of the antenna panel may comprise transmitting a reference signal index associated with the antenna panel. The transmitting the indication to initiate the random access procedure and the indication of the antenna panel may comprise transmitting a physical downlink control channel (PDCCH) order comprising the indication to initiate the random access procedure and the indication of the antenna panel. The determining the slot may be based on determining a time duration between the transmitting the indication to initiate the random access procedure and the receiving the random access preamble, wherein the time duration is based on at least one of a sum or a maximum of: the antenna panel activation delay; and a bandwidth part (BWP) switching delay. The transmitting the indication of the antenna panel may comprise transmitting at least one of: a sounding reference signal (SRS) resource set index; a reference signal index; or a synchronization signal/physical broadcast channel (SS/PBCH) index. The transmitting the indication of the antenna panel may comprise transmitting a random access preamble index associated with the antenna panel, and wherein the receiving the random access preamble may comprise receiving the random access preamble associated with the random access preamble index. The base station may transmit one or more configuration parameters, wherein the one or more configuration parameters may indicate associations between one or more control resource set (CORESET) indexes and a plurality of antenna panels (e.g., at the wireless device), and wherein the transmitting the indication of the antenna panel may comprise transmitting the indication to initiate the random access procedure via a CORESET with a CORESET index associated with the antenna panel. The base station may transmit one or more configuration parameters, wherein the one or more configuration parameters may indicate associations between one or more search space set indexes and a plurality of antenna panels (e.g., at the wireless device), and wherein the transmitting the indication of the antenna panel may comprise transmitting the indication to initiate the random access procedure via a search space set associated with the antenna panel. The transmitting the indication to initiate the random access procedure may comprise transmitting the indication to initiate the random access procedure in a second slot, wherein a time duration between a last symbol of the second slot and the first symbol of the slot may be based on the antenna panel activation delay. The base station may transmit one or more messages comprising one or more configuration parameters, wherein the one or more configuration parameters may indicate a plurality of panel indexes for a plurality of antenna panels (e.g., at the wireless device). The random access procedure may be a contention-free random access procedure. A base station may comprise one or more processors; and memory storing instructions that, when executed by the one or more processors, cause the base station to perform the described method, additional operations and/or include the additional elements. A system may comprise a base station configured to perform the described method, additional operations and/or include the additional elements; and a wireless device configured to send the random access preamble. A computer-readable medium may store instructions that, when executed, cause performance of the described method, additional operations and/or include the additional elements.

A wireless device may perform a method comprising multiple operations. The wireless device may receive one or more messages comprising one or more configuration parameters indicating associations between one or more random access preambles and a plurality of antenna panels (e.g., at the wireless device). The wireless device may receive a physical downlink control channel (PDCCH) order comprising: an indication to initiate a random access procedure; and an indication of a random access preamble of the one or more random access preambles. The wireless device may determine an antenna panel among the plurality of the antenna panels based on: the associations; and the indication of the random access preamble. The wireless device may transmit, via the antenna panel, the random access preamble for the random access procedure. The associations between the one or more random access preambles and the plurality of antenna panels may comprise associations between one or more random access preamble indexes of the one or more random access preambles and a plurality of antenna panel indexes of the plurality of antenna panels. The one or more configuration parameters may indicate one or more random access preamble indexes for the one or more random access preambles. The one or more configuration parameters may indicate a plurality of antenna panel indexes for the plurality of antenna panels. The one or more configuration parameters may indicate a plurality of antenna panel indexes for the one or more random access preambles. The PDCCH order may comprise a random access preamble index, among one or more random access preamble indexes, indicating the random access preamble. The PDCCH order may comprise a random access preamble index associated with the antenna panel. A first antenna panel of the plurality of antenna panels may be associated with: a second random access preamble of the one or more random access preambles; and a third random access preamble of the one or more random access preambles. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to send the PDCCH order. A computer-readable medium may store instructions that, when executed, cause performance of the described method, additional operations and/or include the additional elements.

A wireless device may perform a method comprising multiple operations. The wireless device may receive, one or more messages comprising one or more configuration parameters indicating associations between one or more reference signals and a plurality of antenna panels (e.g., at the wireless device). The wireless device may receiving a physical downlink control channel (PDCCH) order comprising: an indication to initiate a random access procedure; and an indication of reference signal of the one or more reference signals. The wireless device may determine an antenna panel among the plurality of the antenna panels based on: the associations; and the indication of the reference signal. The wireless device may transmit, via the antenna panel, a random access preamble for the random access procedure. The associations between the one or more reference signals and the plurality of antenna panels comprise associations between one or more reference signal indexes of the one or more reference signals and a plurality of antenna panel indexes of the plurality of antenna panels. The one or more configuration parameters may indicate one or more reference signal indexes for the one or more reference signals. The one or more configuration parameters may indicate a plurality of antenna panel indexes for the plurality of antenna panels. The one or more configuration parameters may indicate a plurality of antenna panel indexes for the one or more reference signals. The PDCCH order comprises a reference signal index, among one or more reference signal indexes, indicating the reference signal. The PDCCH order may comprise a reference signal index associated with the antenna panel. The wireless device may determine one or more random access channel occasions based on the indication of the reference signal and wherein the transmitting the random access preamble comprises transmitting the random access preamble via the one or more random access channel occasions. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to send the PDCCH order. A computer-readable medium may store instructions that, when executed, cause performance of the described method, additional operations and/or include the additional elements.

A base station may perform a method comprising multiple operations. The base station may determine to transmit a physical downlink control channel (PDCCH) order initiating a random-access procedure for a cell. The base station may, based on the determining, select a control resource set (CORESET), among a plurality of CORESETS in an active downlink bandwidth part (BWP) of the cell, with a transmission configuration indicator (TCI) state indicating a downlink reference signal. The base station may transmit, via the CORESET, the PDCCH order. The base station may, based on the determining, not select a second CORESET, among the plurality of CORESETs, with a second TCI state indicating an uplink reference signal. The base station may not transmit, via the second CORESET, the PDCCH order. The base station may determine to transmit a second PDCCH order initiating a second random-access procedure for the cell. The base station may, based on the determining to transmit the second PDCCH order, select a third CORESET, among the plurality of CORESETs, with a third TCI state indicating a third uplink reference signal with spatial relation information that indicates a second downlink reference signal. The base station may transmit, via the third CORESET, the second PDCCH order. A base station may comprise one or more processors; and memory storing instructions that, when executed by the one or more processors, cause the base station to perform the described method, additional operations and/or include the additional elements. A system may comprise a base station configured to perform the described method, additional operations and/or include the additional elements; and a wireless device configured to receive the PDCCH order. A computer-readable medium may store instructions that, when executed, cause performance of the described method, additional operations and/or include the additional elements.

A wireless device may perform a method comprising multiple operations. The wireless device may receive, via a control resource set (CORESET), a physical downlink control channel (PDCCH) order initiating a random-access procedure, wherein a transmission configuration indicator (TCI) state of the CORESET may indicate an uplink reference signal. The wireless device may, based on the TCI state indicating the uplink reference signal, determine a downlink reference signal for transmission of a random-access preamble of the random-access procedure. The wireless device may transmit, with a transmission power determined based on the downlink reference signal, the random-access preamble. The wireless device may receive, via a second CORESET, a second PDCCH order initiating a second random-access procedure, wherein a second TCI state of the second CORESET indicates a second downlink reference signal. The wireless device may, in response to the second TCI state indicating the second downlink reference signal, transmit a second random-access preamble for the second random-access procedure with a second transmission power determined based on the second downlink reference signal. The wireless device may receive one or more configuration parameters. The one or more configuration parameters may indicate one or more CORESET indexes for one or more CORESETs, wherein the downlink reference signal may be associated with a selected CORESET with a lowest CORESET index among the one or more CORESET indexes of the one or more CORESETs. The one or more configuration parameters may indicate one or more pathloss reference signals (RSs) for a pathloss estimation of an uplink channel, wherein the downlink reference signal may be associated with a pathloss RS with a lowest pathloss reference RS index among one or more pathloss reference RS indexes of the one or more pathloss reference RSs. The downlink reference signal may be associated with a second TCI state with a lowest TCI state index among TCI state indexes of at least one activated TCI state. The downlink reference signal may be a third downlink reference signal used for a third random access procedure, wherein the third random access procedure is an initial random access procedure or a most recent random access procedure. The downlink reference signal may be a third downlink reference signal used to obtain a master information block (MIB). The transmission power may be determined based on determining a path loss estimate of the downlink reference signal. The random-access procedure may be a contention-free random-access procedure. The wireless device may monitor a PDCCH in the CORESET based on the TCI state, wherein the monitoring the PDCCH in the CORESET based on the TCI state may comprise at least one demodulation reference signal (DM-RS) port of the PDCCH being quasi co-located with the uplink reference signal. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to send the PDCCH order. A computer-readable medium may store instructions that, when executed, cause performance of the described method, additional operations and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or Information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
  receiving, by a wireless device, one or more messages comprising one or more configuration parameters indicating one or more reference signals;
  receiving, via a first antenna resource and a physical downlink control channel (PDCCH), an indication of a transmission configuration indication (TCI) state associated with a reference signal of the one or more reference signals;
  determining, based on the reference signal, a second antenna resource different from the first antenna resource; and
  transmitting, via the second antenna resource, an uplink signal.

2. The method of claim 1, wherein the first antenna resource and the second antenna resource comprise antenna panels.

3. The method of claim 1, wherein the reference signal is associated with a quantity of antenna ports.

4. The method of claim 1, wherein the transmitting the uplink signal comprises transmitting the uplink signal in a slot determined based on an antenna panel activation delay.

5. The method of claim 1, wherein the receiving the indication of the TCI state comprises receiving a PDCCH order comprising an indication to initiate a random access procedure.

6. The method of claim 1, wherein the one or more configuration parameters further indicate associations between the one or more reference signals and a plurality of antenna resources, and wherein the determining the second antenna resource is based on the associations.

7. The method of claim 1, wherein the uplink signal is a random access preamble for a random access procedure.

8. A wireless device comprising:
one or more processors; and
memory storing instructions that, when executed by the one or more processors, cause the wireless device to:
receive one or more messages comprising one or more configuration parameters indicating one or more reference signals;
receive, via a first antenna resource and a physical downlink control channel (PDCCH), an indication of a transmission configuration indication (TCI) state associated with a reference signal of the one or more reference signals;
determine, based on the reference signal, a second antenna resource different from the first antenna resource; and
transmit, via the second antenna resource, an uplink signal.

9. The wireless device of claim 8, wherein the first antenna resource and the second antenna resource comprise antenna panels.

10. The wireless device of claim 8, wherein the reference signal is associated with a quantity of antenna ports.

11. The wireless device of claim 8, wherein the instructions, when executed by the one or more processors, cause the wireless device to transmit the uplink signal by causing transmitting the uplink signal in a slot determined based on an antenna panel activation delay.

12. The wireless device of claim 8, wherein the instructions, when executed by the one or more processors, cause the wireless device to receive the indication of the TCI state by causing receiving a PDCCH order comprising an indication to initiate a random access procedure.

13. The wireless device of claim 8, wherein the one or more configuration parameters further indicate associations between the one or more reference signals and a plurality of antenna resources, and wherein the instructions, when executed by the one or more processors, cause the wireless device to determine the second antenna resource by causing determining the second antenna resource based on the associations.

14. A non-transitory computer readable medium storing instructions that, when executed, cause:
receiving, by a wireless device, one or more messages comprising one or more configuration parameters indicating one or more reference signals;
receiving, via a first antenna resource and a physical downlink control channel (PDCCH), an indication of a transmission configuration indication (TCI) state associated with a reference signal of the one or more reference signals;
determining, based on the indication of the reference signal, a second antenna resource different from the first antenna resource; and
transmitting, via the second antenna resource, an uplink signal.

15. The non-transitory computer readable medium of claim 14, wherein the first antenna resource and the second antenna resource comprise antenna panels.

16. The non-transitory computer readable medium of claim 14, wherein the reference signal is associated with a quantity of antenna ports.

17. The non-transitory computer readable medium of claim 14, wherein the instructions, when executed, cause the transmitting the uplink signal by causing transmitting the uplink signal in a slot determined based on an antenna panel activation delay.

18. The non-transitory computer readable medium of claim 14, wherein the instructions, when executed, cause the receiving the indication of the TCI state by causing receiving a PDCCH order comprising an indication to initiate a random access procedure.

19. The non-transitory computer readable medium of claim 14, wherein the one or more configuration parameters further indicate associations between the one or more reference signals and a plurality of antenna resources, and wherein the instructions, when executed, cause the determining the second antenna resource by causing determining the second antenna resource based on the associations.

20. A system comprising:
a wireless device; and
a base station;
wherein the base station comprises:
one or more first processors; and
memory storing first instructions that, when executed by the one or more first processors, cause the base station to:
send one or more messages comprising one or more configuration parameters indicating one or more reference signals; and
send, a physical downlink control channel (PDCCH), an indication of a transmission configuration indication (TCI) state associated with a reference signal of the one or more reference signals,
wherein the wireless device comprises:
one or more second processors; and
memory storing second instructions that, when executed by the one or more second processors, cause the wireless device to:
receive, via a first antenna resource, the indication of the transmission configuration indication (TCI) state associated with the reference signal;
determine, based on the reference signal, a second antenna resource different from the first antenna resource; and
transmit, via the second antenna resource, an uplink signal.

21. The system of claim 20, wherein the first antenna resource and the second antenna resource comprise antenna panels.

22. The system of claim 20, wherein the reference signal is associated with a quantity of antenna ports.

23. The system of claim 20, wherein the second instructions, when executed by the one or more second processors, cause the wireless device to transmit the uplink signal by causing transmitting the uplink signal in a slot determined based on an antenna panel activation delay.

24. The system of claim 20, wherein the second instructions, when executed by the one or more second processors, cause the wireless device to receive the indication of the TCI state by causing receiving a PDCCH order comprising an indication to initiate a random access procedure.

25. The system of claim 20, wherein the one or more configuration parameters further indicate associations between the one or more reference signals and a plurality of antenna resources, and wherein the second instructions, when executed by the one or more second processors, cause the wireless device to determine the second antenna resource by causing determining the second antenna resource based on the associations.

26. The system of claim 20, wherein the uplink signal is a random access preamble for a random access procedure.

* * * * *